(12) United States Patent
Noris et al.

(10) Patent No.: US 12,277,642 B2
(45) Date of Patent: Apr. 15, 2025

(54) LOCALIZATION FAILURE HANDLING ON ARTIFICIAL REALITY SYSTEMS

(71) Applicant: Meta Platforms Technologies, LLC, Menlo Park, CA (US)

(72) Inventors: Gioacchino Noris, Zurich (CH); Hongbing Hu, Palo Alto, CA (US); Anush Mohan, San Jose, CA (US)

(*) Notice: Subject to any disclaimer, the term of this patent is extended or adjusted under 35 U.S.C. 154(b) by 281 days.

(21) Appl. No.: 17/969,619

(22) Filed: Oct. 19, 2022

(65) Prior Publication Data
US 2023/0125390 A1    Apr. 27, 2023

Related U.S. Application Data

(60) Provisional application No. 63/272,092, filed on Oct. 26, 2021.

(51) Int. Cl.
| | |
|---|---|
| G06T 15/06 | (2011.01) |
| G06T 15/08 | (2011.01) |
| G06T 17/00 | (2006.01) |
| G06T 19/00 | (2011.01) |
| G06T 19/20 | (2011.01) |

(52) U.S. Cl.
CPC .............. *G06T 15/06* (2013.01); *G06T 15/08* (2013.01); *G06T 17/00* (2013.01); *G06T 19/006* (2013.01); *G06T 19/20* (2013.01); *G06T 2200/24* (2013.01); *G06T 2210/12* (2013.01); *G06T 2219/004* (2013.01); *G06T 2219/2004* (2013.01)

(58) Field of Classification Search
None
See application file for complete search history.

(56) References Cited

U.S. PATENT DOCUMENTS

| | | |
|---|---|---|
| 9,063,330 B2 | 6/2015 | LaValle et al. |
| 9,964,409 B1 | 5/2018 | Flint et al. |

(Continued)

FOREIGN PATENT DOCUMENTS

| | | |
|---|---|---|
| EP | 3419286 A1 | 12/2018 |
| WO | 2013155217 A1 | 10/2013 |

(Continued)

OTHER PUBLICATIONS

Balntas V., et al., "HPatches: A Benchmark and Evaluation of Handcrafted and Learned Local Descriptors," Computer Vision and Pattern Recognition (CVPR), Apr. 19, 2017, arXiv:1704.05939v1 [cs.CV], 10 Pages.

(Continued)

*Primary Examiner* — Kyle Zhai
(74) *Attorney, Agent, or Firm* — Dannon G. Allbee

(57) ABSTRACT

In particular embodiments, a computing system may initiate a scene alignment process to align a previous map of a scene with a current map of the scene. The system may send instructions to a user wearing an artificial-reality system to select a set of entities in the scene. The system may receive a selection of the set of entities in the scene. The system may determine a particular point in the scene based on an intersection of selected set of entities. The system may align the previous map with the current map based on the particular point in the scene. The system may load a scene model associated with the previous map into the current map.

20 Claims, 31 Drawing Sheets
(19 of 31 Drawing Sheet(s) Filed in Color)

(56) References Cited

U.S. PATENT DOCUMENTS

| | | |
|---|---|---|
| 10,338,392 B2 | 7/2019 | Kohler et al. |
| 10,346,623 B1 | 7/2019 | Brandwine et al. |
| 10,466,953 B2 | 11/2019 | Eade et al. |
| 10,657,701 B2 | 5/2020 | Osman et al. |
| 11,024,079 B1* | 6/2021 | Chuah .................... G06T 7/246 |
| 11,158,130 B1 | 10/2021 | Rubaiat Habib et al. |
| 11,222,468 B1 | 1/2022 | Lovegrove et al. |
| 11,295,460 B1* | 4/2022 | Aghdasi .................... G06T 7/97 |
| 11,481,925 B1 | 10/2022 | Li et al. |
| 11,670,045 B2 | 6/2023 | Zhang et al. |
| 2005/0249426 A1 | 11/2005 | Badawy |
| 2012/0300020 A1 | 11/2012 | Arth et al. |
| 2012/0306850 A1 | 12/2012 | Balan et al. |
| 2014/0267234 A1 | 9/2014 | Hook et al. |
| 2015/0029218 A1 | 1/2015 | Williams et al. |
| 2015/0062125 A1 | 3/2015 | Aguilera Perez et al. |
| 2015/0331970 A1 | 11/2015 | Jovanovic |
| 2016/0364912 A1 | 12/2016 | Cho et al. |
| 2017/0115488 A1 | 4/2017 | Ambrus et al. |
| 2017/0243403 A1 | 8/2017 | Daniels et al. |
| 2017/0337749 A1 | 11/2017 | Nerurkar et al. |
| 2017/0345167 A1 | 11/2017 | Ard et al. |
| 2018/0053329 A1 | 2/2018 | Roberts et al. |
| 2018/0122139 A1 | 5/2018 | Janzer et al. |
| 2018/0143023 A1 | 5/2018 | Bjorke et al. |
| 2018/0143756 A1 | 5/2018 | Mildrew et al. |
| 2018/0144547 A1 | 5/2018 | Shakib et al. |
| 2018/0232937 A1 | 8/2018 | Moyer et al. |
| 2019/0026956 A1 | 1/2019 | Gausebeck et al. |
| 2019/0051054 A1 | 2/2019 | Jovanovic et al. |
| 2019/0236842 A1 | 8/2019 | Bennett et al. |
| 2019/0287311 A1 | 9/2019 | Bhatnagar et al. |
| 2020/0066046 A1 | 2/2020 | Stahl et al. |
| 2020/0099954 A1 | 3/2020 | Hemmer et al. |
| 2020/0175764 A1 | 6/2020 | Romea et al. |
| 2020/0250879 A1 | 8/2020 | Foster et al. |
| 2020/0302681 A1 | 9/2020 | Totty et al. |
| 2020/0364901 A1 | 11/2020 | Choudhuri et al. |
| 2021/0056762 A1 | 2/2021 | Robbe et al. |
| 2021/0304509 A1 | 9/2021 | Berkebile |
| 2021/0326026 A1 | 10/2021 | Osipov et al. |
| 2022/0043446 A1 | 2/2022 | Ding et al. |
| 2022/0122285 A1 | 4/2022 | Suleiman et al. |
| 2022/0130064 A1* | 4/2022 | Tomar .................... G06T 19/006 |
| 2022/0254207 A1 | 8/2022 | Billy et al. |
| 2022/0269885 A1 | 8/2022 | Wixson et al. |
| 2023/0127307 A1 | 4/2023 | Noris et al. |
| 2023/0237692 A1 | 7/2023 | Alaghi et al. |

FOREIGN PATENT DOCUMENTS

| | | |
|---|---|---|
| WO | 2015192117 A1 | 12/2015 |
| WO | 2021010660 A1 | 1/2021 |
| WO | 2021188741 A1 | 9/2021 |

OTHER PUBLICATIONS

International Preliminary Report on Patentability for International Application No. PCT/US2022/047864, mailed May 10, 2024, 12 pages.

International Preliminary Report on Patentability for International Application No. PCT/US2023/011579, mailed Aug. 8, 2024, 10 pages.

International Search Report and Written Opinion for International Application No. PCT/US2020/027763, mailed Jul. 23, 2020, 12 Pages.

International Search Report and Written Opinion for International Application No. PCT/US2022/052472, mailed Apr. 17, 2023, 11 pages.

International Search Report and Written Opinion for International Application No. PCT/US2023/011579, mailed May 17, 2023, 12 pages.

Morrison J. G., et al., "Scalable Multirobot Localization and Mapping with Relative Maps: Introducing Moarslam," IEEE Control Systems, vol. 36, No. 2, Apr. 1, 2016, pp. 75-85.

Mur-Artal R., et al., "ORB-SLAM: a Versatile and Accurate Monocular SLAM System," IEEE Transactions on Robotics, Sep. 18, 2015, arXiv:1502.00956v2 [cs.RO], 18 Pages, DOI: 10.1109/TRO. 2015.2463671.

Tian Y., et al., "SOSNet: Second Order Similarity Regularization for Local Descriptor Learning," Computer Vision and Pattern Recognition (CVPR), Dec. 16, 2019, arXiv:1904.05019v2 [cs.CV], 10 Pages.

International Search Report and Written Opinion for International Application No. PCT/US2022/047864, mailed Apr. 6, 2023, 15 pages.

* cited by examiner

LOCALIZATION FAILURE HANDLING ON ARTIFICIAL REALITY SYSTEMS

PRIORITY

This application claims the benefit, under 35 U.S.C. § 119(e), of U.S. Provisional Patent Application No. 63/272,092, filed 26 Oct. 2021, which is incorporated herein by reference.

TECHNICAL FIELD

This disclosure generally relates to generating, querying, and managing a scene model on artificial-reality systems.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality. Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers.

SUMMARY OF PARTICULAR EMBODIMENTS

Embodiments described herein relate to generating, querying, and managing a scene model. The scene model is an objective (e.g., single source of truth), system-managed, comprehensive, and an up-to-date representation of a user's physical or real world that may be easily indexable and queryable. The scene model may describe static geometry and semantics of the real world. In particular embodiments, the scene model may be composed of a plurality of anchors, where each anchor represents a plane, surface, or an object in a user's physical environment (e.g., user's living room). In some embodiments, the scene model discussed herein may be in the form of a scene graph or hierarchical tree structure comprising of the set of anchors, where each anchor corresponds to an entity in the user's physical environment. These anchors may include, for example, (1) a bounded2D and semanticlabels component to represent a plane (e.g., floor, wall, ceiling, etc.) (2) a bounded3D and semanticlabels component to represent an object (e.g., desk, chair, couch), and (3) a roomlayout and container component to represent an overall scene (e.g., room).

In particular embodiments, a scene model may be generated using a scene capture workflow (also interchangeable herein referred to as scene capture user flow or a scene capture process). The scene capture workflow may be implemented on or initiated using an artificial-reality system. The artificial-reality system may be a virtual reality (VR) or an augmented reality (AR) headset or a mixed reality system. For instance, when a user wears the artificial-reality system, an application running on the system may initiate a scene capture workflow to generate a scene model for a particular scene (e.g., user's living room) that the user is located in. In particular embodiments, the scene capture workflow is a guided experience that helps the user look around and capture different entities, including one or more planes or surfaces (e.g., walls, ceiling, floor, door, windows, etc.) and one or more objects (e.g., couch, desk, chair, tv, lamp, plant, etc.). As an example and without limitation, the scene capture workflow may be initiated on a VR headset that guides a user wearing the headset to capture the different planes and/or objects in their environment by providing a specific set of instructions. The captured planes or surfaces may be defined or represented as two dimensional (2D) bounded boxes and the captured objects may be defined or represented as three dimensional (3D) bounded boxes or volumes. Based on the captured planes, surfaces, or objects using the scene capture workflow, a scene model may be generated.

In particular embodiments, the scene model generated using the scene capture workflow may be used by users (e.g., third-party users or developers) to create artificial reality or mixed reality (e.g., AR, VR) experiences that leverage a rich understanding of the user's environment. For instance, developers may query the scene model to build experiences that have rich interactions with the user's physical or real environment. Thus, developers do not need to worry about building or capturing their own scene models from scratch. In particular embodiments, a third-party user or a third-party application may be able to use or query an existing scene model to easily create complex, responsive, and scene-aware experiences that intelligently adapt to the real world. As an example and without limitation, a developer or a third-party application may query and use the scene model to add one or more AR elements to the user's physical environment. In particular embodiments, an application (e.g., third-party application) or a third-party user (e.g., developer) may query the system via an application programming interface (API) for certain elements or entities (e.g., planes, objects) of a particular scene model. If the requested scene model is present or already generated, then the system may provide the scene model to the application or the developer. Otherwise, if no pre-existing scene model is present, then the system may invoke the scene capture workflow to generate a scene model.

In particular embodiments, a scene model is built on top of anchors, which may correspond to or be associated with different entities of a scene. Anchors may be localized only when the map they come from is localized. In some embodiments, when a scene model is queried, certain anchors of the scene model may not be found or located. Such a situation leads to a localization failure. Failure in relocalization makes it difficult to retrieve the anchors and hence the scene description. In particular embodiments, a scene realignment solution is provided to mitigate the localization failure discussed herein. The key idea for this mitigation is to rely on users to indicate that they are in a space they have already manually tagged and ask them to provide enough information for knowing how to align a cache of the room they tagged earlier into a current map. For instance, if a desired room that an application is looking for is not found or associated with the current map, then the user may be asked to identify one or more entities (e.g., walls) of the room they are in. Particularly, the user may be asked to identify an entity that is not subject to change or relocate, such as a wall. Also, if there are multiple caches of the room (e.g., multiple previously saved rooms or room caches), then the user may be asked to identify a particular room cache to load. Based on the user identified entities and/or the room cache, the system (e.g., artificial-reality system) may align a previously saved or cached room and load it into the current map. Therefore, the scene realignment solution is able to mitigate the localization failure based on few user inputs without having the user to go through the entire scene capture process again.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Figure 1:
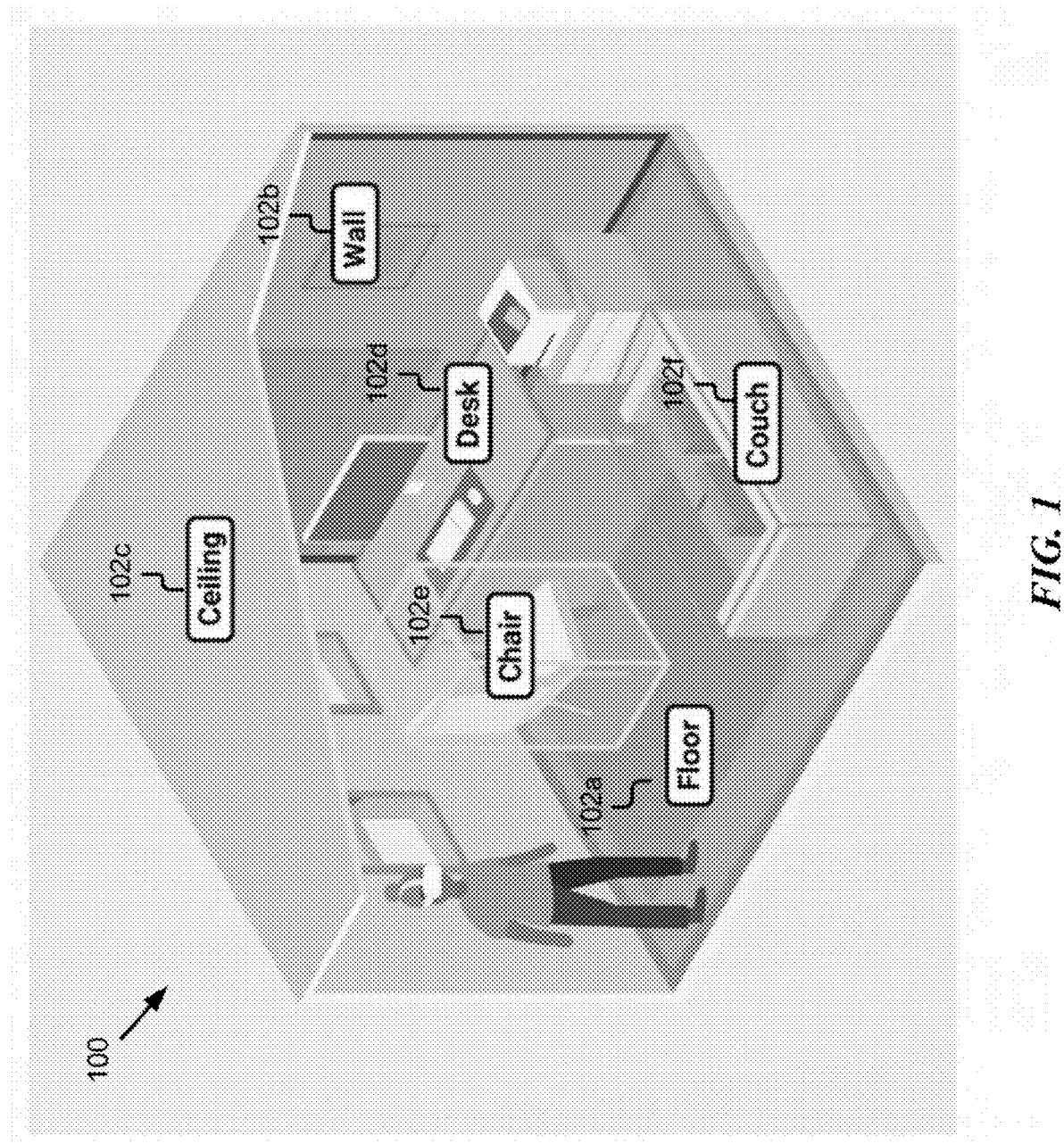
FIG. 1 illustrates an example scene that may be associated with a scene model.

Embodiments described herein relate to generating, querying, and managing a scene model. The scene model is an objective (e.g., single source of truth), system-managed, comprehensive, and an up-to-date representation of a user's physical or real world that may be easily indexable and queryable. The scene model may describe static geometry and semantics of the real world. In particular embodiments, the scene model may be composed of a plurality of anchors, where each anchor represents a plane, surface, or an object in a user's physical environment. FIG. 1 illustrates an example scene 100 that may be associated with a scene model. As depicted, the scene 100 includes different entities 102a-102f (individually or collectively referred to as 102) present in a user's physical environment, such as the user's living room. A set of anchors may be created for these entities 102a-102f. In some embodiments, the scene model discussed herein may be in the form of a scene graph (e.g., scene graph 300 shown in FIG. 3) or hierarchical tree structure comprising of the set of anchors, where each anchor corresponds to an entity, such as entity 102. These anchors may contain, for example, (1) a bounded2D and semanticlabels component to represent a plane (e.g., floor 102a, wall 102b, ceiling 102c) (2) a bounded3D and semanticlabels component to represent an object (e.g., desk 102d, chair 102e, couch 102f), and (3) a roomlayout and container component to represent the overall room (e.g., scene 100).

In particular embodiments, a scene model may be generated using a scene capture workflow (also interchangeable herein referred to as scene capture user flow or a scene capture process). The scene capture workflow may be implemented on or initiated using an artificial-reality system, such as artificial-reality system 200. The artificial-reality system 200 may be a virtual reality (VR) or an augmented reality (AR) headset or a mixed reality system. For instance, when a user wears the artificial-reality system, an application running on the system may initiate a scene capture workflow to generate a scene model for a particular scene (e.g., scene 100) that the user is located in. In particular embodiments, the scene capture workflow is a guided experience that helps the user look around and capture different entities (e.g., entities 102a-102f), including one or more planes or surfaces (e.g., walls, ceiling, floor, door, windows, etc.) and one or more objects (e.g., couch, desk, chair, tv, lamp, plant, etc.). As an example and without limitation, the scene capture workflow may be initiated on a VR headset (e.g., artificial-reality system 200) that guides a user wearing the headset to capture the different planes and/or objects in their environment by providing a specific set of instructions. The captured planes or surfaces may be defined or represented as two dimensional (2D) bounded boxes and the captured objects may be defined or represented as three dimensional (3D) bounded boxes or volumes. Based on the captured planes, surfaces, or objects using the scene capture workflow, a scene model may be generated, as discussed elsewhere herein.

The scene capture workflow may be either a manual scene capture workflow or an assisted scene capture workflow. In the manual scene capture workflow, a user is provided with guided step-by-step instructions through a manual tagging flow to capture the different entities in the user's physical environment (e.g., user's room). One such example manual scene capture workflow is shown and discussed with respect to at least FIGS. 4A4B. The user may capture these entities using raycast from a controller (e.g., controller 206) of an artificial-reality system (e.g., artificial-reality system 200). For instance, the user may be instructed to put a point at a particular location by casting/shooting a ray using their controller towards that location in order to capture an entity. The user may be able to easily, quickly, safely, and accurately capture planes with 2D surfaces (e.g., walls, floor) and objects with 3D volumes (e.g., desk, couch, table, chair, etc.). These captured planes and objects may be annotated with semantic labels. The user may be able to edit the captured elements if needed.

In the assistant scene capture workflow, instead of the user defining each and every entity in the room, some of the entities may be automatically detected or recognized by the artificial-reality system. For instance, planes may be detected using a plane detection or understanding technology and objects in the room may be detected using an object recognition technology. Specifically, the user may be instructed to select walls in their environment. Their walls may be automatically detected when the user is within a certain threshold (e.g., approx. 2 meters) of the wall. The user may then be able to point at the wall and add it to their layout with a raycast from a controller (e.g., controller 206) of the artificial-reality system. After each of the user's walls has been added, their room layout may be calculated and revealed.

In particular embodiments, the scene model generated using the scene capture workflow may be used by users (e.g., third-party users or developers) to create artificial reality or mixed reality (e.g., AR, VR) experiences that leverage a rich understanding of the user's environment. For instance, developers may query the scene model to build experiences that have rich interactions with the user's physical or real environment. Thus, developers do not need to worry about building or capturing their own scene models from scratch. In particular embodiments, a third-party user or a third-party application may be able to use or query an existing scene model to easily create complex, responsive, and scene-aware experiences that intelligently adapt to the real world. In particular embodiments, an application (e.g., third-party application) or a third-party user (e.g., developer) may query the system (e.g., artificial-reality system 200) via an application programming interface (API) for certain elements or entities (e.g., planes, objects) of a particular scene model. If the requested scene model is present or already generated, then the system may provide the scene model to the application or the developer. Otherwise, if no pre-existing scene model is present, then the system may invoke the scene capture workflow to generate a scene model, as discussed elsewhere herein.

In particular embodiments, a scene model is built on top of anchors, which may correspond to or be associated with different entities of a scene (e.g., scene 100). Anchors may be localized only when the map they come from is localized. In some embodiments, when a scene model is queried, certain anchors of the scene model may not be found or located. Such a situation leads to a localization failure. Failure in relocalization makes it difficult to retrieve the anchors and hence the scene description. From a user perspective, this means losing all the scene capture work (e.g., manual marking of different entities) they have done, and either having to return at a later time, or have to re-do the scene capture process again. Such a localization failure may lead to a user re-drawing or re-generating the scene model and is a source of frustration for many users. This problem may be significantly worse when a user needs to create a full scene model, which could take several minutes to set up. As users invest increased time to set up their virtual environments, there is an implicit expectation that their virtual environment and any content within it may be persisted and recovered across sessions.

In particular embodiments, a scene realignment solution is provided to mitigate the localization failure discussed herein. The key idea for this mitigation is to rely on users to indicate that they are in a space they have already manually tagged, and ask them to provide enough information for knowing how to align a cache of the room they tagged earlier into a current map. For instance, if a desired room that an application is looking for is not found or associated with the current map, then the user may be asked to identify one or more entities (e.g., walls) of the room they are in. Particularly, the user may be asked to identify an entity that is not subject to change or relocate, such as a wall. Also, if there are multiple caches of the room (e.g., multiple previously saved rooms or room caches), then the user may be asked to identify a particular room cache to load. Based on the user identified entities and/or the room cache, the system (e.g., artificial-reality system 200) may align a previously saved or cached room and load it into the current map. Therefore, the scene realignment solution is able to mitigate the localization failure based on few user inputs without having the user to go through the entire scene capture process again.

Example Artificial-Reality System

Figure 2:
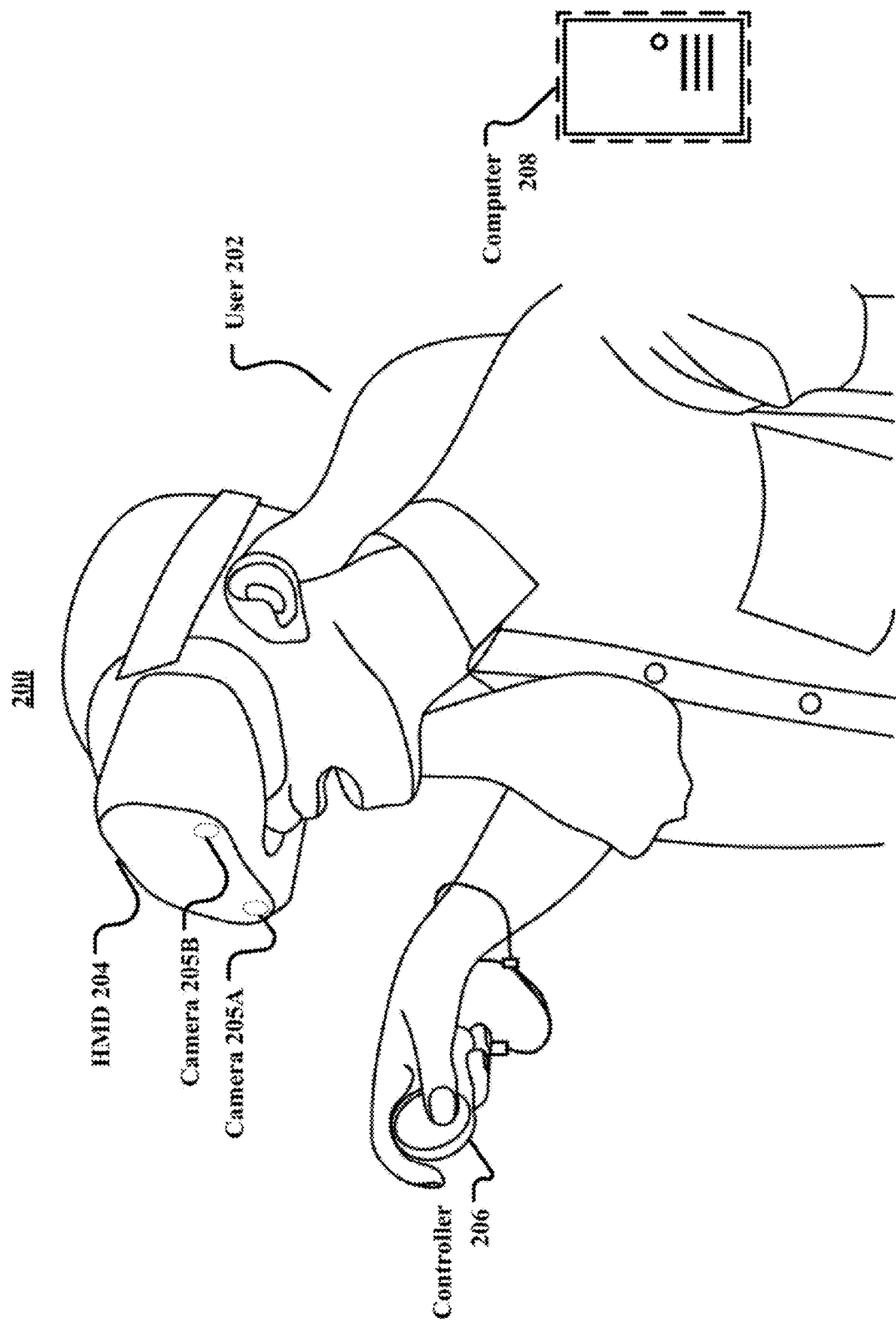
FIG. 2 illustrates an example of an artificial reality system worn by a user.

FIG. 2 illustrates an example of an artificial reality system 200 worn by a user 202. The artificial-reality system 200 may be used to implement some of the embodiments/examples disclosed herein. The artificial-reality system 200 may be configured to operate as a virtual reality display, an augmented reality display, and/or a mixed reality display. In particular embodiments, the artificial reality system 200 may comprise a head-mounted device ("HMD") 204, a controller 206, and a computing system 208. The HMD 204 may be worn over the user's eyes and provide visual content to the user 202 through internal displays (not shown). The HMD 204 may have two separate internal displays, one for each eye of the user 202. As illustrated in FIG. 2, the HMD 204 may completely cover the user's field of view. By being the exclusive provider of visual information to the user 202, the HMD 204 achieves the goal of providing an immersive artificial-reality experience. In particular embodiments, the HMD 204 may be configured to present a view of the user's surrounding or external physical environment as one or more passthrough images (e.g., user 202 while wearing the HMD 204 may still be able to see the outside physical environment). As an example and without limitation, the scene 100, including the entities 102a-102f, may be provided as a passthrough image to the user 202.

The HMD 204 may have external-facing cameras, such as the two forward-facing cameras 205A and 205B shown in FIG. 2. While only two forward-facing cameras 205A-B are shown, the HMD 204 may have any number of cameras facing any direction (e.g., an upward-facing camera to capture the ceiling or room lighting, a downward-facing camera to capture the floor or a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video).

The 3D representation may be generated based on depth measurements of physical objects observed by the cameras 205A-B. Depth may be measured in a variety of ways. In particular embodiments, depth may be computed based on stereo images. For example, the two forward-facing cameras 205A-B may share an overlapping field of view and be configured to capture images simultaneously. As a result, the same physical object may be captured by both cameras 205A-B at the same time. For example, a particular feature of an object may appear at one pixel $p_A$ in the image captured by camera 205A, and the same feature may appear at another pixel $p_B$ in the image captured by camera 205B. As long as the depth measurement system knows that the two pixels correspond to the same feature, it could use triangulation techniques to compute the depth of the observed feature. For example, based on the camera 205A's position within a 3D space and the pixel location of $p_A$ relative to the camera 205A's field of view, a line could be projected from the camera 205A and through the pixel $p_A$. A similar line could be projected from the other camera 205B and through the pixel $p_B$. Since both pixels are supposed to correspond to the same physical feature, the two lines should intersect. The two intersecting lines and an imaginary line drawn between the two cameras 205A and 205B form a triangle, which could be used to compute the distance of the observed feature from either camera 205A or 205B or a point in space where the observed feature is located.

In particular embodiments, the pose (e.g., position and orientation) of the HMD 204 within the environment may be needed. For example, in order to render the appropriate display for the user 202 while he is moving about in a virtual environment, the system 200 would need to determine his position and orientation at any moment. Based on the pose of the HMD, the system 200 may further determine the viewpoint of either of the cameras 205A and 205B or either of the user's eyes. In particular embodiments, the HMD 204 may be equipped with inertial-measurement units ("IMU"). The data generated by the IMU, along with the stereo imagery captured by the external-facing cameras 205A-B, allow the system 200 to compute the pose of the HMD 204 using, for example, SLAM (simultaneous localization and mapping) or other suitable techniques.

In particular embodiments, the artificial reality system 200 may further have one or more controllers 206 that enable the user 202 to provide inputs. The controller 206 may communicate with the HMD 204 or a separate computing unit 208 via a wireless or wired connection. The controller 206 may have any number of buttons or other mechanical input mechanisms. In addition, the controller 206 may have an IMU so that the position of the controller 206 may be tracked. The controller 206 may further be tracked based on predetermined patterns on the controller. For example, the controller 206 may have several infrared LEDs or other known observable features that collectively form a predetermined pattern. Using a sensor or camera, the system 200 may be able to capture an image of the predetermined pattern on the controller. Based on the observed orientation of those patterns, the system may compute the controller's position and orientation relative to the sensor or camera.

The artificial reality system 200 may further include a computer unit 208. The computer unit may be a stand-alone unit that is physically separate from the HMD 204 or it may be integrated with the HMD 204. In embodiments where the computer 208 is a separate unit, it may be communicatively coupled to the HMD 204 via a wireless or wired link. The computer 208 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 200 depends on the capabilities of its computer unit 208.

Scene Model

In particular embodiments, the artificial-reality system 200 may be used to generate a scene model. For instance, an application running on the artificial-reality system 200 may present a system-guided scene capture flow a user (e.g., user 202) to generate the scene model. The generated scene model may be stored in a memory of the artificial-reality system 200. The scene capture flow is discussed in detail below with respect to a separate subsection titled "scene capture" within this disclosure. As discussed elsewhere herein, the scene model is an objective (e.g., single source of truth), system-managed, comprehensive, and an up-to-date representation of the user's surrounding real or physical environment that may be easily indexable and queryable. The scene model may describe static geometry and semantics of the real world. As an example, the scene model may be able to represent a typical single room, such as a living room, a bedroom, an office, etc. One such example scene representing a room is shown in FIG. 1.

In particular embodiments, the scene model may be composed of a plurality of anchors, and each of the anchors may be attached with various planes, surfaces, or objects of the physical environment. The scene model may store up to a certain number of anchors, such as, for example, 30 anchors corresponding to the planes and objects in the user's physical environment. The planes or surfaces in the physical environment (e.g., living room) may be two-dimensional entities, such as walls, ceilings, windows, doors, etc. The objects in the physical environment (e.g., living room) may be three-dimensional entities, such as desk, couch, table, art, cabinet, plant, lamp, tv, etc. In particular embodiments, these planes and objects may be user defined. For instance, the user wearing the artificial-reality system 200 may go through a system-guided scene capture flow to define these planes, surfaces, or objects in the user's physical surrounding environment (e.g., user's living room), as discussed in the "scene capture" section within this disclosure.

In particular embodiments, the system (e.g., artificial-reality system 200) may create an anchor for each of the user-defined planes, surfaces, or objects. By way of an example and without limitation, for the six entities 102a-102f shown in FIG. 1, the system may create an anchor for floor, an anchor for wall, an anchor for ceiling, an anchor for desk, an anchor for chair, and an anchor for couch. In some embodiments, one or more plane anchors may be associated with one or more 2D planes or surfaces (e.g., wall, ceiling, floor, door, window, etc.) and one or more object anchors may be associated with one or more 3D objects (e.g., couch, chair, lamp, desk, etc.). Each anchor associated with a plane and/or an object may include its component type defining geometric representation (e.g., 2D boundary or 3D bounding box) as well as a semantic label or category indicating what that plane/object represents (e.g., floor, ceiling, walls, desk, couch, etc.). In some embodiments, users (e.g., developers) may modify a scene model including the anchors as per their needs. For instance, the developers may create or keep only plane and object anchors without the existence of entire scene model if they just want to detect and track a plane/object in front of the user at runtime. In some embodiments, an anchor may be able to hold or associate multiple elements belonging to the same semantic category. For example, 2 couches in the room may be associated with a single anchor. As another example, 5 walls may be associated with a first anchor and 2 desktops may be associated with a second anchor.

In particular embodiments, following example component types and semantic categories may be associated with planes and objects via anchors in a scene model:

Planes (Surfaces)
  Example component types: 2D Boundary (Polygon), Clutter (Heightmap), 3D Mesh, Semantic Label, User Surface (to distinguish Surface from Plane)
  Example semantic categories: Floor, Ceiling, Wall, Door, Window, Desktop, Tabletop, Couchtop, Whiteboard, Custom Label
Objects (Volumes)
  Example component types: 3D Bounding Box, 3D Mesh, Semantic Label, User Volume (to distinguish Volumes from Objects)
  Example semantic categories: Desk, Couch, Table, Art, Cabinet, Shelf, Plant, Lamp, TV, Bed, Side Table, Wardrobe, Custom Label In particular embodiments, the system (e.g., artificial-reality system 200) may create individual anchors or a collection of anchors for the following:

2D Planes (surfaces)—creates plane anchors. Surfaces may be user-defined planes (e.g., walls, floor, table surface, etc.). In some embodiments, the planes may be represented as 2D Boundary.
3D Objects—creates object anchors. A volume may be created for a user-defined object (e.g., chair, desk, couch, etc.). In some embodiments, the objects may be represented as 3D bounding box or 3D meshes.
Room Layout—collection of specific types of planes that make up a room box (e.g., floor, ceiling, wall, door, window, etc.).
Room Boundary—collection of an enclosed sequence of walls.
Scene Model—entire collection of planes (surfaces) and objects (volumes) in a scene.

In some embodiments, following may be associated with a scene model:

Components:
  Bounded2D Component—for a 2D bounding box (e.g., planes).
  Bounded3D Component—for a 3D bounding box (e.g., objects).
  SemanticLabels Component—semantic labels or categories assigned to objects. In some instances, up to 16 semantic labels may be provided as strings.
  RoomLayout Component—a list of entities (e.g., stored as UUIDs) that make up a room, such as walls, floor, ceiling, etc.
  Entity Container Component—a list of entities (e.g., stored as UUIDs) contained in a room (e.g., a room may be defined by a user, which does not have to correspond to a single physical room).

Anchor/entity Types:
  PlaneAnchor=XrSpace+Locatable+Storable+SemanticLabels+{either one of Bounded2D or Bounded3D}+(other components, such as Sharable, HeightMap, and PolygonalBoundary). In some instances, plane anchor may be used to a represent a 2D plane or 3D object.
  RoomEntity=XrSpace+Storable+RoomLayout+EntityContainer+(other components, such as Sharable). In some instances, room entity may be used to represent a room.

Semantic Types: E.g., Floor, Ceiling, Wall, Desk, Couch, Table, Screen, Window, Door, Art, Cabinet, Shelf, Plant, Lamp, TV, Bed, Coffee Table, Wardrobe, Generic.

In some embodiments, there may only be a single scene model for a single specific map. The single scene model may include, for example, 1 floor, 1 ceiling, and approximately 100 other elements, including walls, planes, objects, etc. However, it should be understood that this is not limiting, and additional elements may be included in the scene model. For instance, the limit may be increased due to a change in how query results are returned. Also, additional spatial anchors or other anchors may be defined separately from the scene model (including plane anchors), because they are supposed to be queried separately.

Figure 3:
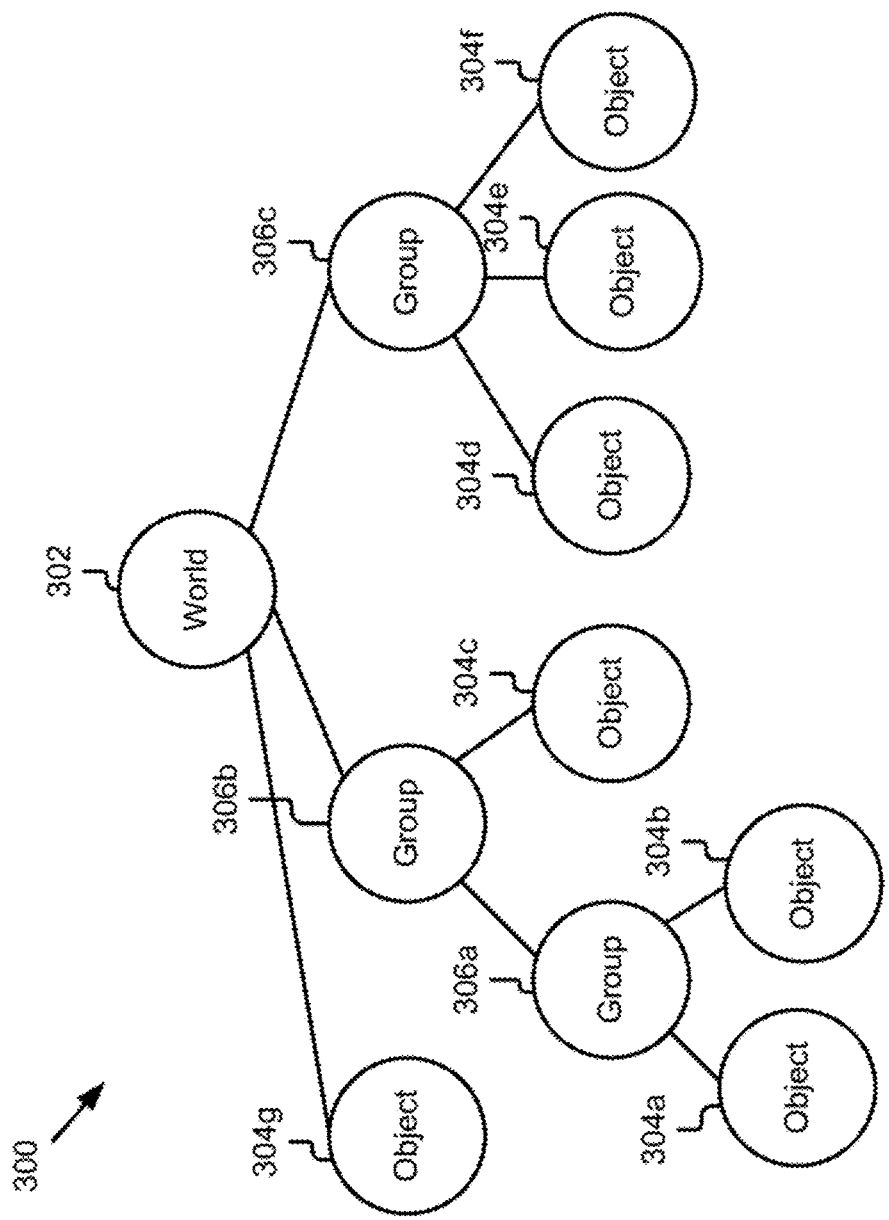
FIG. 3 illustrates an example scene graph.

In some embodiments, a scene model discussed herein is like a scene graph. The scene graph may be a structed spatial logical hierarchy with scene-related information organized at various levels in the hierarchy. FIG. 3 illustrates an example scene graph 300. In particular embodiments, users (e.g., developers) may be able to query or interact with a scene graph (e.g., scene graph 300) via a set of semantic queries. As shown in FIG. 3, the scene graph 300 represents scene-related information of a real world 302, which may include a plurality of objects 304*a*-304*g* (individually or collectively herein referred to as 304) and a plurality of groups 306*a*-306*c* (individually or collectively herein referred to as 306). Two or more objects 304 may be grouped together to form a group 306 to represent a larger space or part of the world 302. By way of an example and without limitation, the world 302 may be a house of a user, where different groups 306 may represent different rooms of the house and each group 306 (e.g., room) may include one or more of sub-group(s) or object(s) (e.g., bed, tv, lamp, wall art, couch, etc.) to represent things that are part of that room.

In some embodiments, a list of objects 304 in the scene graph 300 may be categorized with semantic meanings and organized by spatial relationships. In some embodiments, rest of the world may be kept as an uncategorized mesh to keep the world watertight for physics or occlusion. Each object in a scene graph may be composed of one or more of the following components:

The plane that a user may place virtual things on.
Mesh, which may represent the most detailed geometry.
Collider mesh, which is typically simpler and suitable to be used by physics engines.
Visual mesh, which is usually with reasonable detail suitable to be used by visualization, occlusion, etc.

In particular embodiments, a scene model may be updated at periodic time intervals to keep it up to date and to make sure that the scene model aligns accurately with the real world. In some embodiments, the system (e.g., artificial-reality system 200) may perform a manual change detection by asking a user to re-confirm the scene model every time they launch an application using the scene model for the sake of user safety. This calibration mechanism may be implemented in every session to ensure that the scene model aligns with the real world. In some embodiments, the system may perform a manual online calibration by letting the users to calibrate the scene model to improve accuracy during the experience, for example, using a controller (e.g., controller 206). In some embodiments, the system may perform an automated scene change detection using a space sense technology. The scene change detection may be performed to detect any changes in a scene and whether corresponding scene model needs to be updated. If in case the system detects some major changes in the scene, such as for example, a user changes some major elements in a room with respect to the floor (e.g., moves furniture), the system may trigger or invoke the scene capture process or workflow to re-capture the scene and then update the scene model to reflect the changes. In some embodiments, there may be no scene change detection done by the system and users are responsible for maintaining the scene model up to date.

Scene Capture

Scene capture is a process of capturing scene-related information (e.g., information associated with a scene, such as scene 100). In particular embodiments, the scene may be a user's real or physical environment in which a user is located. For example, the user may be in his living room, and therefore the scene may be the user's living room. The scene may be viewed through a display of an artificial-reality system, such as the artificial-reality system 200. For instance, the scene may be presented as a passthrough image to the user 202 wearing the artificial-reality system 200. While viewing the scene through the artificial-reality system, a set of instructions may be provided to the user. These instructions may guide the user to capture various entities present in the scene. For instance, the user may be guided to capture planes or surfaces (e.g., walls, ceiling, windows, door, etc.) and various objects (e.g., desk, couch, table, art, cabinet, plant, lamp, tv, etc.) present in the user's environment (e.g., living room). Based on the captured planes, surfaces, and objects, the system may generate a scene model, as discussed elsewhere herein.

In particular embodiments, scene capture may be performed based on a scene capture workflow. The scene capture workflow may be implemented or initiated on an artificial-reality system, such as the artificial-reality system 200. For instance, an application running on the artificial-reality system may initiate the scene capture workflow that guides the user (e.g., user 202) to perform the scene capture (e.g., capture planes, surfaces, or objects in user's surrounding environment). In some embodiments, the scene capture workflow may be initiated when a user wears the artificial-reality system and a first-party application (e.g., native application associated with the artificial-reality system by default) running on the artificial-reality system detects that a particular environment that the user is in has not been captured before. In some embodiments, the scene capture workflow may be initiated by a third-party application. For instance, a third-party application (e.g., a gaming application) running on the artificial-reality system may need a scene model of a scene in order to create an immersive AR/VR experience for the user in the third-party application. In response to determining that the scene model is not found, the third-party application may send a request to initiate the scene capture workflow. In some embodiments, the scene capture workflow may be initiated in response to a request from a third-party application or a user (e.g., developer) associated with a different system (e.g., third-party system) than the artificial-reality system. The third-party application or the user associated with the different system may send the request to the artificial-reality system (e.g., artificial-reality system 200) via an application programming interface (API). Upon receiving the request, an application on the artificial-reality system may initiate the scene capture workflow that presents a graphical user interface (GUI) on a display of the system. The GUI may present guided step-by-step instructions to the user to perform the scene capture.

In some embodiments, the scene capture workflow may be implemented as part of an existing application, service, or feature on the artificial-reality system. As an example, the existing application, service, or feature may be a built-in safety feature that lets a user to set boundaries in VR when playing a game. Specifically, the existing application presents instructions to a user wearing the artificial-reality system (e.g., VR headset) to setup a virtual play area that is free of any obstacles or objects in that area. For instance, when the user wears the artificial-reality system and plays a game for the first time, the application may present instructions to the user to create a virtual play area (e.g., a rectangular area around the user) via a controller, such as controller 206. Since the outside physical environment is hidden when the user is wearing the artificial-reality system, the virtual play area may then act as a fence to keep the user playing the game within that area. If in case the user walks out of this play area, the existing application may give a warning to the user to get back to avoid colliding with any object.

The scene capture workflow may either be a manual scene capture workflow or an assisted scene capture workflow. In the manual scene capture workflow, a user is provided with guided step-by-step instructions through a manual tagging flow to capture the different entities in the user's physical environment (e.g., user's room). In the assisted scene capture workflow, instead of the user defining each and every entity in the room, some of the entities may be automatically detected or recognized by the artificial-reality system. Each of the manual scene capture workflow and the assisted scene capture workflow is now discussed in detail below.

Manual Scene Capture Workflow

In the manual scene capture workflow, a user is provided with guided step-by-step instructions through a manual tagging flow to capture the different entities, including planes, surfaces and objects, in the user's physical environment (e.g., user's room). The user may capture these entities using raycast from a controller (e.g., controller 206) of an artificial-reality system (e.g., artificial-reality system 206). Rastcast is a technique to detect objects in an environment. In rendering, a raycast is an operation from the camera point sending out a ray to find a surface it collides with and then render the material on that surface for that pixel in the screen. Additionally, light sources may cast rays, and see if that shows a reflection on that material. In order to capture or outline an entity (e.g., a plane or an object), the user may be instructed to place a point at a particular location by casting/shooting a ray using their controller towards that location and then triggering a button on the controller to place the point at that location. Ray is where something starts at a point, and then creates a line (e.g., user may not see) in some direction away. The idea is that the cast ray follows this line to see if it collides with anything.

The user may be able to easily, quickly, safely, and accurately capture planes with 2D surfaces (e.g., walls, floor) and objects with 3D volumes (e.g., desk, couch, table, chair, etc.). These captured planes and objects may be annotated with semantic labels. The user may be able to edit the captured elements if needed.

Figure 4A:
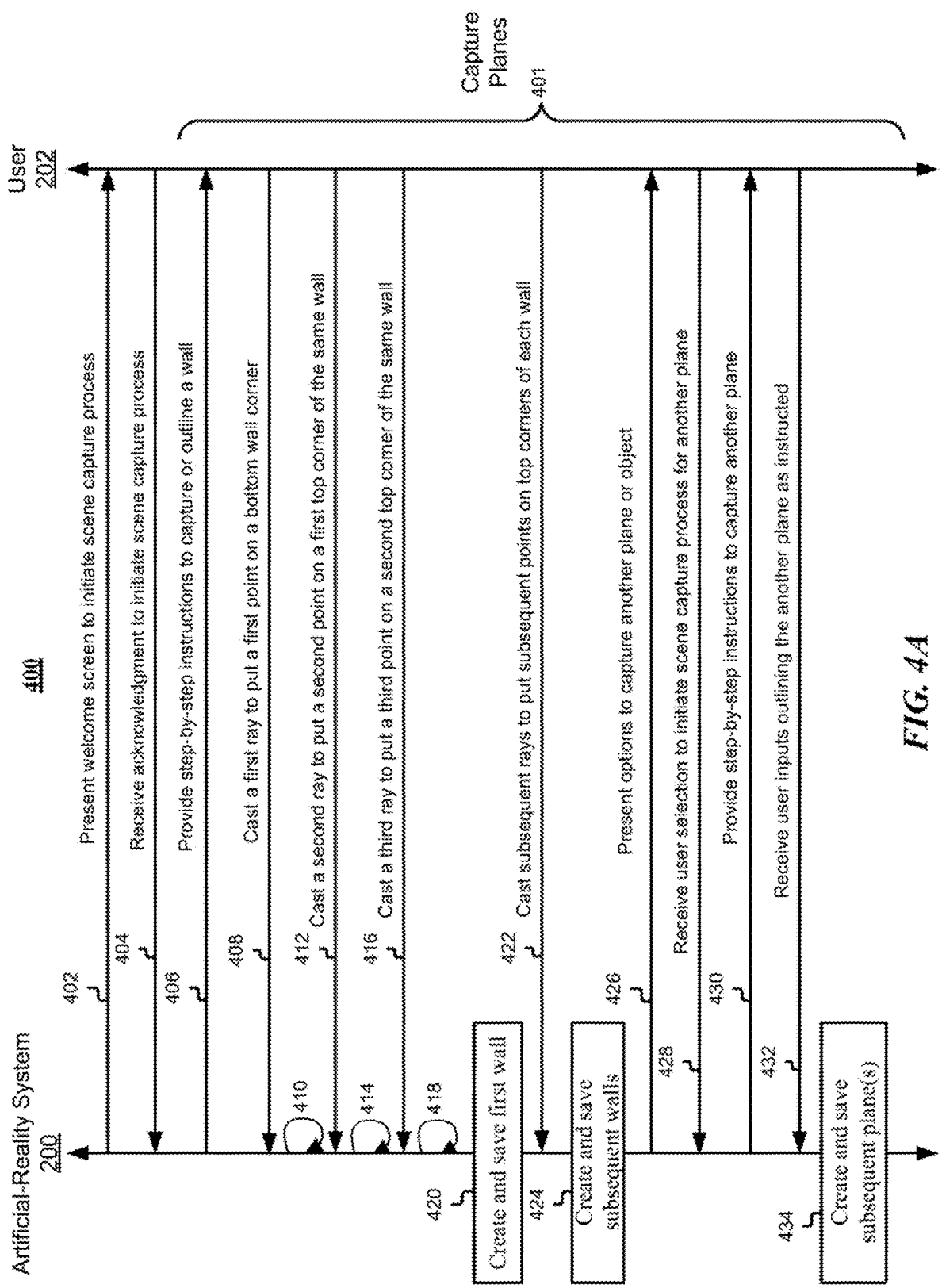
FIGS. 4A-4B illustrate an example manual scene capture workflow, in accordance with particular embodiments.
Figure 4B:
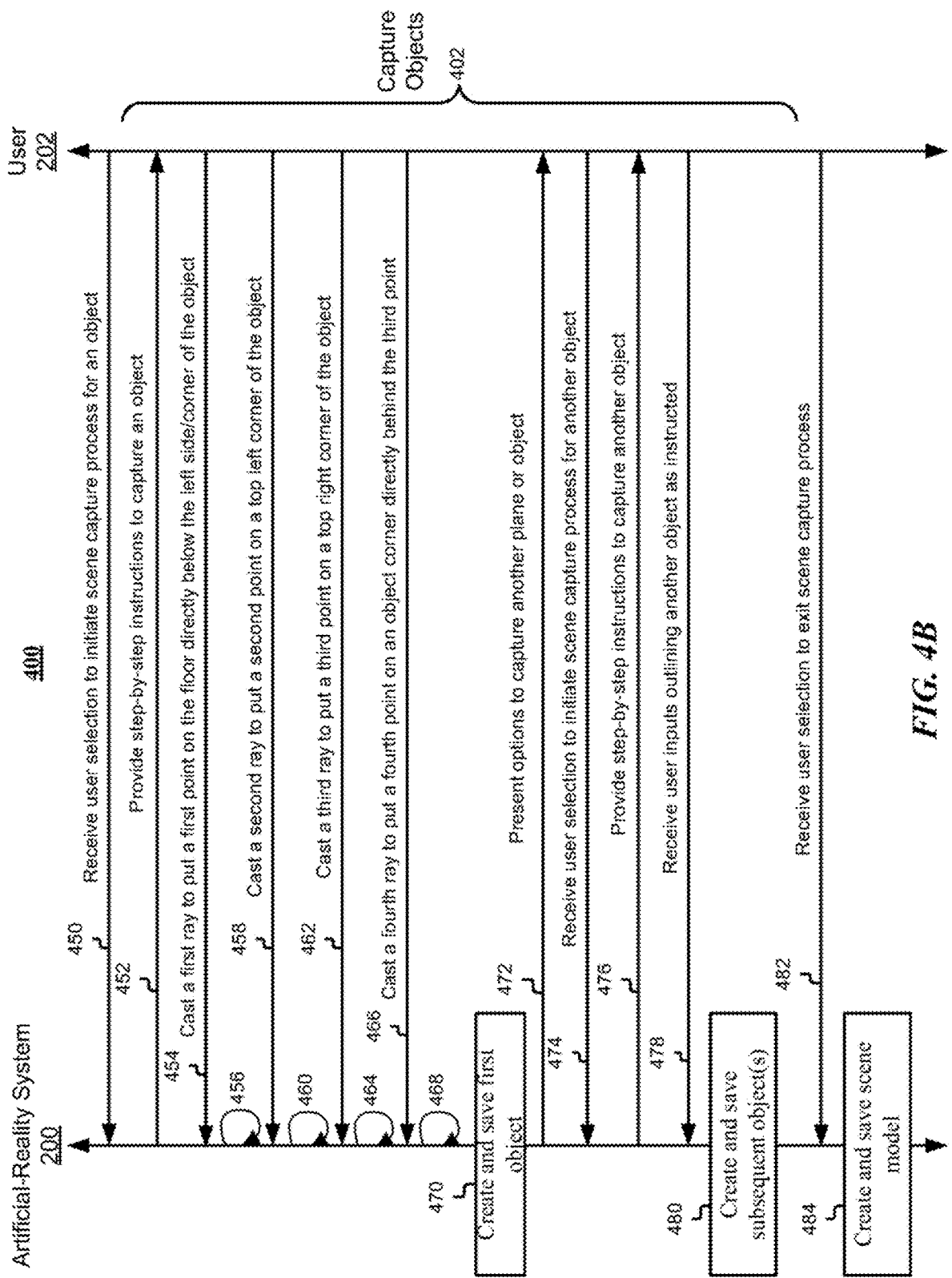

FIGS. 4A-4B illustrate an example manual scene capture workflow 400. Specifically, FIG. 4A illustrates a first example portion 401 of the manual scene capture workflow 400 to capture one or more planes in a user's physical environment (e.g., living room). As discussed elsewhere herein, the planes may include 2D entities in the environment, such as, for example, floor, walls, ceilings, tabletop, etc. The system 200 may represent these planes as 2D bounding boxes for inclusion in a scene model. Although, the first example portion 401 illustrates steps for capturing walls, it should be noted that similar steps may be performed between the artificial-reality system 200 and the user 202 to outline or capture other planes, such as doors, ceiling, floor, etc.

Figure 5A:
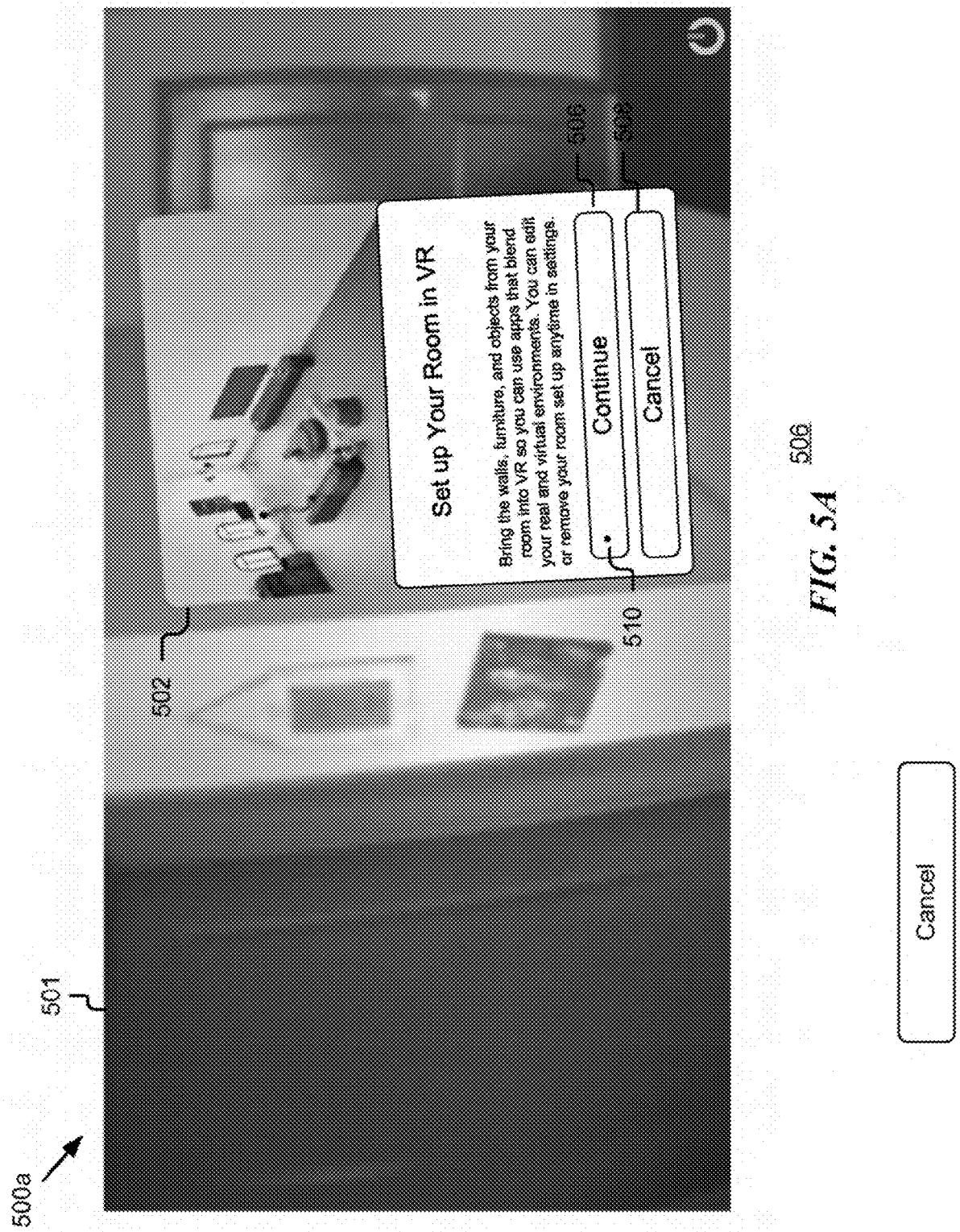
FIGS. 5A-5N illustrate example graphical user interfaces associated with a scene capture process or workflow, in accordance with particular embodiments.

In particular embodiments, the manual scene capture workflow 400 may be initiated in response to a user wearing an artificial-reality system (e.g., artificial-reality system 200) walking/entering into the room and an application (e.g., first-party application or third-party application) on the artificial-reality system determining that a scene description or room definition for the room is not present. The scene capture workflow 400 may begin, at step 402, with the artificial-reality system 200 presenting a welcome screen to the user 202 wearing the artificial-reality system 200 to initiate a screen capture process. FIG. 5A illustrates an example graphical user interface 500a that may be displayed to the user 202 to initiate the screen capture process. The graphical user interface 500a may include an image 501 and a scene-capture-assist window 502. The image 501 may be displayed as a passthrough image to the user 202. The scene-capture-assist window 502 may be displayed as an AR element on top of the image 501 that the user 202 may be currently seeing. As depicted, the screen-capture-assist window 502 may indicate to the user 202 to setup their room in VR and present two options, including a continue option 506 and a cancel option 508. The continue option 506 may initiate the scene capture process, while the cancel option 508 may cancel the process and exit the scene capture workflow 400. The user 202 may select a desired option via a controller (e.g., controller 206) by hovering over and clicking on the desired option. Once the user confirms the continue option 506 (e.g., as shown by reference numeral 510), the artificial-reality system 200 may initiate the scene capture process.

Figure 5B:
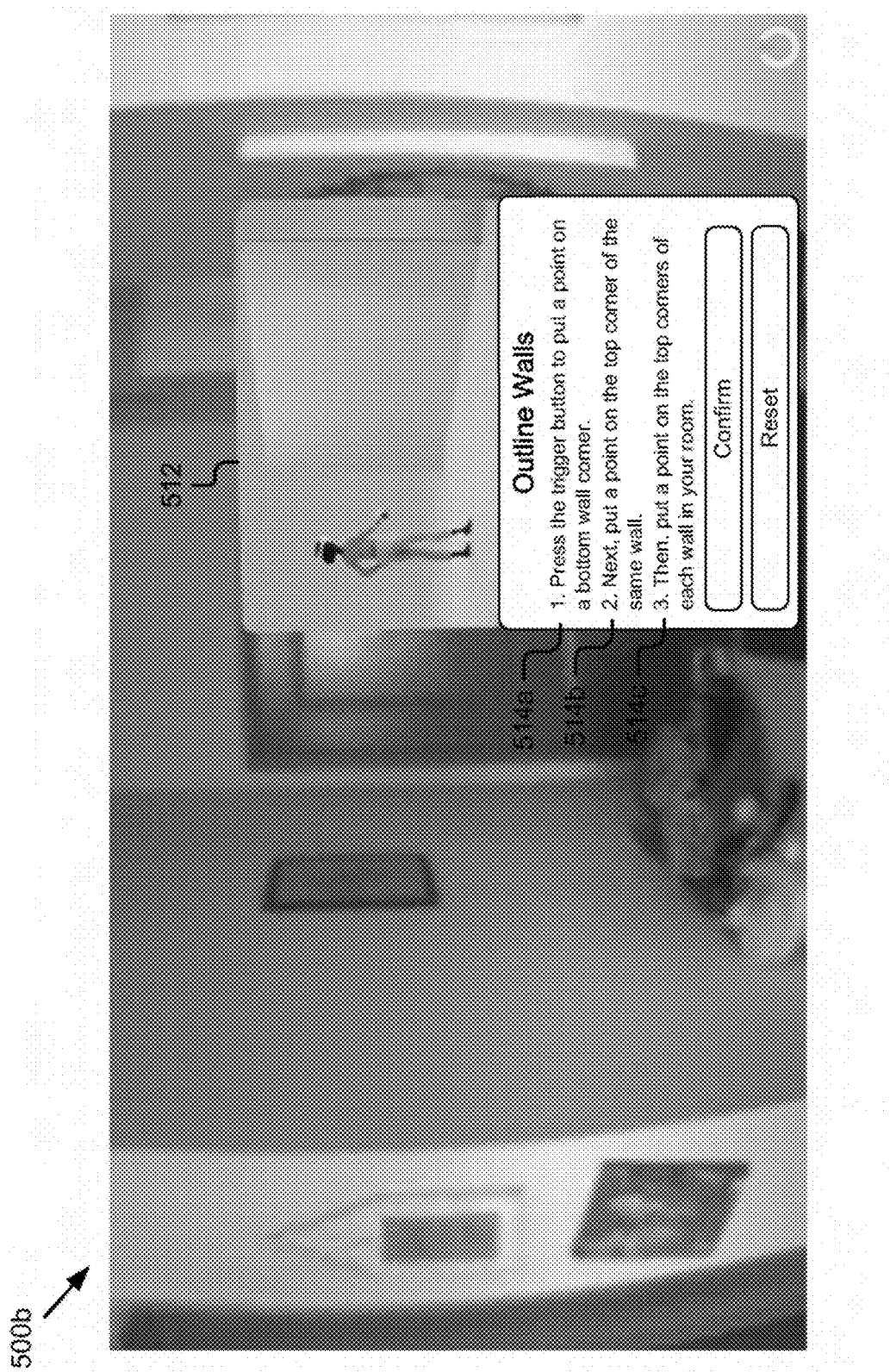

At step 404, the artificial-reality system 200 may receive acknowledgement from the user 202 to start the scene capture process. For instance, the user may acknowledge by hovering over or navigating to the continue option 506 and clicking on it (e.g., as shown by reference numeral 510) via the controller 206. Upon receiving the acknowledgement, at step 406, the artificial-reality system 200 may present a set of instructions to the user 202 to start capturing a first plane, such as a wall, in the user's surrounding environment (e.g., room). FIG. 5B illustrates an example graphical user interface 500b with an updated screen-capture-assist window 512 including a set of instructions 514a-514c (individually or collectively herein referred to as 514) to outline walls of the room. For example, a first instruction 514a may instruct the user 202 to define a base of a wall by putting a point (e.g., by casting a first ray via the controller 206) on a bottom wall corner. A second instruction 51b may instruct the user 202 to define a height of the wall by putting a point (e.g., by casting a second ray via the controller 206) on the top corner of the same wall, the base of which that the user earlier defined based on the first instruction 514a. Once the base and the height of a wall is known, a third instruction 514c may instruct the user 202 to put a point (e.g., by casting a subsequent ray via the controller 206) on top corners of each wall in the room. For example, if there are 4 walls in the room, then the user may be asked to put 4 points, where each point connects with the previous point and the next point to form respective walls.

Figure 5C:

For each instruction (e.g., instruction 514), the artificial-reality system 200 may receive a user input and record that input to process information used for creating the walls. For instance, at step 408, based on a first instruction (e.g., instruction 514a) for outlining a wall, the user 202 may cast or shoot a first ray, via the controller 206, to put a first point (e.g., point 520 as shown in FIG. 5C) on a first bottom wall corner of a wall (e.g., wall 521 as shown in FIG. 5C) and then place a trigger button on the controller 206. Stated differently, the user 202 may use the controller 206 as a laser point to point and click at a location on the floor that intersects the base of the wall. FIG. 5C illustrates an example graphical user interface 500c of user defining a point 520 on a first bottom wall corner of the wall 521 based on the instruction 514a. At step 410, the artificial-reality system 200 may record the first point (e.g., point 520) indicated by the first ray and determines a base of the wall as the starting point to capture the wall (e.g., wall 521). The system 200 may determine the first ray's intersection with a floor plane as defining a starting point.

Figure 5D:
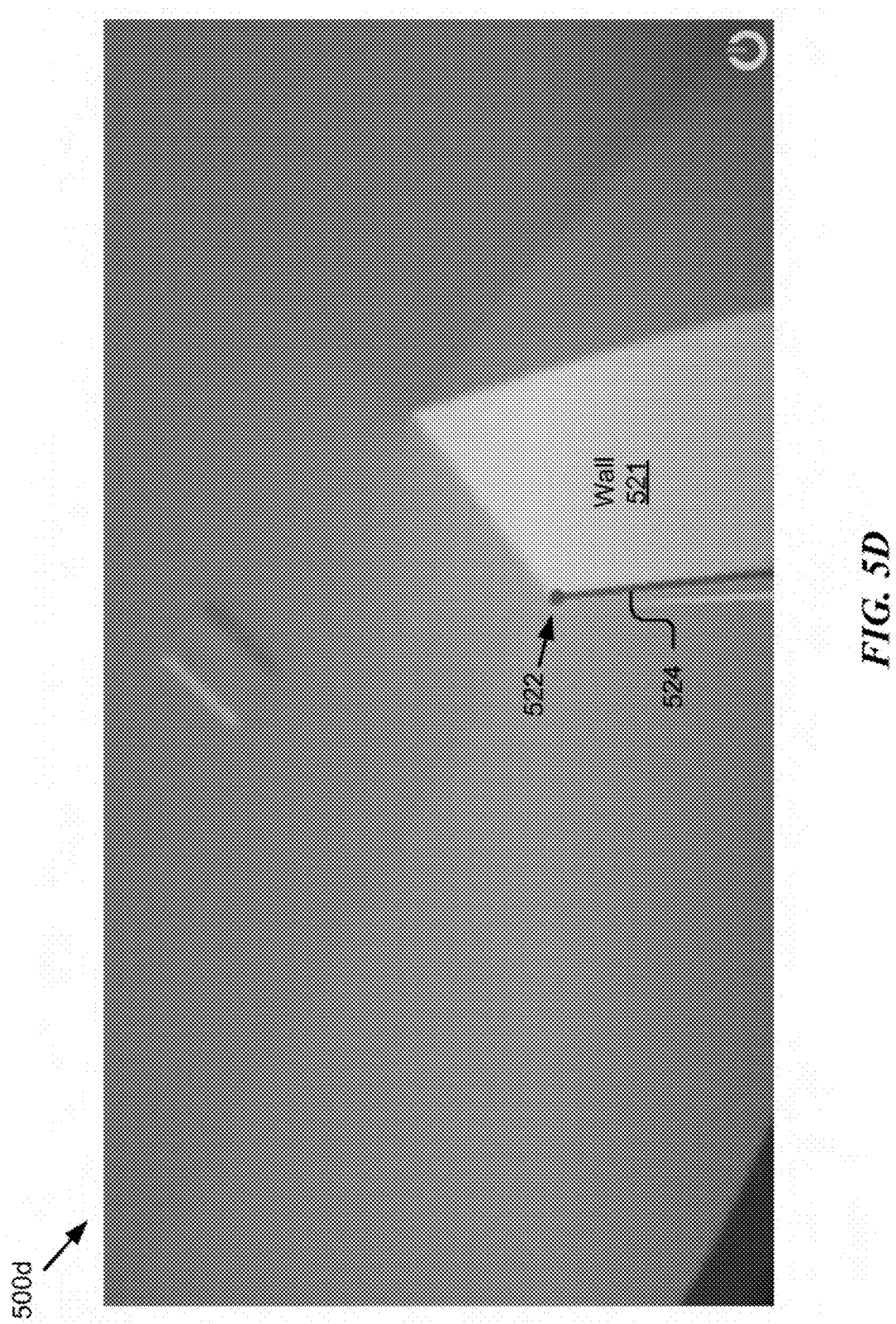

At step 412, based on a second instruction (e.g., instruction 514b) for outlining the wall, the user 202 may cast or shoot a second ray, via the controller 206, to put a second point (e.g., point 522 as shown in FIG. 5D) on a first top corner (e.g., left top corner) of the same wall (e.g., wall 521 as shown in FIG. 5D) and then place a trigger button on the controller 206. Stated differently, the user may draw, via the controller 206, a line up to the ceiling from the starting point (e.g., point 520). The line is assumed to be vertical. When the user clicks or places a trigger button on the controller 206, the second point (e.g., point 522) is put that defines the first top corner of the same wall (e.g., wall 521). FIG. 5D illustrates an example graphical user interface 500d of user defining a second point 522 on a first top corner of the wall 521 based on the instruction 514b. At step 414, the artificial-reality system 200 may record the second point (e.g., point 522) indicated by the second ray and determines a height of the wall or the ceiling (e.g., ceiling). The height may be determined based on a distance or difference between the first point (e.g., point 520) and the second point (e.g., point 522). It should be noted that the determined height may or may not be the actual height of the wall or the ceiling. Based on the determined height, the system 200 may create a vertical plane or edge (e.g., vertical plane 524 as shown in FIG. 5D) at that height.

Figure 5E:
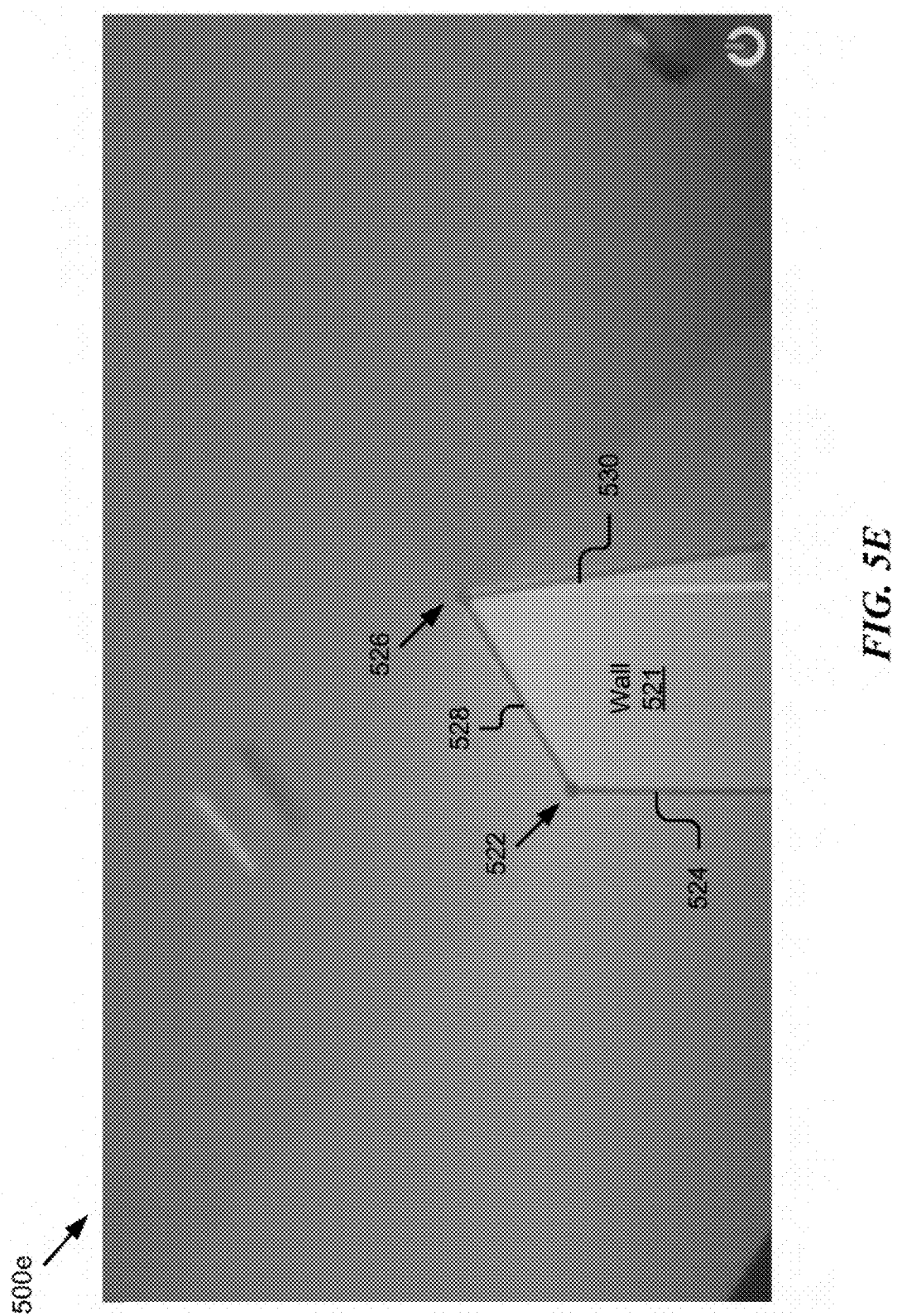

At step 416, based on a third instruction (e.g., instruction 514c) for outlining the wall, the user 202 may cast or shoot a third ray, via the controller 206, to put a third point (e.g., point 526) on a second top corner (e.g., right top corner) of the same wall (e.g., wall 521 as shown in FIG. 5E) and then place a trigger button on the controller 206. Stated differently, the user may continue to move the laser pointer across the ceiling plane (e.g., ceiling plane 528 as shown in FIG. 5E) to find another point (e.g., point 526) with which the previous point (e.g., point 524) will connect. FIG. 5E illustrates an example graphical user interface 500e of user defining a third point 526 on a second top corner of the wall 521 based on the instruction 514c. At step 418, the artificial-reality system 200 may record the third point (e.g., point 526) indicated by the third ray and creates a first horizontal plane 528 connecting the first top corner (e.g., point 524) and the second top corner (e.g., point 526) of the wall.

At step 420, the system 200 may create and save a first wall (e.g., wall 521). For instance, based on the first bottom wall corner (e.g., point 520) and the two top corners (e.g., points 524 and 526) defined by the user 202, and the first vertical plane 524 and the first horizontal plane 528 defined by the system 200, the system may create (1) another vertical plane 530 connecting the second top corner (e.g., point 526) and a second bottom wall corner (not shown) based on the first vertical plane 524 and (2) a second horizontal plane (not shown) connecting the first bottom wall corner (e.g., point 520) and the second bottom wall corner (not shown) based on the first horizontal plane 528. The resulting four planes i.e., the two vertical planes and the two horizontal planes creates the first wall, such as the wall 521. In particular embodiments, the system 200 may save this first wall as an anchor (e.g., plane anchor), which may be later used for generating a scene model.

Figure 5F:
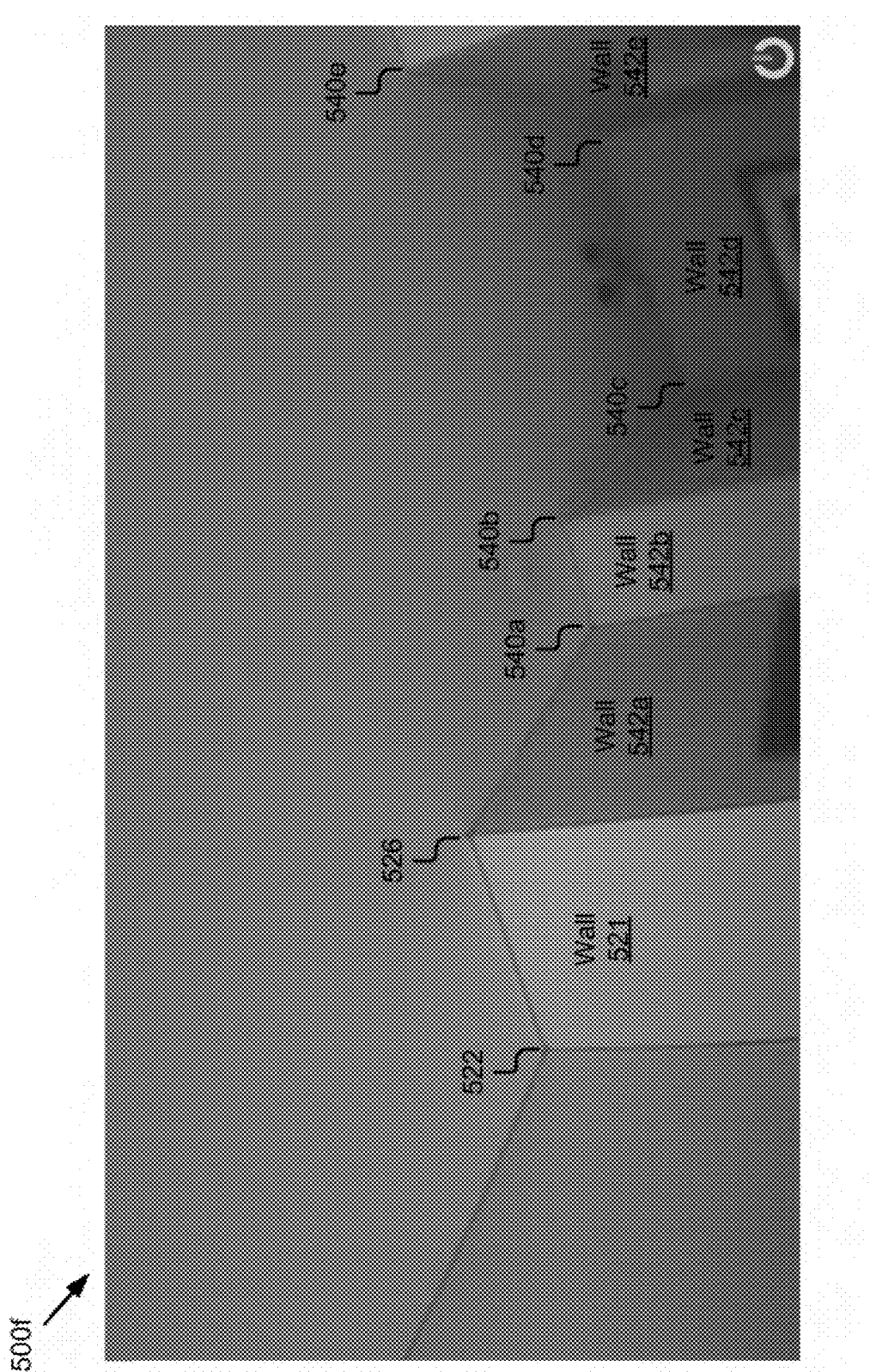

At step 422, based on the instructions (e.g., instruction 514c) for outlining the walls, the user 202 may continue to cast or shoot subsequent rays, via the controller 206, to put a subsequent set of points (e.g., point 526) on top corners of each wall in the user's environment. FIG. 5F illustrates an example graphical user interface 500f of user placing a series of points 540a-540e (individually or collectively herein referred to as 540) on top corners of each wall 542a-542e, respectively, based on the instruction 514c.

At step 424, the artificial-reality system 200 may create and save a subsequent set of walls (e.g., walls 542a-542e) based on the subsequent points defined by the user through ray cast. It should be noted that in creating a subsequent wall (e.g., wall 542a), the user 202 does not need to define a base wall corner anymore as the system 200 has already determined the height of the ceiling and a vertical plane (e.g., vertical plane 524) connecting a top corner of a wall to a bottom wall corner. As such, based on the subsequent top corners defined by the user 202, the artificial-reality system 200 may be able to create the subsequent set of walls, such as walls 542a-542e. In particular embodiments, the system 200 may save these walls as plane anchors, as discussed elsewhere herein. For instance, the system 200 may save each created wall as an anchor. In some embodiments, the system 200 may save a set of similar walls as one anchor. These wall anchors may be later used to generate one or more elements of a scene model. For instance, the system 200 may combine the anchors for the walls to create a room entity or a room layout that make up a specific room.

Figure 5G:
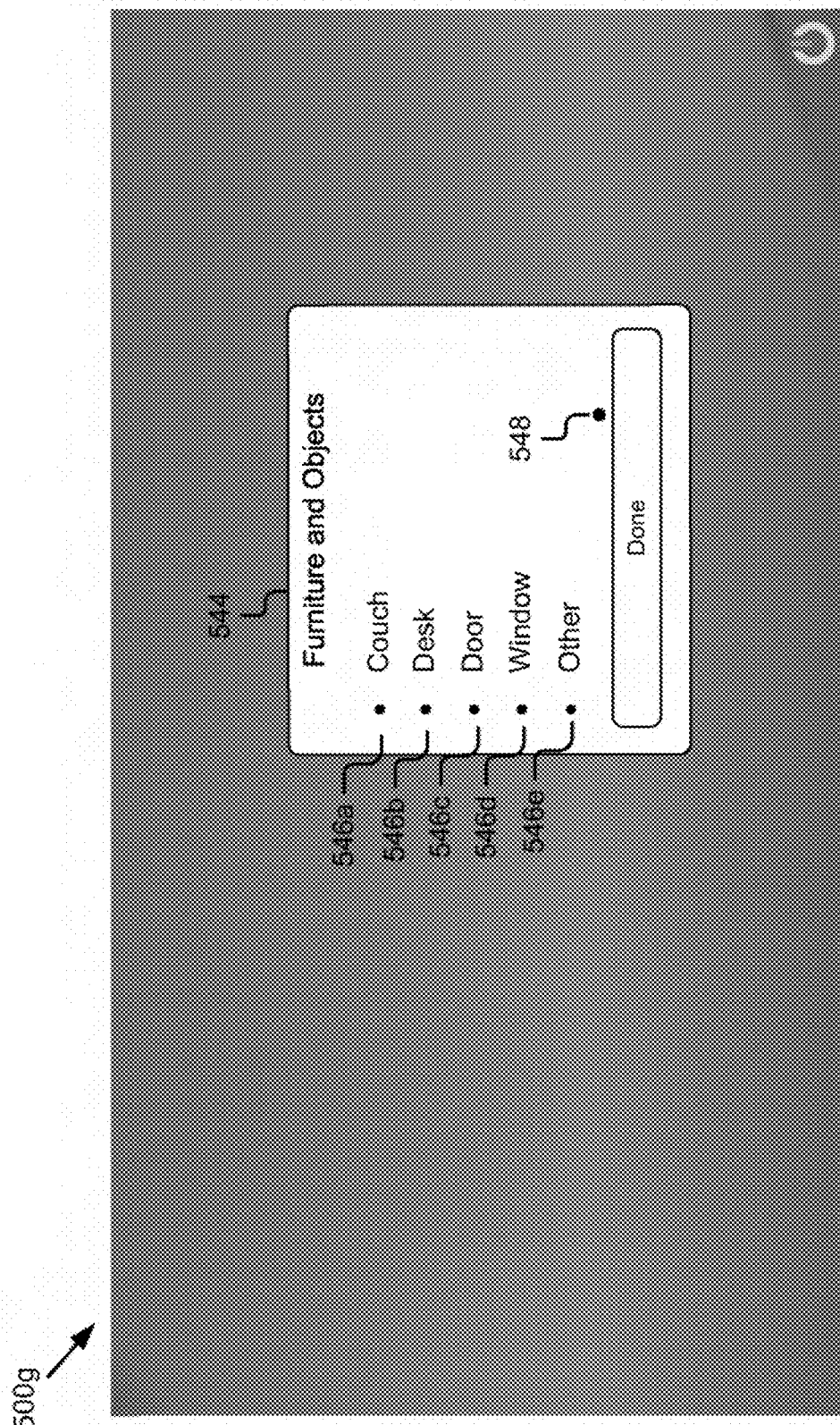

Once the system 200 is done capturing the first type of planes (e.g., walls), the system 200, at step 426, may present a set of options to the user 202 to capture another type of plane (e.g., door, window, ceiling, floor, etc.) or an object (e.g., couch, plant, chair, tv, etc.). FIG. 5G illustrates an example graphical user interface 500g with a screen-capture-assist window 544 displaying a set of different capture options 546a-546e (individually or collectively herein referred to as 546) to the user 202. The user 202 may select a desired option 546 by placing a point 548 on that option via the controller 206. Based on the presented options 546, the user 202 may choose to capture another plane (e.g., a door or a window) or may choose to capture an object (e.g., a couch, a desk, etc.). If the user 202 selects to capture an object, then a scene capture process to capture the object may be initiated, as shown and discussed in reference to FIG. 4B.

If the user 202 selects to capture another plane (e.g., door option 546c), then at step 428, the artificial-reality system 200 may receive this user selection indicating initiation of a scene capture process to capture this another plane. Based on the user selection, at step 430, the system 200 may provide another set of step-by-step instructions to the user 202 to capture or outline another plane. In some embodiments, the instructions for capturing a second type of plane may be similar to the instructions for capturing the first type of plane, such as walls as discussed above. For example, in order to capture a floor, the system 200 may instruct the user 202 to place or put 4 points via the controller 206 (e.g., via ray cast) on bottom four corners of the floor that the user is standing on. As another example, in order to capture a ceiling, the system 200 may instruct the user 202 to place or put 4 points via the controller 206 (e.g., via ray cast) on top four corners of the ceiling above him.

Figure 5H:
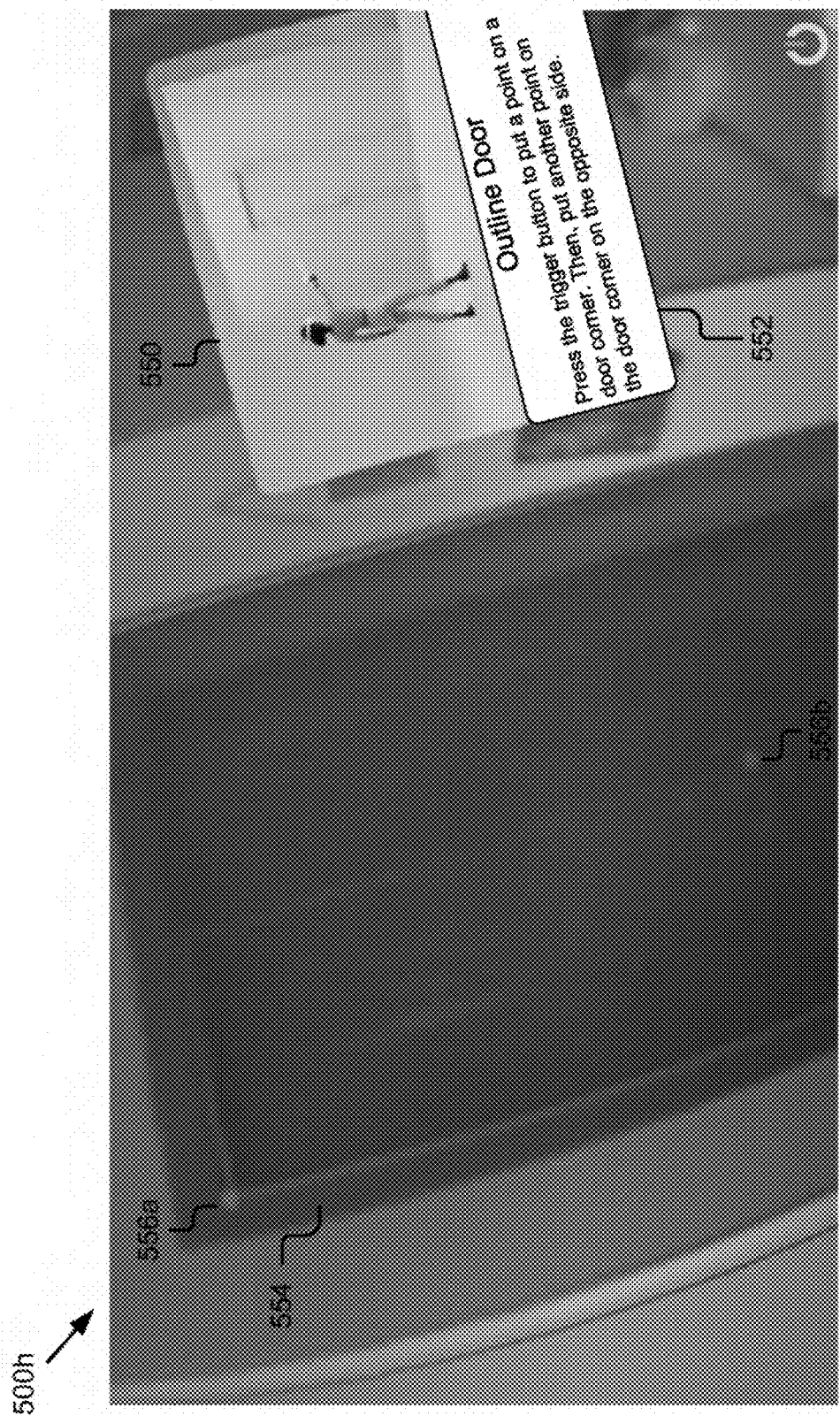

In some embodiments, the instructions for capturing another plane or the second type of plane may be different. By way of an example and without limitation, the user may select to capture a door in their environment. Upon receiving the selection, at step 430, the artificial-reality system 200 may present a set of instructions to the user 202 to start capturing the door. FIG. 5H illustrates an example graphical user interface 500h with a screen-capture-assist window 550 including instructions 552 to outline a door 554. For instance, the user may be instructed to put a first point 556a on a door corner on a first side of the door 554 and then put a second point 556b on a door corner on the opposite side of the door 554.

At step 432, the artificial-reality system 200 may receive the user inputs outlining another plane or second type of plane (e.g., door, window, etc.). For example, the system 200 may receive the points 556a and 556b defined by the user 202 to outline the door 554. At step 434, the system may create a subsequent plane (e.g., door) based on the received user inputs. In particular embodiments, the system 200 may save the subsequent plane as another anchor, which may be later included or used to generate a scene model, as discussed elsewhere herein.

If in case, the user 202 selects to capture an object instead, then a scene capture process to capture the object may be initiated. FIG. 4B illustrates a second example portion 402 of the manual scene capture workflow 400 to capture one or more objects in a user's physical environment (e.g., living room). As discussed elsewhere herein, the objects may include, for example, desk, couch, chair, tv, plant, etc. The system 200 may represent these objects as 3D bounding boxes or 3D volumes for inclusion in a scene model. Although, the second example portion 402 illustrates steps for capturing a desk, it should be noted that similar steps may be performed between the artificial-reality system 200 and the user 202 to outline or capture other objects, such as couch, chair, tv, bed, etc.

Figure 5I:
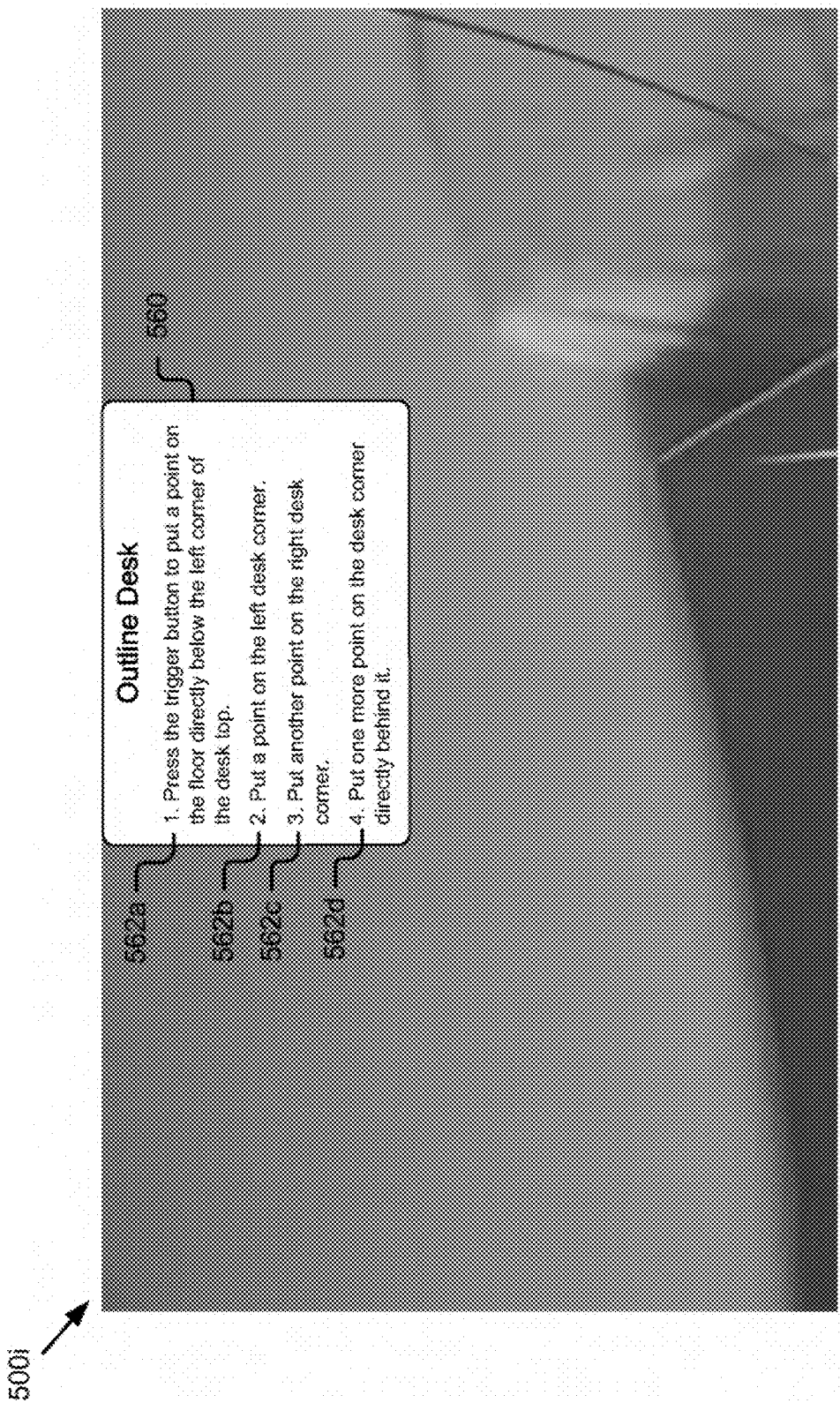

At step 450, the artificial-reality system 200 may receive a selection from the user 202 to initiate a scene capture process for an object. For example, the user may select desk option 546b (e.g., as shown in FIG. 5G) to initiate the scene capture process for the desk. At step 452, based on the user selection, the artificial-reality system 200 may present a set of instructions to the user 202 to start capturing or outlining the object (e.g., desk) in the user's surrounding environment (e.g., room). FIG. 5I illustrates an example graphical user interface 500i with a screen-capture-assist window 560 including a set of instructions 562a-562d (individually or collectively herein referred to as 562) to outline a desk. For example, a first instruction 562a may instruct the user 202 to press a trigger button on the controller 206 to put a first point (e.g., by casting a first ray via the controller 206) on the floor directly below the top front left corner of the desk. A second instruction 562*b* may instruct the user 202 to put a second point (e.g., by casting a second ray via the controller 206) on the top front left corner of the desk. This may let the system 200 determine the base and height of the desk and also create a vertical edge/plane. A third instruction 562*c* may instruct the user 202 to put a third point (e.g., by casting a third ray via the controller 206) on the top front right corner of the desk. A fourth instruction 562*d* may instruct the user 202 to put a fourth point (e.g., by casting a fourth ray via the controller 206) on the top back right corner of the desk.

Figure 5J:
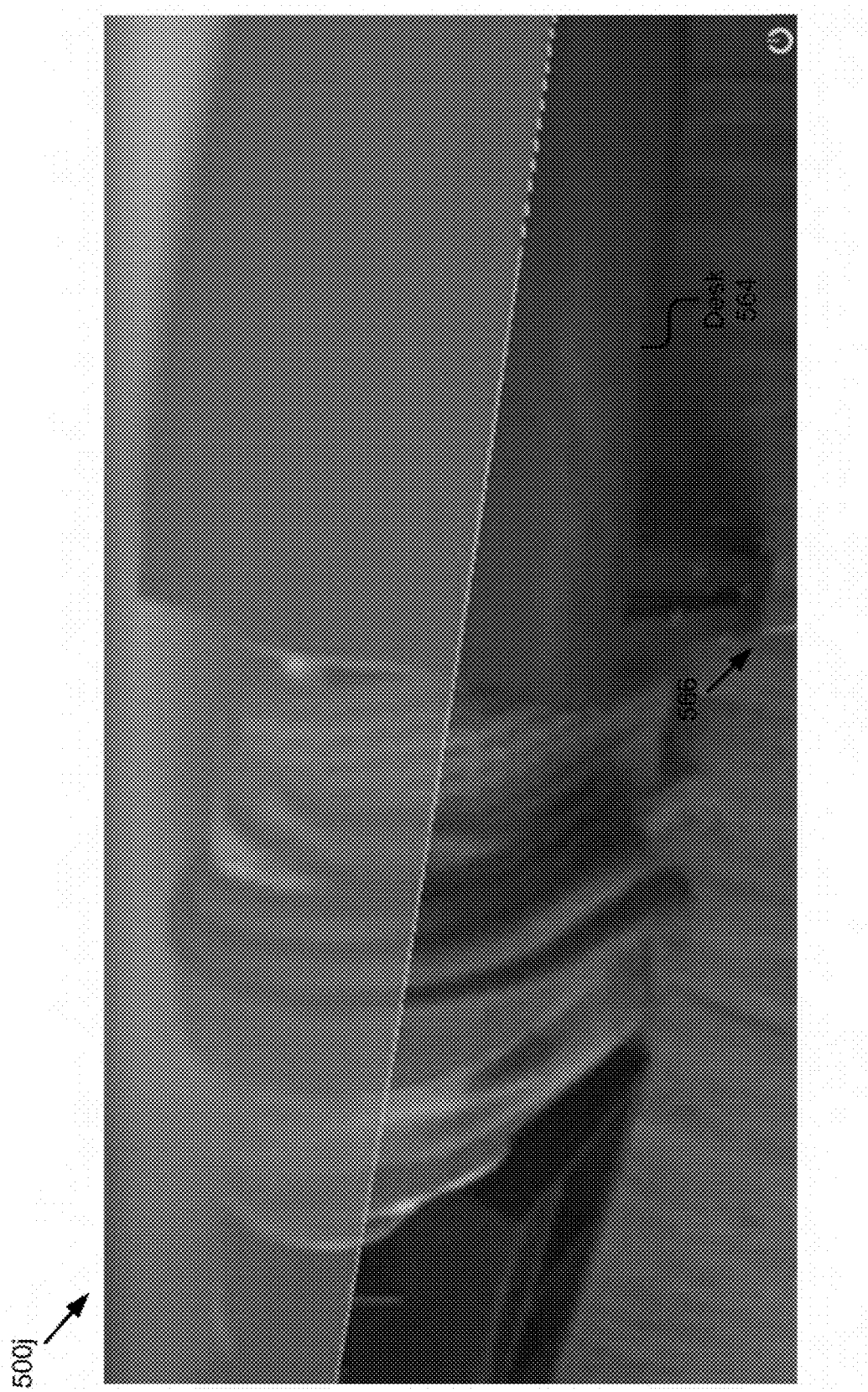

For each instruction (e.g., instruction 562), the artificial-reality system 200 may receive a user input and record that input to process information used for creating the object (e.g., desk). For instance, at step 454, based on a first instruction (e.g., instruction 562*a*) for outlining an object, the user 202 may cast or shoot a first ray, via the controller 206, to put a first point (e.g., point 566 as shown in FIG. 5J) on the floor directly below the left side or corner of the object (e.g., desk 564 as shown in FIG. 5J). In particular embodiments, while casting or shooting a ray, the user 202 may press a trigger button on the controller 206 to place or put a point at a certain location in the user's environment. For instance, the user 202 may use the controller 206 as a laser point to define a point (e.g., point 566) on the floor where a corner of the object is located. When the user clicks, the point where the ray intersects the floor plane will be set as a starting point. FIG. 5J illustrates an example graphical user interface 500*j* of user defining a first point 566 on the floor directly below the top left corner of the table or desk 564 based on the instruction 562*a*. At step 456, the artificial-reality system 200 may record the first point (e.g., point 566) indicated by the first ray and determines a bottom left corner of the object as the starting point to capture the object (e.g., desk 564). The system 200 may determine the first ray's intersection with the floor plane as defining a starting point.

Figure 5K:
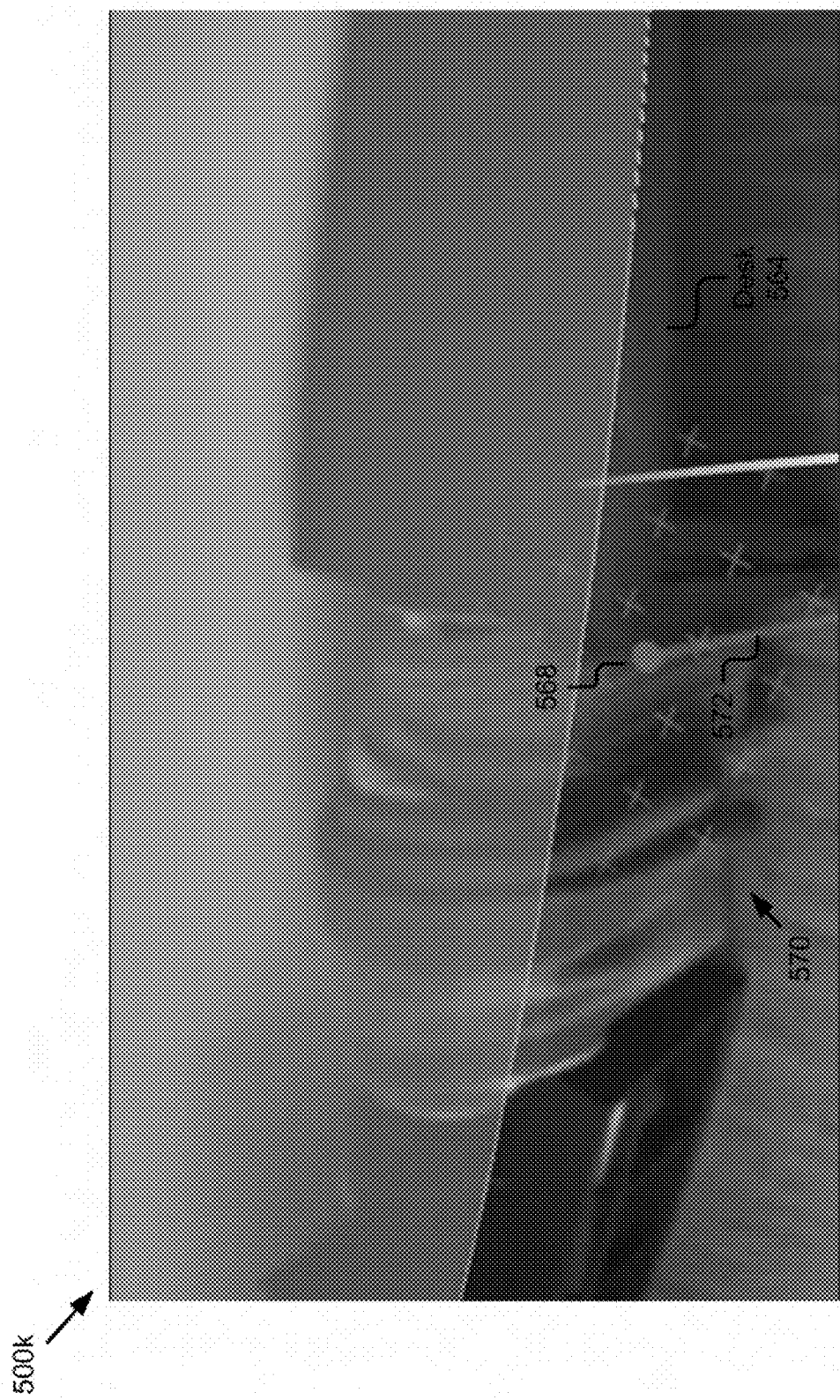

At step 458, based on a second instruction (e.g., instruction 562*b*) for outlining the object, the user 202 may cast or shoot a second ray, via the controller 206, to put a second point (e.g., point 568 as shown in FIG. 5K) on a top left corner of the object. The top left corner may be directly above the bottom left corner of the object, where the user placed the first point (e.g., point 566). Stated differently, the user may draw, via the controller 206, a vertical line that extends upward from the starting point (e.g., point 566) and click. The location where the user clicks define the height of that object. FIG. 5K illustrates an example graphical user interface 500*k* of user defining a second point 568 on a top left corner of the desk 564 based on the instruction 562*b*. In some embodiments, the system 200 may show a hint, an indicator, or a pattern 570 to help the user 202 to draw a line in a particular direction to place a point at a certain location. For example, the pattern 570 may help the user 202 to draw a line 572 that extends upward from the previous point (e.g., 566) towards the point 568. At step 460, the artificial-reality system 200 may record the second point (e.g., point 568) indicated by the second ray and determines a height of the object. The height may be determined based on a distance or difference between the first point (e.g., point 566) and the second point (e.g., point 568). It should be noted that the determined height may or may not be the actual height of the object. Based on the determined height, the system 200 may create a vertical plane or edge (e.g., vertical plane 572 as shown in FIG. 5K) at that height.

Figure 5L:
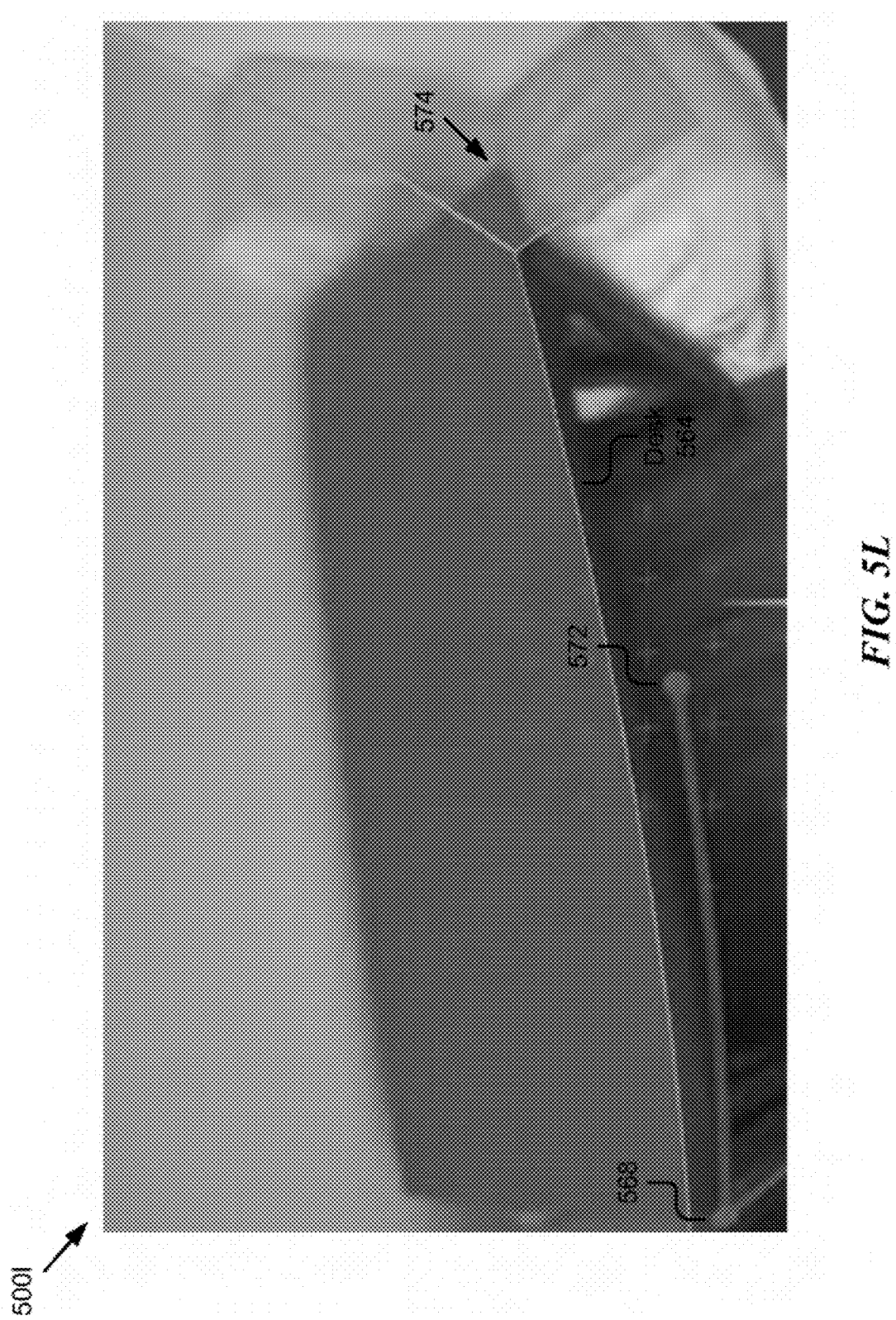
Figure 5M:
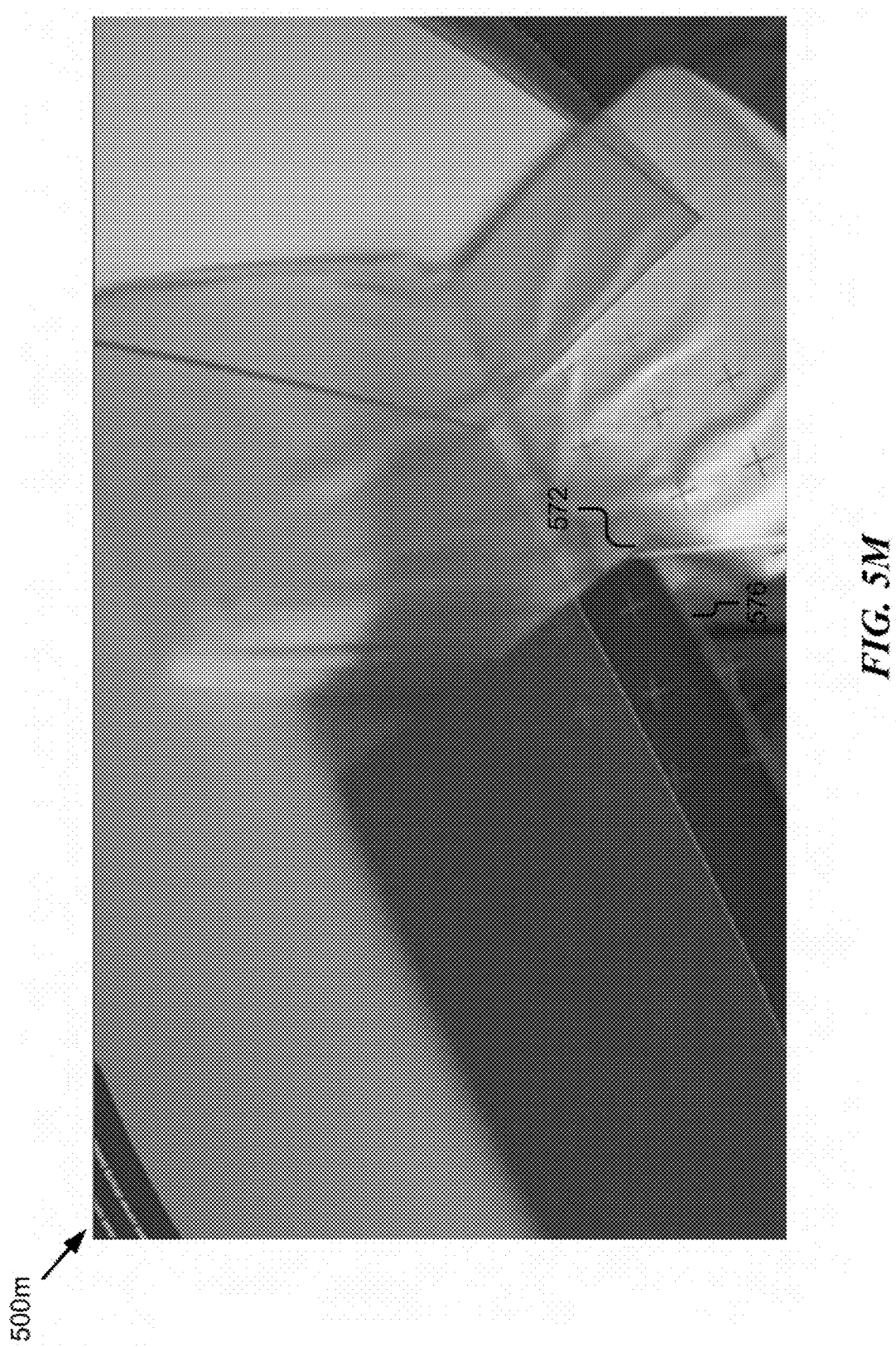

At step 462, based on a third instruction (e.g., instruction 562*c*) for outlining the object, the user 202 may cast or shoot a third ray, via the controller 206, to put a third point (e.g., point 572) on a top right corner (e.g., corner 574 as shown in FIG. 5L) of the object. Stated differently, the user may continue to move the laser point across the top surface plane of the object and select a point on it. When the user clicks, the intersection between the ray and the top surface plane will define a top horizontal edge of the 3D volume bounding box. FIG. 5L illustrates an example graphical user interface 500*l* of user defining a third point 572 on a top right corner 574 of the desk 564 based on the instruction 562*c*. FIG. 5M illustrates an example graphical user interface 500*m* showing the point 572 placed on the top right corner of the desk. At step 464, the artificial-reality system 200 may record the third point (e.g., point 572) indicated by the third ray and creates an horizontal plane or edge 576 connecting the top left corner (e.g., point 568) and the top right corner (e.g., point 572) of the desk 564.

Figure 5N:
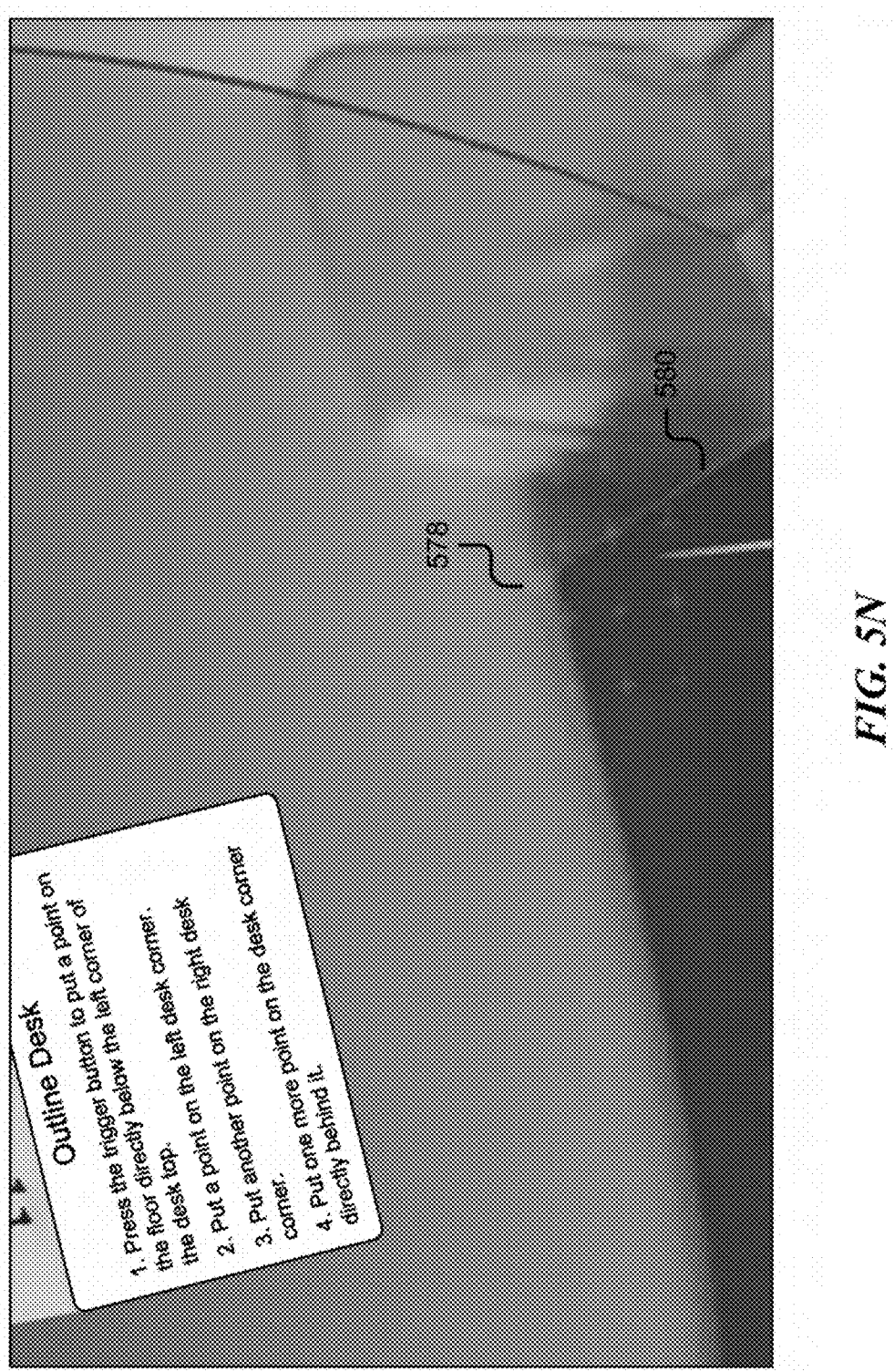

At step 466, based on a fourth instruction (e.g., instruction 562*d*) for outlining the object, the user 202 may cast or shoot a fourth ray, via the controller 206, to put a fourth point (e.g., point 578 as shown in FIG. 5N) on an object corner directly behind the third point (e.g., 572). Stated differently, the user may select another point on the top surface plane, which extends from the point selected in the previous step (e.g., step 462). FIG. 5N illustrates an example graphical user interface 500*n* of user defining a fourth point 578 on a top back right corner of the desk 564 based on the instruction 562*d*. At step 468, the artificial-reality system 200 may record the fourth point (e.g., point 578) indicated by the fourth ray and creates a second horizontal plane or edge 580 connecting the top front right corner (e.g., point 572) and the top back right corner (e.g., point 578) of the desk 564.

At step 470, the system 200 may create and save a first the object (e.g., desk 564). In particular embodiments, the system 200 may save the object as a 3D bounding box or volume. For instance, based on the four points (e.g., point 566, point 568, point 572, point 578) defined by the user 202, the first vertical plane 572, and the two top horizontal planes 576 and 580, the system may create (1) three more vertical edges (not shown) connecting the points, (2) two remaining top horizontal edges (not shown), and (4) four bottom horizontal edges (not shown). The result will be a 3D bounding or volume defining the object, such as the desk 564. In particular embodiments, the system 200 may save this 3D bounding box or 3D volume of the desk as an object anchor, which may be later used for generating a scene model.

Once the system 200 is done capturing the first object (e.g., desk), the system 200, at step 472, may again present a set of options (e.g., options 546 as shown in FIG. 5G) to the user 202 to capture another type of plane (e.g., door, window, ceiling, floor, etc.) or an object (e.g., couch, plant, chair, tv, etc.). If the user 202 selects to capture another object (e.g., couch option 546*a*), then at step 474, the artificial-reality system 200 may receive this user selection indicating initiation of a scene capture process to capture another object. Based on the user selection, at step 476, the system 200 may provide another set of step-by-step instructions to the user 202 to capture or outline another object, such as couch. In some embodiments, the instructions for capturing another object (e.g., couch) may be similar to the instructions for capturing the first object (e.g., desk), as discussed above.

At step 478, the artificial-reality system 200 may receive the user inputs outlining another object or second type of object (e.g., couch, chair, etc.). At step 480, the system may create another 3D bounding box or volume for the second object based on the received user inputs. In particular embodiments, the system 200 may save the 3D bounding box or 3D volume of the second object as another anchor, which may be later included or used to generate a scene model, as discussed elsewhere herein.

Once the system receives an acknowledgement from the user 202 that they are done capturing the scene, including one or more of planes or objects, the system 200 may proceed to generate a scene model discussed herein. For instance, at step 482, the system 200 may receive a user selection to exit the scene capture process. At step 484, the system 200 may create a scene model based on the captured planes and/or objects. For instance, the system 200 may include the 2D bounding boxes for captured planes (e.g., walls, ceilings, floor, windows, doors, etc.) and 3D volumes for captured objects as planes anchors and object anchors, respectively, in the scene model. The system 200 may assign, for each anchor, a component type (e.g., 3D bounding box, 3D mesh, 2D boundary, etc.) and semantic label or category (e.g., wall, door, window, couch, desk, plant, lamp, etc.) defining an entity that is associated with the anchor. The system 200 may also assign a unique ID (e.g., uuid) to each anchor representing an entity. The system 200 may combine or group certain anchors to create one or more elements or components in the scene model. As an example, the system 200 may group the anchors corresponding to the captured planes and objects into a room container component that represents the overall room including all the planes and objects included in the room. As another example, the system 200 may group the anchors corresponding to the captured planes into a room layout component that includes a sequence of walls, floor, ceiling that make up the room. The artificial-reality system 200 may save the scene model, including the various components or elements (e.g., anchors, component types, semantic labels, IDs, room entity component, room container component, room layout, etc.) in a memory of the artificial-reality system 200.

Assisted Scene Capture Workflow

In the assisted scene capture workflow, instead of the user defining each and every entity in the room, some of the entities may be automatically detected or recognized by the artificial-reality system. In some embodiments, computer-vision techniques may be used to identify various planes (e.g., walls) and/or objects (e.g., furniture) in a room. For instance, planes may be detected using a plane detection or understanding technology and objects in the room may be detected using an object recognition technology. Instead of the user having to draw or outline each and every entity (e.g., plane, object) on their own, the user may be asked to simply confirm or acknowledge the detected entities to add to their room layout. As an example, the user may be instructed to select each of the walls in their environment. Their walls may be automatically detected when the user is within a certain threshold (e.g., approx. 2 meters) of the wall. The user may then be able to point at the wall and add it to their layout with a raycast from a controller (e.g., controller 206) of the artificial-reality system. After each of the user's walls has been added, their room layout may be calculated and revealed.

Figure 6A:
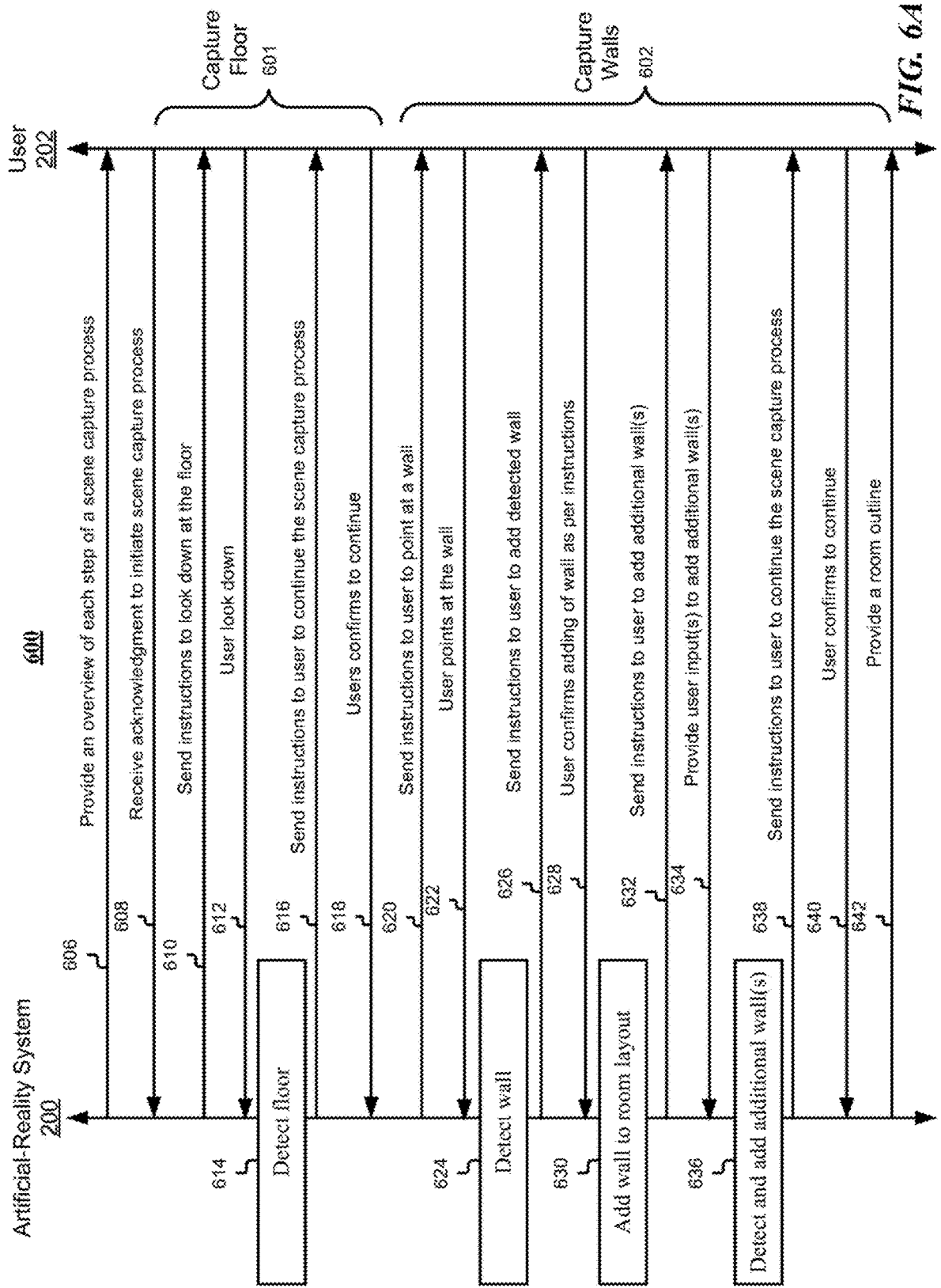
FIGS. 6A-6B illustrate an example assisted scene capture workflow, in accordance with particular embodiments.
Figure 6B:
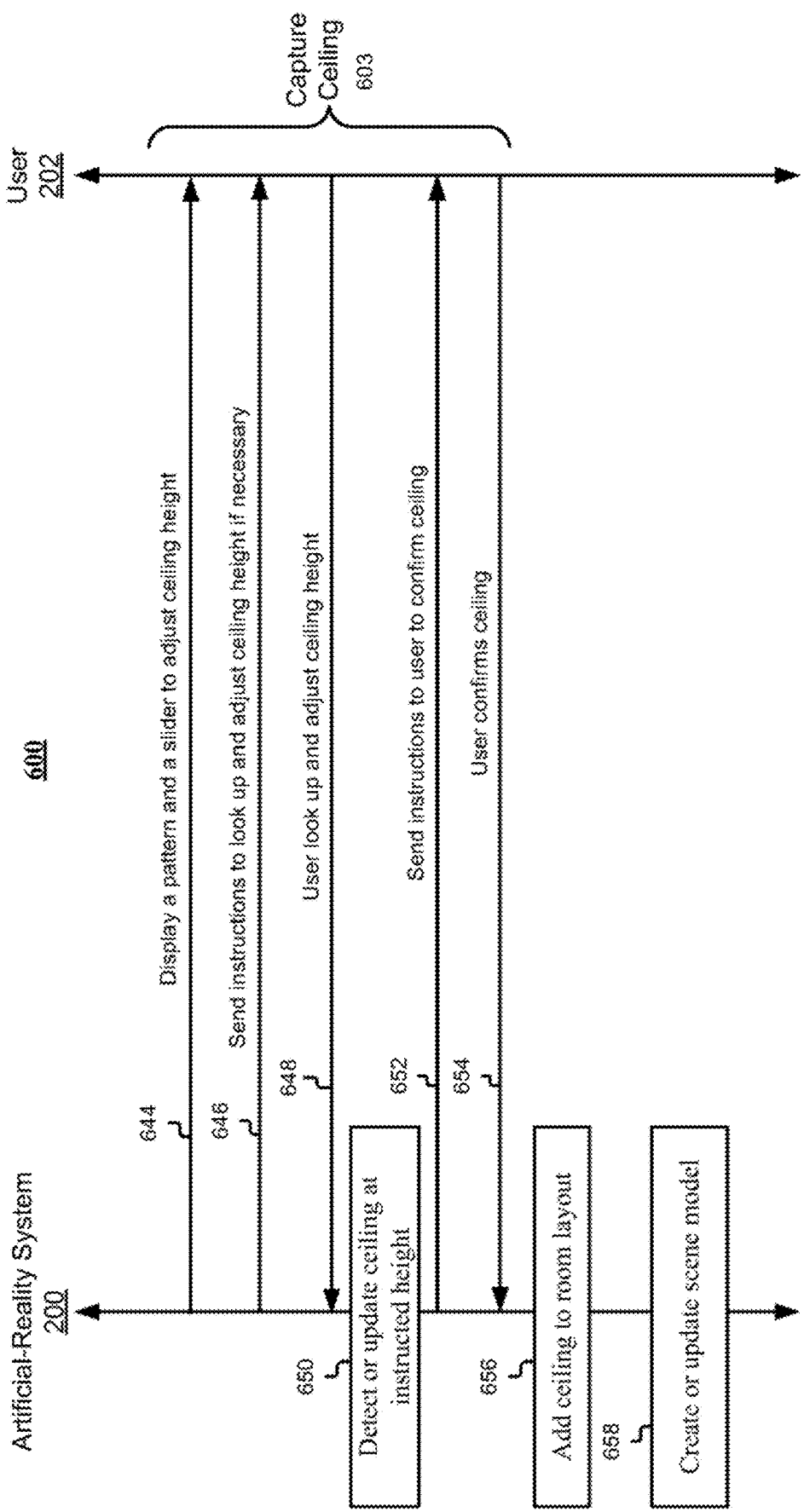

FIGS. 6A-6B illustrate an example assisted scene capture workflow 600. Specifically, the assisted scene capture workflow 600 illustrates steps performed between an artificial-reality system (e.g., artificial-reality system 200) and a user (e.g., user 202) to capture floor 601, capture walls 602, and capture ceiling 603 (FIG. 6B) and add to a room layout in an assisted scene capture environment. It should be noted that the assisted scene capture workflow 600 is not limited by any way to capturing these entities 601, 602, and 603, and capturing of various other planes and objects are also possible and within the scope of the present disclosure.

The assisted scene capture workflow 600 may begin, at step 606, with the artificial-reality system 200 providing an overview of each step of a scene capture process that the user 202 will be undergoing. For instance, the user 202 may be shown a series of menu slides that show an animation of each step of the process. These may also include a short text description of an action needed from user and desired result. At step 608, the artificial-reality system 200 may receive acknowledgement from the user 202 to start the scene capture process.

In response to receiving the acknowledgement from the user 202 to start the scene capture process, the system 200 may begin with capturing floor process 601. At step 610, the system 200 may send instructions to the user 202 to look down at their floor. At step 612, the user looks down and sees a pattern extend along their floor. As discussed earlier, the pattern may be a visual indicator to help or guide the user to look in a particular direction. Once the user looks down in the particular direction based on the pattern, at step 614, the system 200 may detect the floor. At step 616, the system 200 may send instructions to the user 202 to continue the scene capture process. For instance, once the floor is detected, the user's menu will reveal a "continue" button. At step 618, the user 202 confirms to continue the process, for example, by pressing or clicking on the "continue" button via their controller 206.

Once the capture floor process 601 is complete, the artificial-reality system 200 may begin capturing walls process 602. At step 620, the system 200 may send instructions to the user 202 to point at a wall. For instance, the user 202 may be instructed to point at their walls with their primary hand until they see their raycast cursor snap to a detected wall. At step 622, the user 202 points at a particular wall. At step 624, the system 200 detects the particular wall based on the user indication (e.g., user pointing at the wall). At step 626, the system 200 may send instructions to the user 202 confirming to add the detected wall. For instance, a gizmo may appear on the end of the user's cursor revealing a pattern on the wall. The user may be instructed to perform a certain action (e.g., press a button or perform a touch gesture) to add the wall to their layout. At step 628, the user 202 confirms adding of the wall to their room layout. At step 630, the system 200 may add the wall to the room layout. Once a first wall is added, at step 632, the system 200 may send instructions to the user 202 to add one or more additional walls. At step 634, the user 202 may provide one or more inputs in order to add the one or more additional walls. For example, the user 202 may provide inputs as discussed above in at least steps 622 and 628. At step 636, the system 200 may detect and add the additional walls to the room layout based on the user inputs. When at least 3 walls have been added, at step 638, the system 200 may send instructions to the user 202 to continue the scene capture process. For instance, the user's menu will reveal a "continue" button. At step 640, the user 202 confirms to continue the process, for example, by pressing or clicking on the "continue" button via their controller 206. At step 642, the system 200 may provide a room outline. In particular, an outline of the user's room is revealed and a pattern on all their walls fades top to bottom from the ceiling.

Once the capture walls process 602 is complete, the artificial-reality system 200 may begin capturing ceiling process 603, as shown in FIG. 6B. At step 644, the system 200 may display a pattern and a slider to adjust ceiling height. For instance, a pattern (e.g., similar to the one shown for the floor) may be revealed on the ceiling above the user 202. The user's menu may show a slider to adjust the height of their ceiling. If a ceiling was already detected, the slider and the pattern may be at the detected height. Otherwise, it will be set at a default height (e.g., of about 2.5 meters). At step 646, the system 200 may send instructions to the user 202 to look up and adjust ceiling height if necessary. At step 648, the user may look up and adjust the ceiling height via the slider. The ceiling pattern may move in real time if the user decides to manually adjust. At step 650, the system 200 may detect the ceiling if not already detected or update the detected ceiling at the ceiling height adjusted by the user 202. At step 652, the system 200 may send instructions to the user 202 to confirm the detected or updated ceiling. For example, the user's menu will reveal a "Confirm Ceiling" button. At step 654, the user 202 confirms the ceiling, for example, by pressing or clicking on the "Confirm Ceiling" button via their controller 206. Once the user confirms the ceiling, at step 656, the system 200 may add the ceiling to the user's room layout. In response to the completion of the capture floor process 601, capture walls process 602, and the capture ceiling process 603, at step 658, the artificial-reality system 200 may create or update a scene model by adding the captured entities (e.g., floor, walls, ceiling) as anchors in the scene model along with additional elements or components (e.g., semantic types, component types, room layout, room entity component, room container, etc.), as discussed elsewhere herein.

Figure 7:
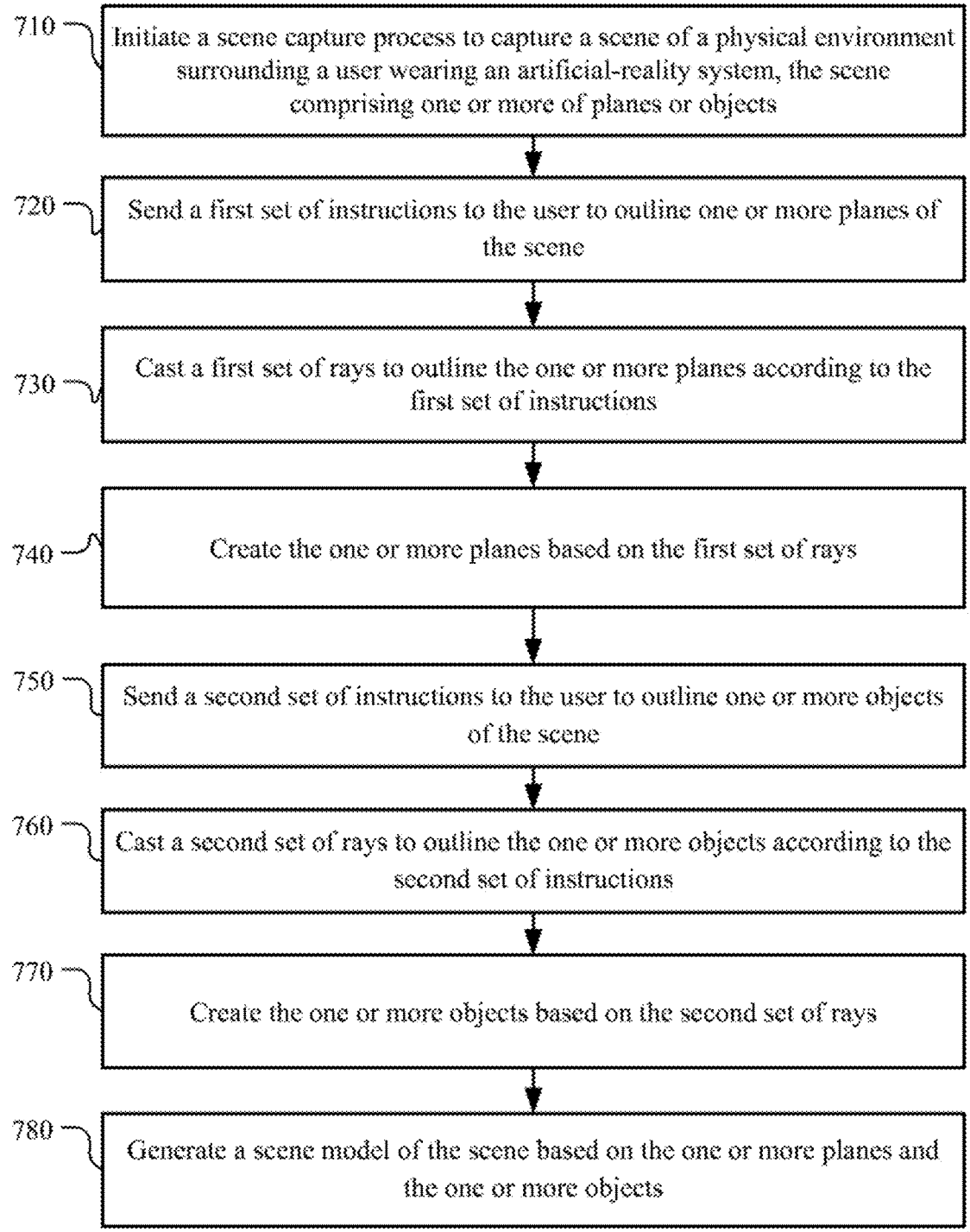
FIG. 7 illustrates an example method for generating a scene model using a scene capture process or workflow, in accordance with particular embodiments.

FIG. 7 illustrates an example method 700 for generating a scene model using a scene capture process or workflow (e.g., scene capture workflow 400), in accordance with particular embodiments. The method may begin at step 710, where a computing system (e.g., the computer 208) associated with an artificial reality device (e.g., the artificial reality system 200) may initiate a scene capture process (e.g., scene capture workflow 400) to capture a scene of a physical environment surrounding a user wearing an artificial-reality system. The artificial-reality system may be a VR headset. The scene may include one or more of planes or objects. As an example and not by way of limitation, the scene may be a living room of the user, where the one or more planes may include walls, ceiling, floor, windows, door, etc. and the one or more objects may include couch, desk, television, bed, plant, chair, etc. In some embodiments, the scene capture process may be initiated by an application running on the artificial-reality system. The application may be a first-party application or a third-party application on the artificial-reality system. In some embodiments, the scene capture process may be implemented as part of an existing application on the artificial-reality system.

Figure 10:
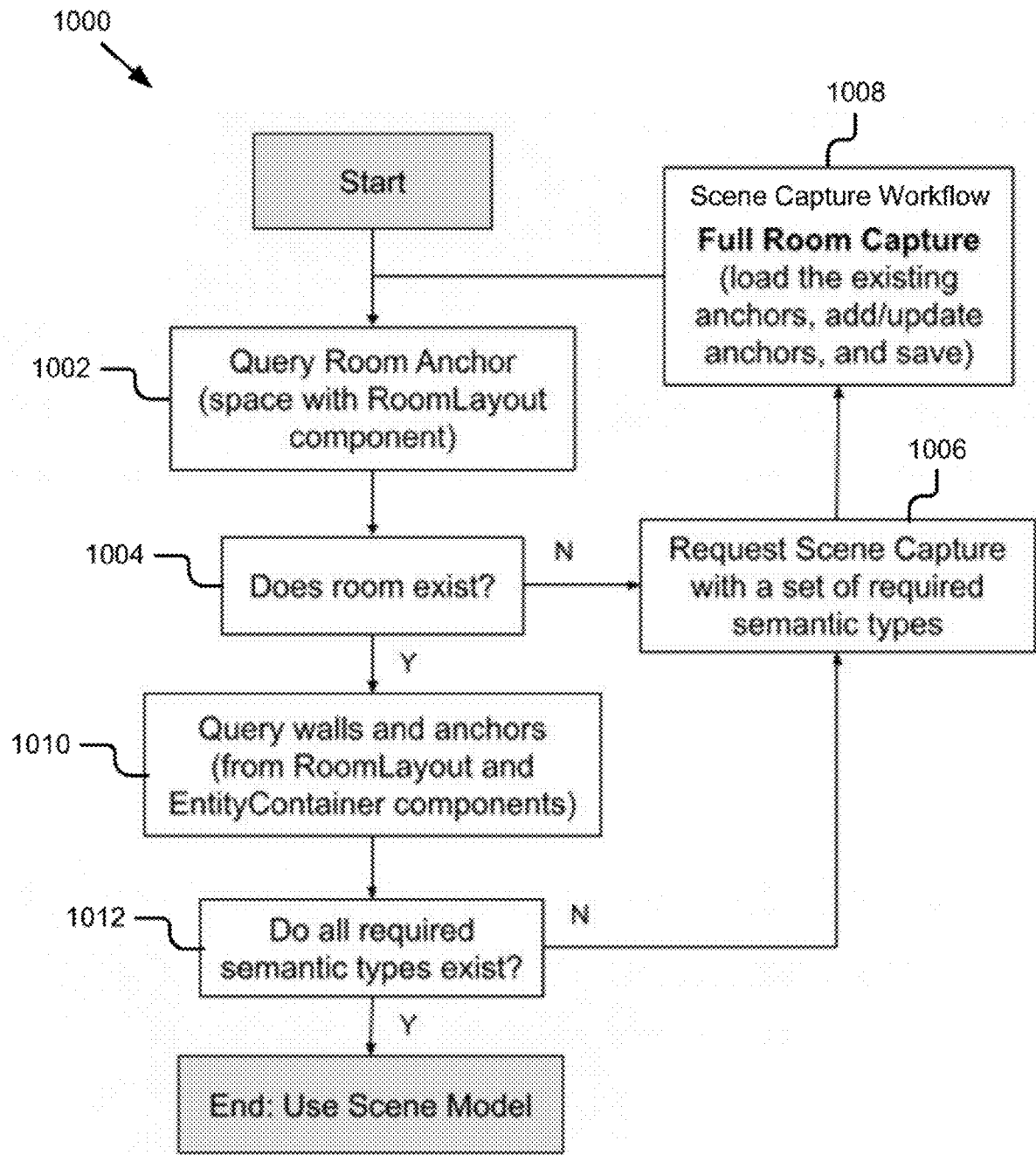
FIG. 10 illustrates an example method for invoking a full scene capture process.
Figure 11:
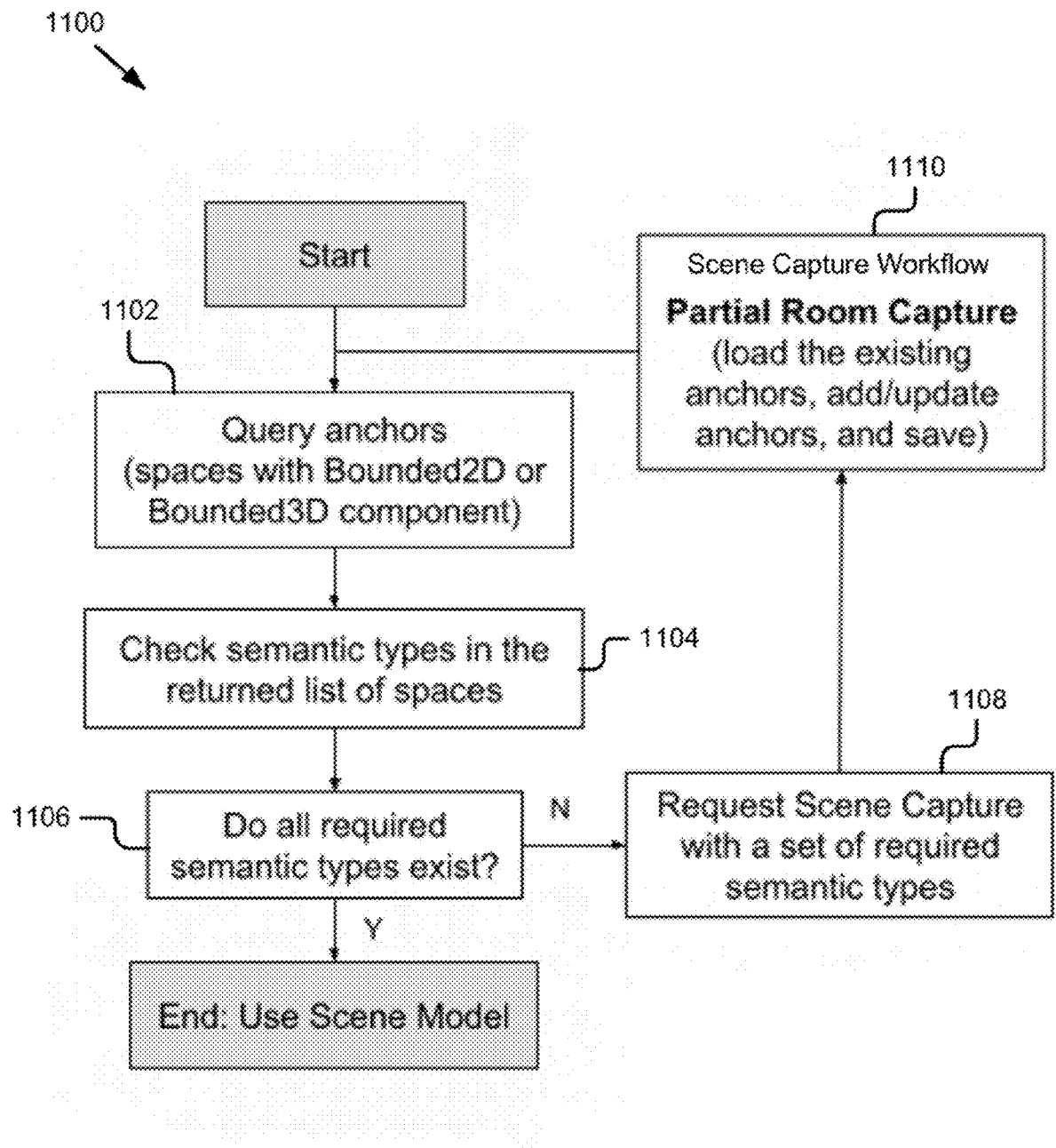
FIG. 11 illustrates an example method for invoking a partial scene capture process.

In some embodiments, the scene capture process in step 710 may be initiated in response to receiving a query from an application, as discussed, for example, in FIG. 10 or FIG. 11. For instance, the computing system (e.g., the computer 208 of the artificial reality system 200) may receive a query from an application requesting one or more components of the scene model of the scene. The system may determine that the one or more components of the scene model are not found. In response to determining that the one or more components of the scene model are not found, the system may initiate the scene capture process.

At step 720, the computing system (e.g., the computer 208 of the artificial reality system 200) may send a first set of instructions to the user to outline one or more planes of the scene. For example, the system may send instructions 514a-514c to outline walls of the scene, as shown in FIG. 5B. At step 730, the computing system may cast a first set of rays to outline the one or more planes according to the first set of instructions. For instance, based on user inputs, the controller 206 of the artificial-reality system 200 may cast rays to outline the one or more planes. Each casted ray of the first set of rays may place or put a point at a particular location based on an instruction of the first set of instructions, as discussed elsewhere herein. In some embodiments, the one or more planes may include walls, and casting the first set of rays to outline the one or more planes according to the first set of instructions may include (1) casting a first ray to put a first point on a bottom corner of a first wall according to a first instruction (e.g., instruction 514a) of the first set of instructions, as shown, for example, in FIG. 5C, (2) casting a second ray to put a second point on a top corner on the same side of the first wall according to a second instruction (e.g., instruction 514b) of the first set of instructions, as shown, for example, in FIG. 5D, and (3) casting subsequent rays to put subsequent points on top corners of each subsequent wall present in the scene according to a third instruction (e.g., instruction 514c) of the first set of instructions, as shown, for example, in FIGS. 5E-5F.

At step 740, the computing system (e.g., the computer 208 of the artificial reality system 200) may create the one or more planes based on the first set of rays. The one or more planes may be created based on points placed by casted rays at particular locations in the physical environment of the scene. In particular embodiments, creating the one or more planes may include creating one or more two dimensional (2D) bounded boxes for the one or more planes based on the first point, the second point, and the subsequent points defined by the first ray, the second ray, and the subsequent rays, respectively.

At step 750, the computing system (e.g., the computer 208 of the artificial reality system 200) may send a second set of instructions to the user to outline one or more objects of the scene. For example, the system may send instructions 562a-562d to outline a desk, as shown in FIG. 5I. At step 760, the system may cast a second set of rays to outline the one or more objects according to the second set of instructions. For instance, based on user inputs, the controller 206 of the artificial-reality system 200 may cast the second set of rays to outline the one or more objects. Each casted ray of the second set of rays may place or put a point at a particular location based on an instruction of the second set of instructions, as discussed elsewhere herein. In some embodiments, the one or more objects may include a desk, and casting the second set of rays to outline the one or more one or more objects according to the second set of instructions may include (1) casting a first ray to put a first point on a floor directly below a top left corner of the desk, as shown, for example, in FIG. 5J, (2) casting a second ray to put a second point on the top left corner of the desk, as shown, for example, in FIG. 5K, (3) casting a third ray to put a third point on a top right corner of the desk, as shown, for example, in FIGS. 5L-5M, and (4) casting a fourth ray to put a fourth point on a corner directly behind the third point, as shown, for example, in FIG. 5N.

At step 770, the computing system (e.g., the computer 208 of the artificial reality system 200) may create the one or more objects based on the second set of rays. The one or more objects may be created based on points placed by casted rays at particular locations in the physical environment of the scene. In particular embodiments, creating the one or more objects may include creating one or more three dimensional (3D) volumes for the one or more objects based on the first point, the second point, third point, and the fourth point defined by the first ray, the second ray, third ray, and the fourth ray, respectively.

At step 780, the computing system (e.g., the computer 208 of the artificial reality system 200) may generate a scene model of the scene based on the one or more planes and the one or more objects. In particular embodiments, generating the scene model may include saving the one or more planes as plane anchors and the one or more objects as object anchors, grouping a first set of plane anchors into a first component (e.g., room layout component), grouping a second set of plane anchors into a second component (e.g., room boundary component), grouping the plane anchors and the object anchors into a third component (e.g., room entity or container component), and associating, with each anchor, a component type (e.g., 2D boundary, 3D bounding box, 3D mesh, 3D volume, etc.) and a semantic type (e.g., floor, wall, ceiling, couch, desk, table, etc.). In some embodiments, the scene model may be used by an application (e.g., third-party application) or a user (e.g., game developer) to add one or more augmented reality elements to the scene (e.g., living room).

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating a scene model using a scene capture process or workflow, including the particular steps of the method of FIG. 7, this disclosure contemplates any suitable method for generating a scene model using a scene capture process or workflow, including any suitable steps, which may include a subset of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Scene Query

In particular embodiments, a scene model generated using the scene capture workflow discussed herein may be used by users (e.g., third-party users or developers) or applications (e.g., third-party applications) to create artificial reality or mixed reality (e.g., AR, VR) experiences that leverage a rich understanding of the user's environment. For instance, developers may query the scene model to build experiences that have rich interactions with the user's physical or real environment. Thus, developers don't need to worry about building or capturing their own scene models from scratch. In particular embodiments, a third-party user or an application may be able to use or query an existing scene model to easily create complex, responsive, and scene-aware experiences that intelligently adapt to the real world. In particular embodiments, an application (e.g., third-party application) or a third-party user (e.g., developer) may query the system (e.g., artificial-reality system 200) via an API for certain elements or components of a particular scene model. If the requested scene model is present or already generated, then the system may provide the scene model to the application or the developer. Otherwise, if no pre-existing scene model is present, then the system may invoke the scene capture user flow to generate a scene model, as discussed elsewhere herein.

Figure 8:
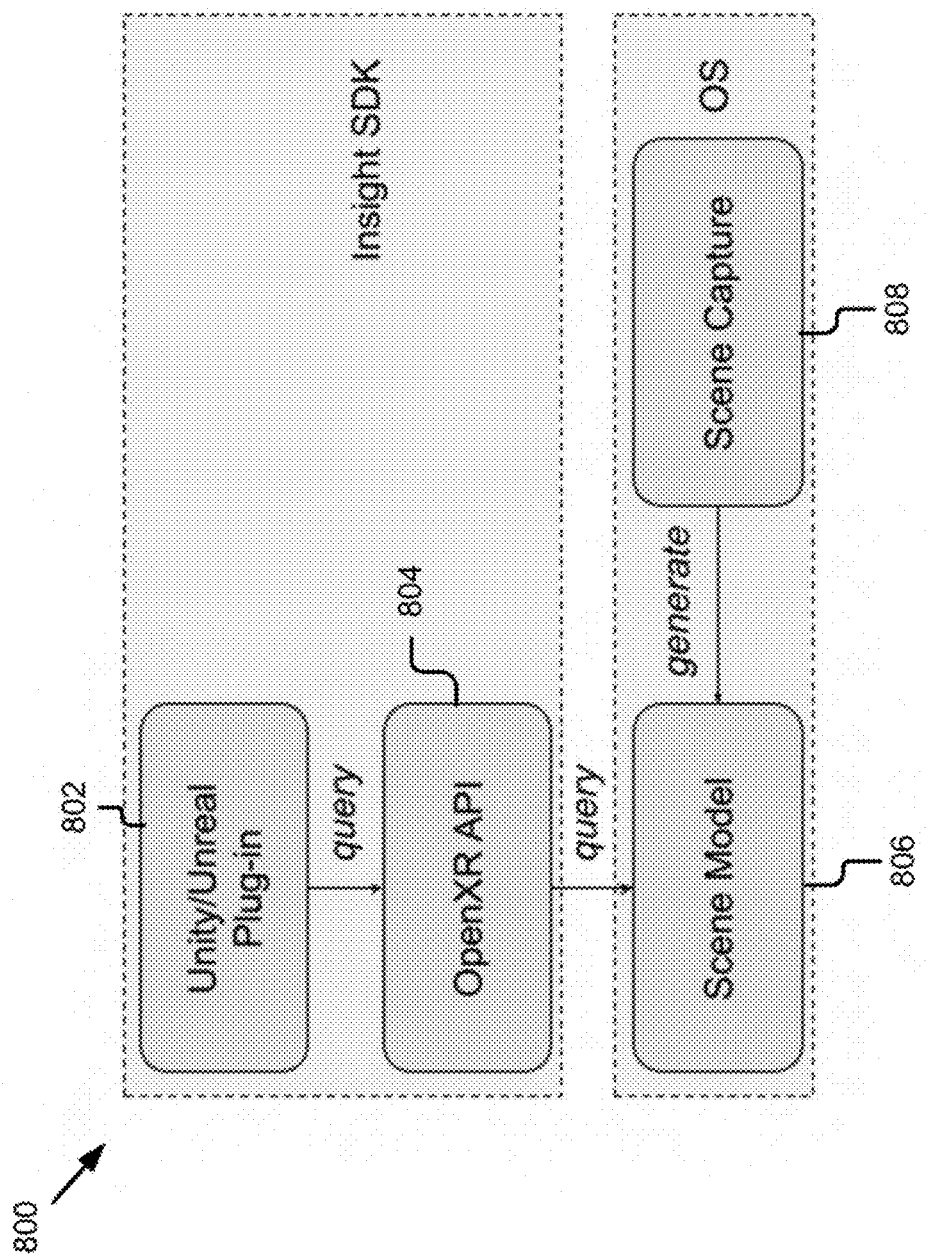
FIG. 8 illustrates an example block diagram associated with a scene query environment.

FIG. 8 illustrates an example block diagram 800 associated with a scene query environment. As illustrated, a plug-in 802 (e.g., unity/unreal plug-in) installed on the system (e.g., system 200) or on a third-party system (e.g., developer's system) may query a scene model 806 via an API 804 (e.g., OpenXR API). As discussed elsewhere herein, a scene capture process or workflow 808 (e.g., scene capture workflow 400 or scene capture workflow 600) may generate the scene model 806. In particular embodiments, the scene model 806 may be generated, managed, and persisted by an operating system (OS) running on an artificial-reality system (e.g., artificial-reality system 200). The scene model 806 may be delivered through or as part of an insight software developer kit (SDK) to users or applications. In some embodiments, the scene model 806 may be accessible by all first-party applications or third-party applications.

In particular embodiments, developers (e.g., game developers) may be able to access the scene model 806 with unity and unreal plug-ins and using the OpenXR API 804 to query for elements (e.g., room layout, plane anchors, anchor components, semantic labels or types, room container component, etc.) of the scene model 806. In particular embodiments, the scene model 806 may be accessed by following two types of queries:

Entity and Component Discovery Query—supports basic and direct queries, such as, for example, following:
  Discover—developers may be able to retrieve a list of anchors with types of components in the scene model.
  Locate Anchors—developers may be able to get the pose of an anchor in the scene model.
  Get Component—developers may be able to get any components attached to anchors in the scene model.
  Get Room Layout—developers may be able to get a room layout (e.g., a collection of anchors) with a single query.

Entity Relationships Query—supports spatial relationship queries. Developers may be able to query relationship(s) between entities in the scene model.

Figure 9:
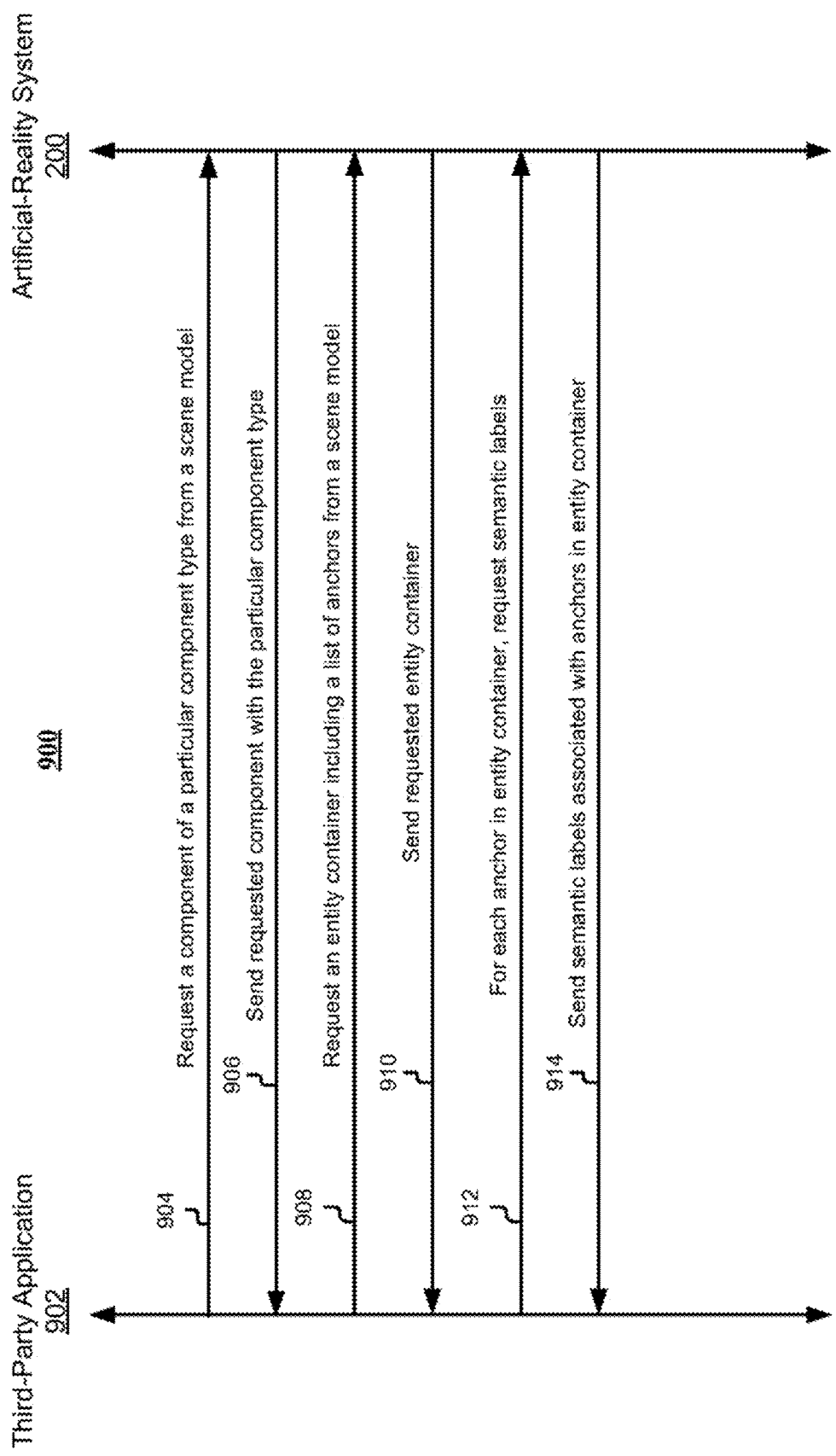
FIG. 9 illustrates an example scene query workflow, in accordance with particular embodiments.

FIG. 9 illustrates an example scene query workflow 900. Specifically, the scene query workflow 900 illustrates example queries exchanged between a third-party application 902 and an artificial-reality system, such as the artificial-reality system 200. As depicted, the scene query workflow may begin, at step 904, where the third-party application 902 may send a first query requesting a component of a particular component type from a scene model. As an example, the third-party application may query for a room layout component including a sequence of walls from the scene model. In this example, the first query may look like this "xrQuerySpatialEntity( . . . , hasComponent="roomLayout", . . . )". At step 906, the artificial-reality system 200 may retrieve the scene model from its memory, look for the component with the particular component type in the scene model, and send the requested component to the third-party application 902. If in case, the requested component (e.g., RoomLayout component) does not exist, the third-party application 902 may invoke a full scene capture workflow (e.g., entire scene capture workflow 400) to capture a full room. As an example, when the third-party application 902 wants to use a full room model and the RoomLayout component does not exist for that model, then the third-party application 902 may send the request to the artificial-reality system 200 to invoke a scene capture workflow for the room, as discussed in further detail below in reference to at least FIG. 10.

At step 908, the third-party application 902 may send a second query requesting an entity container including a list of anchors from the scene model. As an example, the third-party application 902 may query for a room container including all created planes and objects within the room from the scene model. In this example, the second query may look like this "xrGetEntityContainer(spaceRoom, componentEntityContainer, . . . )". At step 910, the artificial-reality system 200 may retrieve the component entity container from the scene model and send the requested entity container to the third-party application 902.

At step 912, the third-party application 902 may send a third query requesting, for each anchor in the entity container (e.g., room container) received in the previous query or step, semantic labels, types, or categories associated with the anchor. As an example, the third-party application 902, for each anchor in componentEntityContainer, may call xrGetSemanticLabels, and xrGetBounded2D or xrGetBounded3D depending on component enabled on the space. At step 914, the artificial-reality system 200 may retrieve the semantic labels or types associated with all the anchors in the component entity container from the scene model and send the retrieved semantic labels or semantic types associated with the anchors to the third-party application 902. If in case, all the required semantic types do not exist, the third-party application 902 may invoke a partial scene capture workflow (e.g., a portion of scene capture workflow 400) to request scene capture with a set of required semantic types, as discussed in further detail below in reference to at least FIG. 11.

In response to the first, second, and third queries discussed herein, the third-party application 902 may have a scene model as a set of planes and objects.

In some embodiments, a client application (e.g., first-party application or third-party application running on artificial-reality system) may want to use a full room model (e.g., scene model including all planes, objects, elements, or components of a room). As such, the client application may query for a room entity (e.g., XrSpace with RoomLayout component) and obtain all the planes and/or objects defined in the room. If in case, the room entity is not present in a scene model, the client application may invoke a full scene capture process. The full scene capture process may include capturing all entities, including all planes and objects, in a user's physical environment (e.g., room), as discussed, for example, with respect to the scene capture workflow 400 in FIGS. 4A-4B. FIG. 10 illustrates an example method 1000 for invoking a full scene capture process. The method 1000 may begin, at step 1002, where an application (e.g., third-party application 902) may query for room anchor (e.g., space with RoomLayout component) from a scene model. For instance, the application may query a scene model (e.g., scene model 806) via an API (e.g., OpenXR API 804). At step 1004, the application may make a determination whether the room anchor or room exists. If the room anchor does not exist, at step 1006, the application may request scene capture with a set of required semantic types and at step 1008, invoke a full scene capture workflow (e.g., scene capture workflow 400 or 600), where existing anchors may be loaded or updated, and new anchors may be added and saved.

If the result of the determination in step 1004 is positive (e.g., the room or room anchor does exist), then at step 1010, the application may query walls and anchors (e.g., from RoomLayout and EntityContainer components). At step 1012, the application may make a determination whether all required semantic types exist. If all the required semantic types do not exist, then steps 1006 and 1008 may be repeated as discussed above. Otherwise, the method 1000 may end and the application may use the scene model.

In some embodiments, a client application (e.g., first-party application or third-party application running on artificial-reality system) may require only a specific surface (e.g., workrooms require a desk only), not a full room. In this scenario, the client application may query for specific planes or objects and may invoke a partial scene capture process. The partial scene capture process may include capturing only the required planes or objects, required by the client application, in a user's physical environment (e.g., room). In other words, instead of performing an entire scene capture process or workflow (e.g., all steps of the scene capture workflow 400), a subset or a portion of the scene capture process may be performed. FIG. 11 illustrates an example method 1100 for invoking a partial scene capture process. The method 1100 may begin, at step 1102, where an application (e.g., first-party application or third-party application) may query for certain anchors (e.g., spaces with Bounded2D or Bounded3D component). At step 1104, the application may check semantic types in the returned list of space. At step 1106, the application may make a determination whether all required semantic types exist. If all the required semantic types do not exist, at step 1108, the application may request scene capture with a set of required semantic types. At step 1110, the application may invoke a partial scene capture process or workflow (e.g., a portion of scene capture workflow 400 or 600), where existing anchors may be loaded or updated, and new anchors may be added and saved. If on the other hand, the result of the determination in step 1106 is positive (e.g., all the required semantic types do exist), the method 1100 may end and the application may use the scene model.

Localization Failure Handling

In some embodiments, when a scene model is queried, certain anchors of the scene model may not be found or located. Such a situation leads to a localization failure. Failure in relocalization makes it difficult to retrieve the anchors and hence the scene description. From a user perspective, this means losing all the scene capture work (e.g., manual marking of different entities) they have done, and either having to return at a later time, or have to re-do the scene capture work or process again. Such a localization failure may lead to a user re-drawing or re-generating the scene model and is a source of frustration for many users. This problem may be significantly worse when a user needs to create a full scene model, which could take several minutes to set up. As users invest considerable amount of time to set up their virtual environments, there is an implicit expectation that their virtual environment and any content within it may be persisted and recovered across sessions.

As such, localization failure handling or a solution to mitigate or overcome a localization failure situation is needed. The goal of the localization failure handling is to ensure that users (e.g., user 202 wearing the artificial-reality system 200) may recover their scene model most of the time. In order to achieve this, a localization failure solution may consider one or more of the following:

Improved Unassisted Localization—the system (e.g., artificial-reality system 200) may be able to automatically localize the device and locate nearby anchors, and therefore a scene model, without requiring user input or action.

Support Prioritized Localization and Map/Anchor Management—the system may prioritize localization into anchors that have attached scene models and avoid deleting anchors that have scene models attached.

Support Assisted Localization—user assistance may improve localization success and may range from, for example, asking a user to scan more of a room to asking the user to name and localize into specific spaces.

Support Manual Scene Recovery—in cases where localization continues to be unsuccessful, provide a simple flow for users to recover previous scene models manually.

An example flow or process to handle localization failure may include the following. First, the system (e.g., artificial-reality system 200) automatically localizes the device and locates a scene model without user action. If the system fails to localize, a manual scene realignment process may be initiated, as discussed in further detail below. In the manual scene realignment process, a user (e.g., user 202 wearing the artificial-reality system 200) may be asked to manually assist with localization. In some embodiments, as a fallback, the user may be given an option to go through a scene recovery flow.

Some example solutions to handle localization or a localization failure situation are now discussed. It should be noted that the present disclosure is not limited to these solutions and other solutions are also possible and within the scope of the present disclosure.

Prioritized Localization and Anchor Management

In some embodiments, an artificial-reality system (e.g., artificial-reality system 200, which may be a VR device) may maintain three maps (e.g., scene maps, room maps) on the device or the system. Stored maps may be deleted over time in a least recently used (LRU) order. When this changes, there may be a database of map chunks that have anchors that may be associated or not. In some embodiments, the system may reduce localization failures by, for example and without limitation, (1) prioritizing localization into internal anchors that have spatial anchors attached to them, and (2) prioritizing non-deletion of internal anchors and their backing map data that have spatial anchors attached. The internal anchors may be deleted in an LRU manner when hitting max capacity.

Assisted Localization

In some embodiments, user assistance may improve localization success and may range from simple workflow (e.g., telling the user to scan more of the room) to more involved workflows (e.g., asking users to name and localize into specific spaces). Some of the ways or options by which assisted localization may be implemented may include, for example, the following:

Assisted Localization Option 1: Guided Localization (e.g., user room scanning)—one of the dominant causes of relocalization failure is low overlap between the current map and previous maps. To increase the likelihood of map overlap and a successful relocalization, the system (e.g., artificial-reality system 200) may instruct a user (e.g., user 202) to scan their room. This may especially help in cases where relocalization fails due to poor map coverage. It may not help in cases where there are large scene changes. To be successful, a user may have to spend certain amount of time (e.g., >10 seconds) scanning their room.

Assisted Localization Option 2: Named Rooms and Annotated Fixtures—when a user runs a scene capture process or workflow (e.g., scene capture workflow 400) for the first time, the system (e.g., artificial-reality system 200) may ask the user to provide a name for their room and annotate surfaces and objects (volumes) that are permanent fixtures. In the future when a localization failure occurs (e.g., unassisted localization fails), the user may be asked to specify which room they are in (e.g., from a list of available rooms) and point at the permanent fixtures that they had previously annotated. By specifying the room name, a localization algorithm running on the system may pick the correct map. With knowledge of permanent fixtures that were previously annotated, the localization algorithm may have a strong pose prior and a focal point for search. The named rooms and annotated fixtures option may particularly help when relocalization fails due to large scene changes. It may not help when relocalization fails due to lighting changes. However, lighting changes are presumable easier to detect, and may be provided as explicit guidance to user as part of the scene capture workflow. For example, the user may be asked to turn on the light to help with relocalization.

Assisted Localization Option 3: No Anchors Left Behind—longer-term effort on localization and UX improvements that may scale to VR and AR use cases to ensure all anchored content may be recovered, including, for example, user-assisted localization and UX recovery flows for anchors or scene models. This option (i.e., Option 3) may be a superset of Option 1 and Option 2.

Manual Scene Recovery

In some embodiments, where localization continues to be unsuccessful, the system (e.g., artificial-reality system 200) may provide a simple flow to users to recover previous scene models manually. The need for manual scene recovery never goes away, since even when assisted localization option(s) are available, there may still be need for a fallback option when the localization fails (e.g., localization may never hit 100% success). Some of the ways or options by which the manual scene recovery may be implemented may include, for example, the following:

Manual Scene Recovery Option 1: Manual Scene Realignment—this option may be used to manually align a scene model (e.g., scene model from a previously-created room) to the current room that the user is in. For instance, the system may ask a user to touch two specific walls in their scene (e.g., walls that intersect). Based on the user inputs, the system may determine a corner of the room, and hence a rigid transformation to align the scene model to the room. The manual scene realignment is discussed in detail below in a separate subsection.

Manual Scene Recovery Option 2: Manually Reattach Scene Elements—in this option, the system (e.g., artificial-reality system 200) may show the user (e.g., user 202 wearing the system 200) all the UserSurfaces (e.g., walls, door, windows, etc.) and UserVolumes (e.g., couch, desk, chair, etc.) that make up a scene model, and ask the user to manually place (e.g., via their controller 206 or hand gestures) to where they belong in a room. In some embodiments, placement could be in the form of drag and drop. When the user finalizes the new position, the system may create new anchors (e.g., PlaneAnchors). This option (i.e., manually reattached scene elements) may be similar to the manual scene recovery Option 1, but rather than aligning the full scene model at once, it relies on the user to reattach individual elements back to their room.

Manual Scene Realignment

In mixed reality and passthrough AR experience, failure in relocalization has been identified as a critical detractor for the user experience. Unless addressed, developers for artificial reality or mixed reality applications fear that it hurt the adoption of these applications. In particular embodiments, a scene capture and query may consist of two parts. The first part may include a user defining the scene by marking up their room. This is a process that may take some time (e.g., 3-5 minutes) and produces a lightweight scene description of the room, which may include floor, ceiling, walls, and major pieces of furniture. This scene description may be stored via an anchor infrastructure. That is, the scene description may be stored in the form of anchors in a scene model. The second part may include an API which allows developers to query for the scene model and integrate it into their applications.

As discussed elsewhere herein, a scene model is built on top of anchors. Anchors may be localized only when the map they come from is localized. Failure in relocalization makes it difficult to retrieve the anchors and hence the scene description. From a user perspective, this means losing all the scene capture work (e.g., manual marking of different entities) they have done, and either having to return at a later time, or have to re-do the scene capture work or process again. There are generally two problems to address here. First, that a user may have multiple maps for the same location. Second, that a map of a location may eventually be deleted. Both cases are problematic, as they may lead to room information being lost. Consider, for example, two following scenarios.

Example Localization Failure Scenario 1 (Multiple Maps for the Same Place)—A user boots their VR headset (e.g., artificial-reality system 200) in a room for the first time. The headset creates Map1. The user then follows a room capture flow (e.g., scene capture workflow 400) through an application on the headset and creates a room. The next day, the user returns to the same room and boots the headset. The headset fails to relocalize to Map 1, so it creates a new Map2. If a user now tries to launch an application which requires a room definition (e.g., scene description), the room relocalization flow may need to be initiated.

Example Localization Failure Scenario 2 (Map Getting Deleted)—A user uses their VR headset in many different places. When in their living room, they create a room, which may be stored as Map1. They then move to other places, like garage (e.g., stored as Map2), sleeping room (e.g., stored as Map3), and a friend's house (e.g., stored as Map4). In some embodiments, the VR headset may only keep 3 maps, which means Map1 is eventually deleted. When the user returns to their living room, the headset creates a new map (e.g., Map5), which has no room. If a user now tries to launch an application which requires a room definition, the room relocalization flow may need to be initiated.

Figure 12:
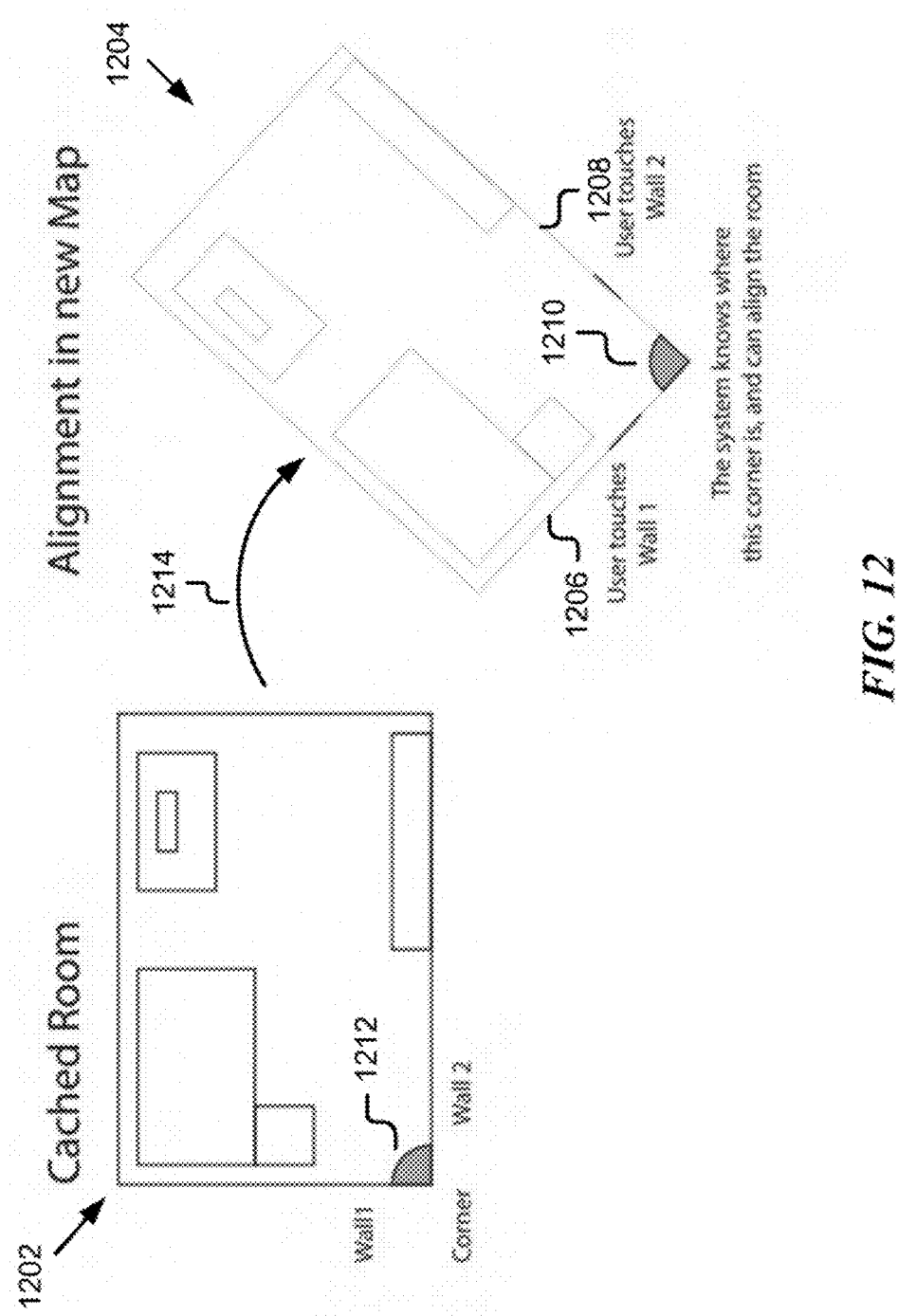
FIG. 12 illustrates an example alignment of a cached or a previously created scene to a current map

In particular embodiments, the manual scene realignment technique addresses the localization failure discussed herein, particularly with respect to the above-discussed example scenarios. The key idea of this mitigation technique is to rely on users to indicate that they are in a space they have already manually tagged and provide enough information in order to align a cache of the room they earlier tagged into a current map. In particular embodiments, a manual scene realignment process relies on an existence of a well-defined room origin (e.g., room corner 1212), and knowing where that corner is located in a new map, such as map 1204. The manual scene realignment is based on an assumption that any room has a well-defined origin, which may be a corner defined by intersection of two walls, such as a corner 1210 defined by the intersection of walls 1206 and 1208, as shown in FIG. 12. The first two walls (e.g., wall 1 and wall 2) may be created or defined by a user as part of the scene capture process. FIG. 12 illustrates an example alignment of a cached or previously-created scene (e.g., map 1202 of a room) to a current map 1204. As discussed above in example scenario 1, there may be multiple maps created for the same place. For example, on day 1, the user may have done the scene capture of their living room, which may be stored as Map1. On day 2 when they return to the living room, the system (e.g., artificial-reality system 200) may not be able to relocalize or load Map1 and instead create a new map, such as Map2. When the user now tries to launch an application that requires a room definition (e.g., scene model of the living room), the system may initiate the manual scene realignment process. In this process, the user may be asked to select or define two walls, as indicated by reference numerals 1206 and 1208. The user may do so by touching the walls or casting a ray to place a point on each of these walls via their controller 206. The system may then determine a point of intersection of these walls 1206 and 1208. The point of intersection may help determine a particular point, such as a room corner 1210. Based on the room corner 1210, the system may align the cached room 1202 (e.g., stored as Map1) with the new or current map 1204 (e.g., stored as Map2). In other words, the system may move or reposition the cached room 1202 until its room corner 1212 aligns with the room corner 1210 of the new map 1204, as indicated by reference numeral 1214. Based on the alignment, the system may determine that the cached room (e.g., Map1) is actually the current map of the user's living room and may load the cached room or a scene model associated with the cached room (e.g., previous map of the room) into the current map. As such, the manual scene realignment technique may be able to relocalize with minimal user inputs (e.g., user selecting or defining walls for a room corner) without having to redraw an entire room or going through the entire scene capture process.

In some embodiments, a cache definition associated with a cached room may be used during the alignment process, such as the alignment process discussed above in reference to FIG. 12. A room cache or a cached room (e.g., previously-created room) may include a unique identifier (e.g., UUID) of the room entity and a list of pairs, each pair including an anchor ID and a pose of the anchor (e.g., <anchor uuid, pose>). The pose is relative to the origin of the room, where the origin may be the corner of the room (or may be at any place, where a spatial anchor may be defined corresponding to the room entity). When information for a room is needed, the system (e.g., artificial-reality system 200) may use the stored UUIDs (e.g., of the room and the anchors) to query relevant information. The information that cannot be queried (e.g., because the map is not loaded) may be provided by the cache definition. In some embodiments, the cache definition may include, for example, cache, what can be loaded, and corner alignment, each of which can be combined to provide entire room information needed to relocalize.

Figure 13:
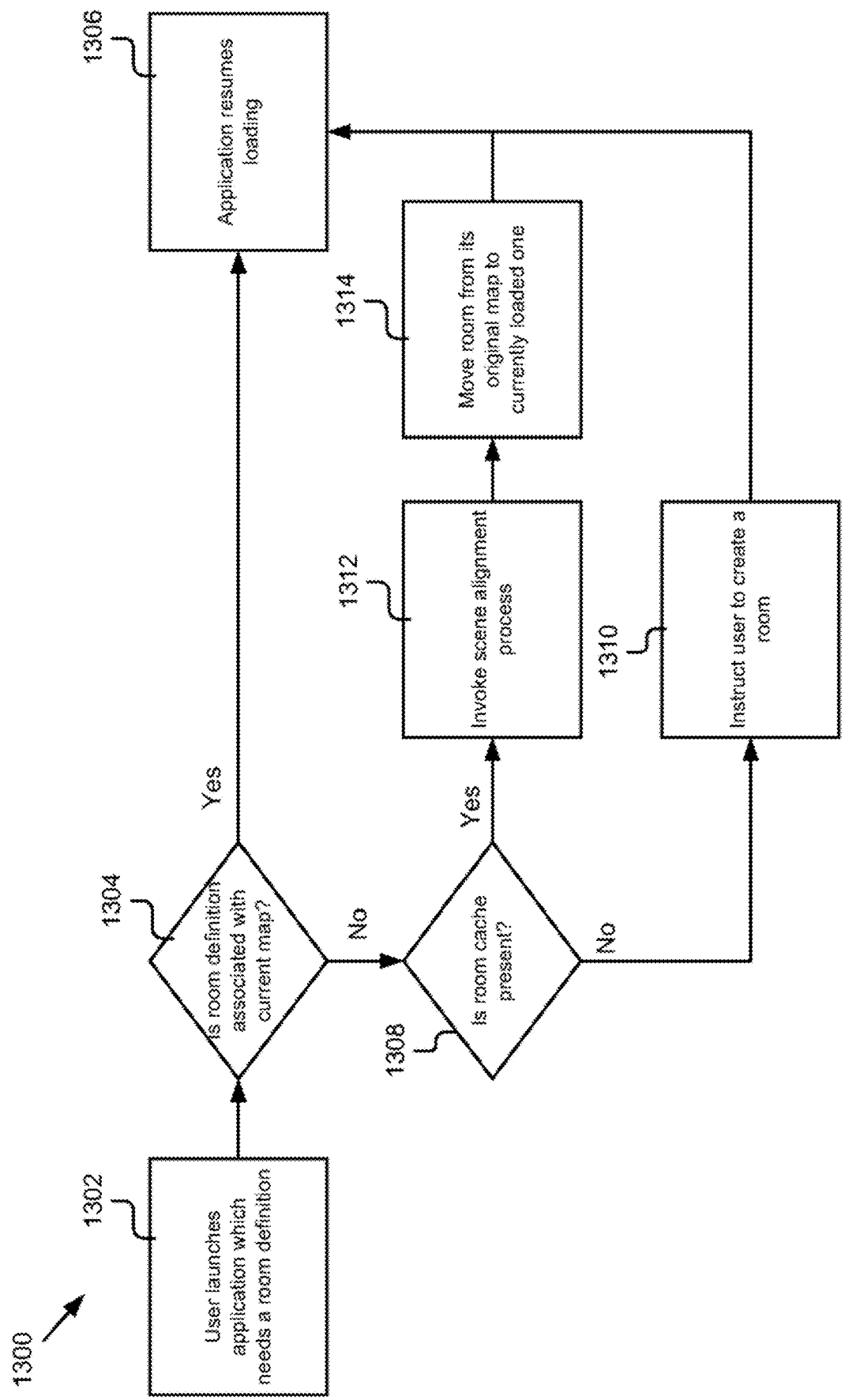
FIG. 13 illustrates an example relocalization flow or method for localization failure handling, in accordance with particular embodiments.

FIG. 13 illustrates an example relocalization flow or method 1300 for localization failure handling. In particular embodiments, steps 1302-1314 illustrated in the method 1300 may be performed by a localization algorithm running on an artificial-reality system, such as artificial-reality system 200. The method 1300 begins, at step 1302, where a user (e.g., user 202) launches an application on the system (e.g., VR headset). The launched application may require a room or a scene definition, which be associated with a scene model as discussed herein. At step 1304, the system may make a determination whether the room definition or scene description is associated with a current map that is currently loaded on the system. For example, when the user wearing the artificial-reality system (e.g., VR headset) walks into their living room, the system loads a map. The user launches an application that requires a room definition (e.g., scene model) in order to add one or more AR elements to the user's current environment. The system makes the determination of whether the room definition is associated with the current map. As an example, the system may make this determination based on a query "xrQuerySpatialEntity (hasComponent=RoomLayout)". The query will return a space if the room exists. This query may return only the room in the current map, not in other maps. In some instances, a room entity may be implemented as a spatial anchor internally, so that this spatial anchor is associated to a single map and can be queried.

If the result of the determination in step 1304 is positive, then, at step 1306, the application resumes loading. If the required room definition is not associated with the currently loaded map, at step 1308, the system may make a determination whether any room cache (e.g., one or more cached or previously-created rooms or maps for the room) is available. In some embodiments, the system may store up to 3 maps that maybe of a same room or different rooms. If there is no room cache present, at step 1310, the system may invoke a scene capture process (e.g., scene capture workflow 400) and instruct the user to create a room. Once the room definition (e.g., scene model) is created, the system may proceed to step 1306 to resume loading the application.

If a room cache is found, then, at step 1312, the system may invoke or initiate a scene alignment process (e.g., manual scene realignment process), as discussed, for example, in FIG. 12. In some embodiments, if there are multiple cached rooms or maps found, then the system may ask the user to first select a particular cached room or map. By way of an example and without limitation, the system may have created in the past a Map1 for living room, a Map2 for garage, and a Map3 for friend's house, and the user may be asked to select a map from these. If the user selects Map1, even though Map1 is associated with the user's living room, that map not be aligned properly with the current one. For instance, objects in the living room may be currently arranged differently than last time (e.g., when Map1 was created) due to which the localization failed (e.g., system was not able to load Map1 at the first place). As such, the system may initiate the scene alignment flow to align the cached room or previously-created map with the current map.

In the scene alignment process, the system may instruct the user to select certain entities in their environment (e.g., living room). The certain entities may be those that are fixed at their locations and not movable. For instance, the certain entities may be walls. In particular, the user may be asked to touch or select two walls. Once the user identifies the two walls, the system may determine a room corner (e.g., room corner 1210) based on a point of intersection of the two identified walls. Based on the room corner, the system may align the cached room with the current map. Stated differently, the system may re-position the previously-created map (e.g., Map1 of living room) until it aligns with the room corner of the current map. Once the alignment is complete, at step 1314, the system may move the room or room definition from its original map to currently loaded one. In other words, the system may load the cached room (e.g., Map1) into the current map. It should be noted that unique identifies (e.g., uuid) of anchors may not change because of this move. This is because applications may associate content with anchors, and changing uuid would invalidate them. In particular embodiments, the system may remove the room definition (e.g., scene description or scene model) from the previous map or cached room since it is now associated with or loaded into the current map. This avoids having duplicates which may diverge, and simplifies the system design.

Once the room definition is loaded into the current map, the system proceeds to step 1306 to resume loading the application.

Figure 14:
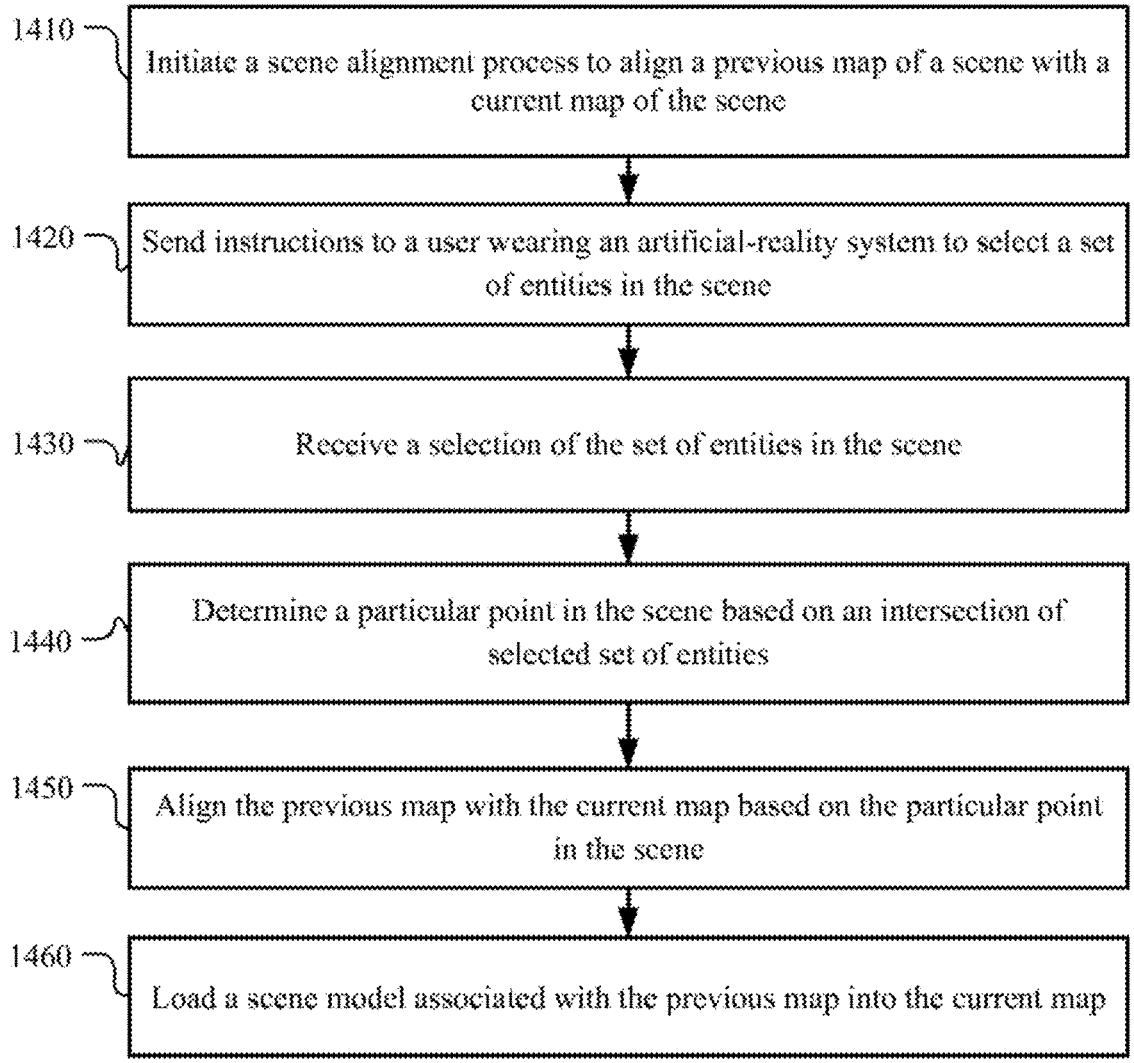
FIG. 14 illustrates an example method for scene alignment, in accordance with particular embodiments.

FIG. 14 illustrates an example method 1400 for scene alignment, in accordance with particular embodiments. The method may begin at step 1410, where a computing system (e.g., the computer 208) associated with an artificial reality device (e.g., the artificial reality system 200) may initiate a scene alignment process (e.g., scene alignment process 1312) to align a previous map of a scene with a current map of the scene. For instance, the system may receive a user selection of an application on the artificial-reality system. The application requires a scene description associated with the scene model of the scene. The system may determine that the scene description is not associated with the current map and that the previous map of the scene is present on the artificial-reality system. In response to determining that the scene description is not associated with the current map and that the previous map of the scene is present, the computing system may initiate the scene alignment process to align the previous map of the scene with the current map of the scene.

In some embodiments, the computing system may determine that a plurality of maps of the scene is present on the artificial-reality system. If multiple maps are determined or found, then the system instruct the user to select a particular map of the scene from the plurality of maps. The particular map may be the previous map discussed herein. Once the user selects the particular map, the system may initiate the scene alignment process to align the previous map of the scene with the current map of the scene.

In some embodiments, the computing system may determine that the previous map of the scene is not present. In response to determining that the previous map of the scene is not present, the system may initiate a scene capture process (e.g., scene capture workflow 400) to generate a scene model of the scene, as discussed, for example, in FIG. 13.

At step 1420, the computing system (e.g., the computer 208 of the artificial reality system 200) may send instructions to a user wearing an artificial-reality system to select a set of entities in the scene. By way of an example and not by way of limitation, the scene may be living room of the user and the set of entities may be two walls of the room, and the user may be asked or instructed to select or touch the two walls, such as walls 1206 and 1208.

At step 1430, the computing system (e.g., the computer 208 of the artificial reality system 200) may receive a selection of the set of entities in the scene. For example, the system may receive user selection of the two walls (e.g., walls 1206 and 1208) in the room. At step 1440, the computing system may determine a particular point in the scene based on an intersection of selected set of entities. As an example, the particular point is a room wall corner (e.g., corner 1210) between the two walls.

At step 1450, the computing system (e.g., the computer 208 of the artificial reality system 200) may align the previous map with the current map based on the particular point in the scene. In some embodiments, aligning the previous map with the current map may include re-positioning the previous map to align the particular point (e.g., room corner 1212) located in the previous map with the particular point (e.g., room corner 1210) located in the current map, as shown and discussed, for example, in FIG. 12. At step 1460, the computing system may load a scene model associated with the previous map into the current map. In some embodiments, the scene model associated with the previous map may be loaded into the current map in response to successful alignment of the particular point (e.g., room corner 1212) located in the previous map (e.g., map 1202) with the particular point (e.g., room corner 1210) located in the current map (e.g., map 1204). In some embodiments, the system may delete the scene model from the previous map in response to loading the scene model into the current map, as discussed elsewhere herein.

Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for scene alignment, including the particular steps of the method of FIG. 14, this disclosure contemplates any suitable method for scene alignment, including any suitable steps, which may include a subset of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Example Network Environment

Figure 15:
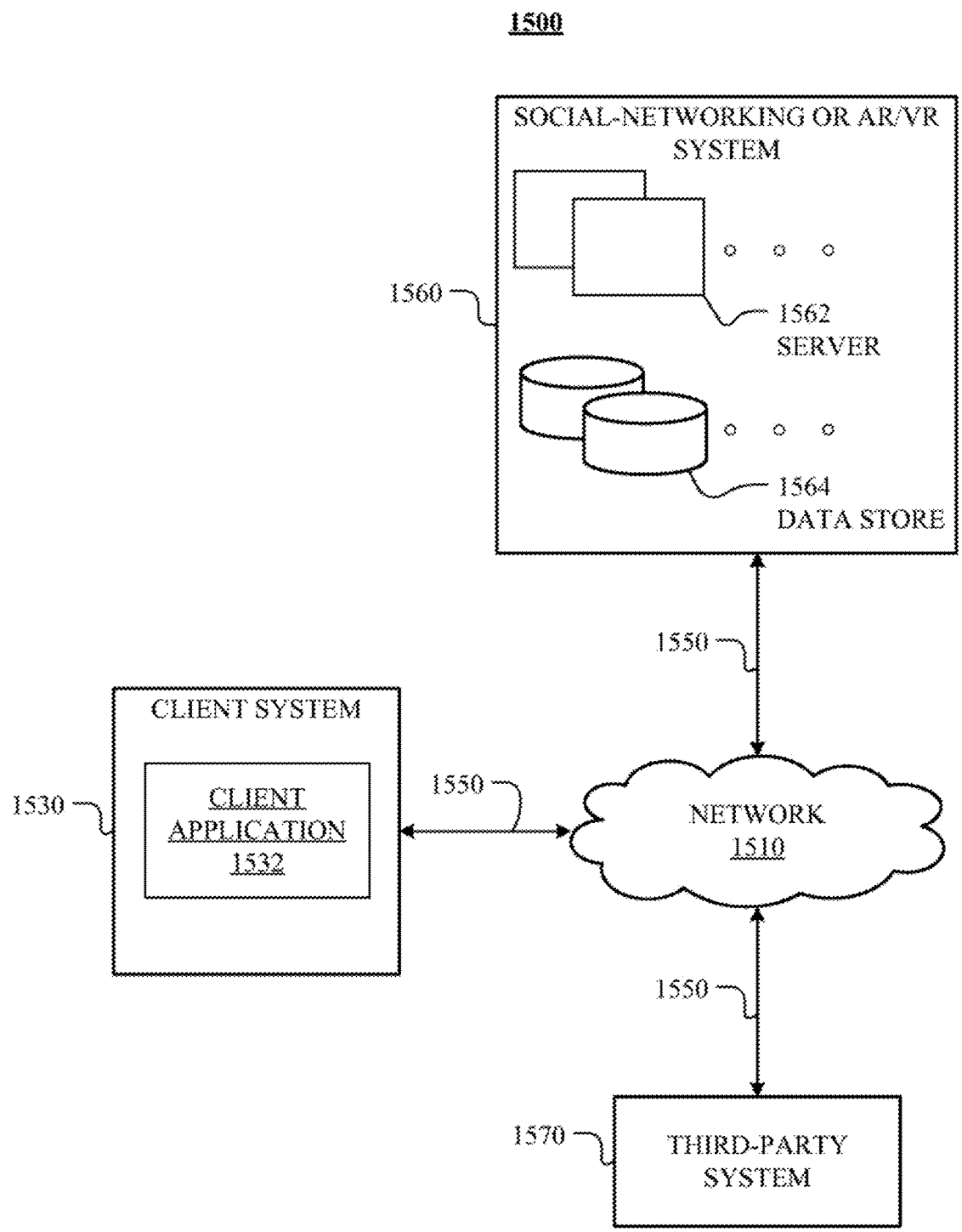
FIG. 15 illustrates an example network environment associated with an AR/VR or social-networking system.

FIG. 15 illustrates an example network environment 1500 associated with an augmented reality (AR)/virtual reality (VR) system or a social-networking system. Network environment 1500 includes a client system 1530, a VR (or AR) or social-networking system 1560, and a third-party system 1570 connected to each other by a network 1510. Although FIG. 15 illustrates a particular arrangement of client system 1530, VR or social-networking system 1560, third-party system 1570, and network 1510, this disclosure contemplates any suitable arrangement of client system 1530, AR/VR or social-networking system 1560, third-party system 1570, and network 1510. As an example and not by way of limitation, two or more of client system 1530, AR/VR or social-networking system 1560, and third-party system 1570 may be connected to each other directly, bypassing network 1510. As another example, two or more of client system 1530, AR/VR or social-networking system 1560, and third-party system 1570 may be physically or logically co-located with each other in whole or in part. Moreover, although FIG. 15 illustrates a particular number of client systems 1530, AR/VR or social-networking systems 1560, third-party systems 1570, and networks 1510, this disclosure contemplates any suitable number of client systems 1530, AR/VR or social-networking systems 1560, third-party systems 1570, and networks 1510. As an example and not by way of limitation, network environment 1500 may include multiple client system 1530, AR/VR or social-networking systems 1560, third-party systems 1570, and networks 1510.

This disclosure contemplates any suitable network 1510. As an example and not by way of limitation, one or more portions of network 1510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1510 may include one or more networks 1510.

Links 1550 may connect client system 1530, AR/VR or social-networking system system 1560, and third-party system 1570 to communication network 1510 or to each other. This disclosure contemplates any suitable links 1550. In particular embodiments, one or more links 1550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1550, or a combination of two or more such links 1550. Links 1550 need not necessarily be the same throughout network environment 1500. One or more first links 1550 may differ in one or more respects from one or more second links 1550.

In particular embodiments, client system 1530 (e.g., an artificial reality system 200) may be an electronic device including hardware, software, or embedded logic components or a combination of two or more such components and capable of carrying out the appropriate functionalities implemented or supported by client system 1530. As an example and not by way of limitation, a client system 1530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1530. A client system 1530 may enable a network user at client system 1530 to access network 1510. A client system 1530 may enable its user to communicate with other users at other client systems 1530.

In particular embodiments, client system 1530 may include a client application 1532 operable to provide various computing functionalities, services, and/or resources, and to send data to and receive data from the other entities of the network 1510, such as the AR/VR or social-networking system 1560 and/or the third-party system 1570. For example, the client application 1532 may be a social-networking application, an artificial-intelligence related application, a virtual reality application, an augmented reality application, an artificial reality or a mixed reality application, a camera application, a messaging application for messaging with users of a messaging network/system, a gaming application, an internet searching application, etc.

In particular embodiments, the client application 1532 may be storable in a memory and executable by a processor of the client system 1530 to render user interfaces, receive user input, send data to and receive data from one or more of the AR/VR or social-networking system 1560 and the third-party system 1570. The client application 1532 may generate and present user interfaces (e.g., graphical user interfaces 500*a*-500*n*) to a user via a display of the client system 1530.

In particular embodiments, AR/VR or social-networking system 1560 may be a network-addressable computing system that can host an online virtual reality environment, an augmented reality environment, or social network. AR/VR or social-networking system 1560 may generate, store, receive, and send social-networking data, such as, for example, user-profile data, concept-profile data, social-graph information, or other suitable data related to the online social network. Social-networking or AR/VR system 1560 may be accessed by the other components of network environment 1500 either directly or via network 1510. As an example and not by way of limitation, client system 1530 may access social-networking or AR/VR system 1560 using a web browser, or a native application associated with social-networking or AR/VR system 1560 (e.g., a mobile social-networking application, a messaging application, another suitable application, or any combination thereof) either directly or via network 1510. In particular embodiments, social-networking or AR/VR system 1560 may include one or more servers 1562. Each server 1562 may be a unitary server or a distributed server spanning multiple computers or multiple datacenters. Servers 1562 may be of various types, such as, for example and without limitation, a mapping server, web server, news server, mail server, message server, advertising server, file server, application server, exchange server, database server, proxy server, another server suitable for performing functions or processes described herein, or any combination thereof. In particular embodiments, each server 1562 may include hardware, software, or embedded logic components or a combination of two or more such components for carrying out the appropriate functionalities implemented or supported by server 1562. In particular embodiments, social-networking or AR/VR system 1560 may include one or more data stores 1564. Data stores 1564 may be used to store various types of information. In particular embodiments, the information stored in data stores 1564 may be organized according to specific data structures. In particular embodiments, each data store 1564 may be a relational, columnar, correlation, or other suitable database. Although this disclosure describes or illustrates particular types of databases, this disclosure contemplates any suitable types of databases. Particular embodiments may provide interfaces that enable a client system 1530, a social-networking or AR/VR system 1560, or a third-party system 1570 to manage, retrieve, modify, add, or delete, the information stored in data store 1564.

In particular embodiments, social-networking or AR/VR system 1560 may store one or more social graphs in one or more data stores 1564. In particular embodiments, a social graph may include multiple nodes—which may include multiple user nodes (each corresponding to a particular user) or multiple concept nodes (each corresponding to a particular concept)—and multiple edges connecting the nodes. Social-networking or AR/VR system 1560 may provide users of the online social network the ability to communicate and interact with other users. In particular embodiments, users may join the online social network via social-networking or AR/VR system 1560 and then add connections (e.g., relationships) to a number of other users of social-networking or AR/VR system 1560 to whom they want to be connected. Herein, the term "friend" may refer to any other user of social-networking or AR/VR system 1560 with whom a user has formed a connection, association, or relationship via social-networking or AR/VR system 1560.

In particular embodiments, social-networking or AR/VR system 1560 may provide users with the ability to take actions on various types of items or objects, supported by social-networking or AR/VR system 1560. As an example and not by way of limitation, the items and objects may include groups or social networks to which users of social-networking or AR/VR system 1560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or AR/VR system 1560 or by an external system of third-party system 1570, which is separate from social-networking or AR/VR system 1560 and coupled to social-networking or AR/VR system 1560 via a network 1510.

In particular embodiments, social-networking or AR/VR system 1560 may be capable of linking a variety of entities. As an example and not by way of limitation, social-networking or AR/VR system 1560 may enable users to interact with each other as well as receive content from third-party systems 1570 or other entities, or to allow users to interact with these entities through an application programming interfaces (API) or other communication channels.

In particular embodiments, a third-party system 1570 may include one or more types of servers, one or more data stores, one or more interfaces, including but not limited to APIs, one or more web services, one or more content sources, one or more networks, or any other suitable components, e.g., that servers may communicate with. A third-party system 1570 may be operated by a different entity from an entity operating social-networking or AR/VR system 1560. In particular embodiments, however, social-networking or AR/VR system 1560 and third-party systems 1570 may operate in conjunction with each other to provide social-networking services to users of social-networking or AR/VR system 1560 or third-party systems 1570. In this sense, social-networking or AR/VR system 1560 may provide a platform, or backbone, which other systems, such as third-party systems 1570, may use to provide social-networking services and functionality to users across the Internet.

In particular embodiments, a third-party system 1570 may include a third-party content object provider. A third-party content object provider may include one or more sources of content objects, which may be communicated to a client system 1530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or AR/VR system 1560 also includes user-generated content objects, which may enhance a user's interactions with social-networking or AR/VR system 1560. User-generated content may include anything a user can add, upload, send, or "post" to social-networking or AR/VR system 1560. As an example and not by way of limitation, a user communicates posts to social-networking or AR/VR system 1560 from a client system 1530. Posts may include data such as status updates or other textual data, location information, photos, videos, links, music or other similar data or media. Content may also be added to social-networking or AR/VR system 1560 by a third-party through a "communication channel," such as a newsfeed or stream.

In particular embodiments, social-networking or AR/VR system 1560 may include a variety of servers, sub-systems, programs, modules, logs, and data stores. In particular embodiments, social-networking or AR/VR system 1560 may include one or more of the following: a web server, a mapping server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or AR/VR system 1560 may also include suitable components such as network interfaces, security mechanisms, load balancers, failover servers, management-and-network-operations consoles, other suitable components, or any suitable combination thereof. In particular embodiments, social-networking or AR/VR system 1560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or AR/VR system 1560 to one or more client systems 1530 or one or more third-party system 1570 via network 1510. The web server may include a mail server or other messaging functionality for receiving and routing messages between social-networking or AR/VR system 1560 and one or more client systems 1530. An API-request server may allow a third-party system 1570 to access information from social-networking or AR/VR system 1560 by calling one or more APIs. An action logger may be used to receive communications from a web server about a user's actions on or off social-networking or AR/VR system 1560. In conjunction with the action log, a third-party-content-object log may be maintained of user exposures to third-party-content objects. A notification controller may provide information regarding content objects to a client system 1530. Information may be pushed to a client system 1530 as notifications, or information may be pulled from client system 1530 responsive to a request received from client system 1530. Authorization servers may be used to enforce one or more privacy settings of the users of social-networking or AR/VR system 1560. A privacy setting of a user determines how particular information associated with a user can be shared. The authorization server may allow users to opt in to or opt out of having their actions logged by social-networking or AR/VR system 1560 or shared with other systems (e.g., third-party system 1570), such as, for example, by setting appropriate privacy settings. Third-party-content-object stores may be used to store content objects received from third parties, such as a third-party system 1570. Location stores may be used for storing location information received from client systems 1530 associated with users. Advertisement-pricing modules may combine social information, the current time, location information, or other suitable information to provide relevant advertisements, in the form of notifications, to a user.

Example Computer System

Figure 16:
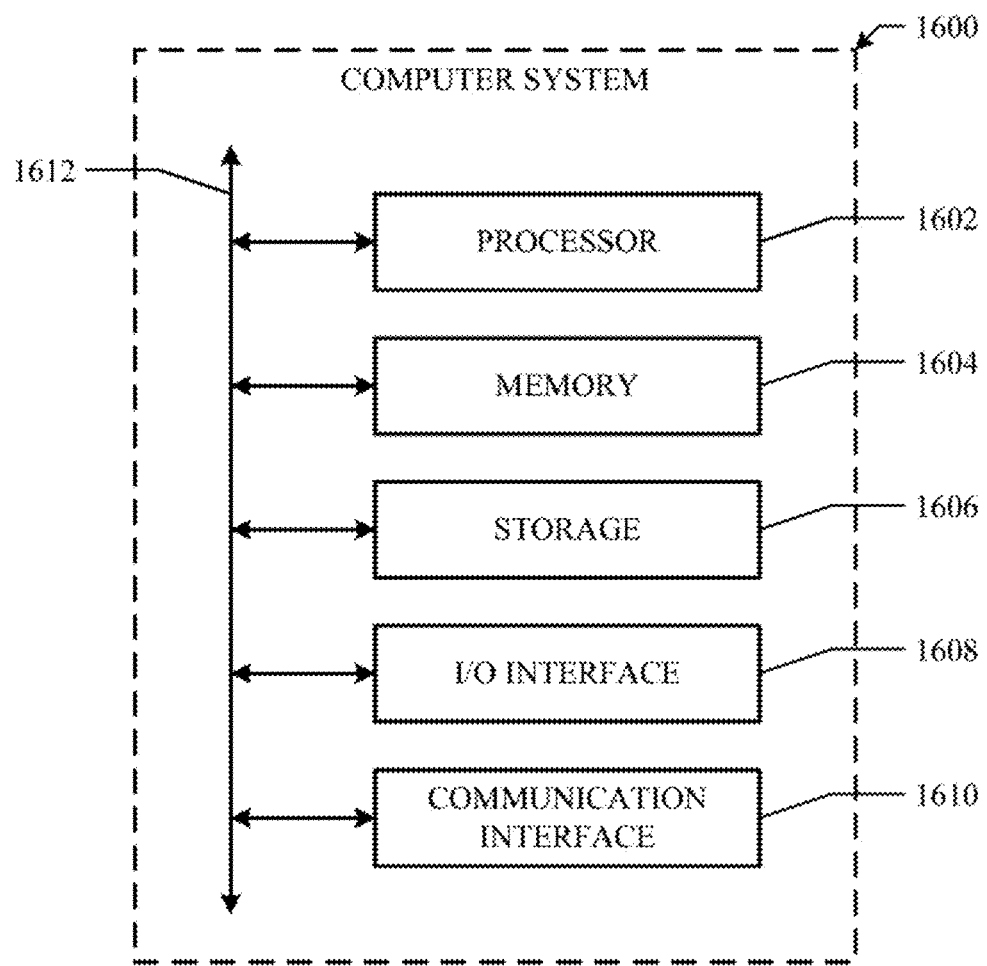
FIG. 16 illustrates an example computer system.

FIG. 16 illustrates an example computer system 1600. In particular embodiments, one or more computer systems 1600 perform one or more steps of one or more methods described or illustrated herein. In particular embodiments, one or more computer systems 1600 provide functionality described or illustrated herein. In some embodiments, the computer system 1600 is the computer unit 208 of the artificial-reality system 200. In particular embodiments, software running on one or more computer systems 1600 performs one or more steps of one or more methods described or illustrated herein or provides functionality described or illustrated herein. Particular embodiments include one or more portions of one or more computer systems 1600. Herein, reference to a computer system may encompass a computing device, and vice versa, where appropriate. Moreover, reference to a computer system may encompass one or more computer systems, where appropriate.

This disclosure contemplates any suitable number of computer systems 1600. This disclosure contemplates computer system 1600 taking any suitable physical form. As example and not by way of limitation, computer system 1600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks. Where appropriate, one or more computer systems 1600 may perform without substantial spatial or temporal limitation one or more steps of one or more methods described or illustrated herein. As an example and not by way of limitation, one or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

In particular embodiments, computer system 1600 includes a processor 1602, memory 1604, storage 1606, an input/output (I/O) interface 1608, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606. In particular embodiments, processor 1602 may include one or more internal caches for data, instructions, or addresses. This disclosure contemplates processor 1602 including any suitable number of any suitable internal caches, where appropriate. As an example and not by way of limitation, processor 1602 may include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602. Data in the data caches may be copies of data in memory 1604 or storage 1606 for instructions executing at processor 1602 to operate on; the results of previous instructions executed at processor 1602 for access by subsequent instructions executing at processor 1602 or for writing to memory 1604 or storage 1606; or other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs); be a multi-core processor; or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. As an example and not by way of limitation, computer system 1600 may load instructions from storage 1606 or another source (such as, for example, another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere). One or more memory buses (which may each include an address bus and a data bus) may couple processor 1602 to memory 1604. Bus 1612 may include one or more memory buses, as described below. In particular embodiments, one or more memory management units (MMUs) reside between processor 1602 and memory 1604 and facilitate accesses to memory 1604 requested by processor 1602. In particular embodiments, memory 1604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memories 1604, where appropriate. Although this disclosure describes and illustrates particular memory, this disclosure contemplates any suitable memory.

In particular embodiments, storage 1606 includes mass storage for data or instructions. As an example and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. In particular embodiments, storage 1606 is non-volatile, solid-state memory. In particular embodiments, storage 1606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1606 taking any suitable physical form. Storage 1606 may include one or more storage control units facilitating communication between processor 1602 and storage 1606, where appropriate. Where appropriate, storage 1606 may include one or more storages 1606. Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include one or more of these I/O devices, where appropriate. One or more of these I/O devices may enable communication between a person and computer system 1600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1608 for them. Where appropriate, I/O interface 1608 may include one or more device or software drivers enabling processor 1602 to drive one or more of these I/O devices. I/O interface 1608 may include one or more I/O interfaces 1608, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1610 for it. As an example and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example and not by way of limitation, bus 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   initiating a scene alignment process to align a previous map of a scene with a current map of the scene;
   sending instructions to a user wearing an artificial-reality system to select a set of entities in the scene;
   receiving a selection of the set of entities in the scene;
   determining a particular point in the scene based on an intersection of selected set of entities;
   aligning the previous map with the current map based on the particular point in the scene; and
   loading a scene model associated with the previous map into the current map.

2. The method of claim 1, further comprising:
   receiving a user selection of an application on the artificial-reality system, wherein the application requires a scene description associated with the scene model of the scene;
   determining that the scene description is not associated with the current map;
   determining that the previous map of the scene is present on the artificial-reality system; and
   in response to determining that the scene description is not associated with the current map and that the previous map of the scene is present, initiating the scene alignment process to align the previous map of the scene with the current map of the scene.

3. The method of claim 1, further comprising:
   deleting the scene model from the previous map in response to loading the scene model into the current map.

4. The method of claim 1, further comprising:
   determining a plurality of maps of the scene present on the artificial-reality system;
   instructing the user to select a particular map of the scene from the plurality of maps, wherein the particular map is the previous map; and
   in response to the user selecting the particular map, initiating the scene alignment process to align the previous map of the scene with the current map of the scene.

5. The method of claim 1, further comprising:
   determining that the previous map of the scene is not present; and
   in response to determining that the previous map of the scene is not present, initiating a scene capture process to generate a scene model of the scene,
   wherein generated scene model is loaded into the current map.

6. The method of claim 1, wherein aligning the previous map with the current map comprises:
   re-positioning the previous map to align the particular point located in the previous map with the particular point located in the current map.

7. The method of claim 6, wherein the scene model associated with the previous map is loaded into the current map in response to successful alignment of the particular point located in the previous map with the particular point located in the current map.

8. The method of claim 1, wherein the scene is a living room of the user.

9. The method of claim 8, wherein the set of entities in the scene comprises two walls of the living room.

10. The method of claim 9, wherein the particular point is a room wall corner between the two walls.

11. One or more computer-readable non-transitory storage media embodying software that is operable, when executed by one or more processors, to:
    initiate a scene alignment process to align a previous map of a scene with a current map of the scene;
    send instructions to a user wearing an artificial-reality system to select a set of entities in the scene;
    receive a selection of the set of entities in the scene;
    determine a particular point in the scene based on an intersection of selected set of entities;
    align the previous map with the current map based on the particular point in the scene; and
    load a scene model associated with the previous map into the current map.

12. The one or more computer-readable non-transitory storage media of claim 11, wherein the software is further operable when executed to:
    receive a user selection of an application on the artificial-reality system, wherein the application requires a scene description associated with the scene model of the scene;
    determine that the scene description is not associated with the current map;
    determine that the previous map of the scene is present on the artificial-reality system; and
    in response to determining that the scene description is not associated with the current map and that the previous map of the scene is present, initiate the scene alignment process to align the previous map of the scene with the current map of the scene.

13. The one or more computer-readable non-transitory storage media of claim 11, wherein the software is further operable when executed to:
    delete the scene model from the previous map in response to loading the scene model into the current map.

14. The one or more computer-readable non-transitory storage media of claim 11, wherein the software is further operable when executed to:
    determine a plurality of maps of the scene present on the artificial-reality system;
    instruct the user to select a particular map of the scene from the plurality of maps, wherein the particular map is the previous map; and
    in response to the user selecting the particular map, initiate the scene alignment process to align the previous map of the scene with the current map of the scene.

15. The one or more computer-readable non-transitory storage media of claim 11, wherein the software is further operable when executed to:
    determine that the previous map of the scene is not present; and
    in response to determining that the previous map of the scene is not present,
        initiate a scene capture process to generate a scene model of the scene,
        wherein generated scene model is loaded into the current map.

16. A system comprising:
    one or more processors; and
    one or more computer-readable non-transitory storage media coupled to one or more of the processors and comprising instructions operable when executed by one or more of the processors to cause the system to:
        initiate a scene alignment process to align a previous map of a scene with a current map of the scene;
        send instructions to a user wearing an artificial-reality system to select a set of entities in the scene;
        receive a selection of the set of entities in the scene;
        determine a particular point in the scene based on an intersection of selected set of entities;
        align the previous map with the current map based on the particular point in the scene; and
        load a scene model associated with the previous map into the current map.

17. The system of claim 16, wherein the one or more processors are further operable when executing the instructions to cause the system to:
    receive a user selection of an application on the artificial-reality system, wherein the application requires a scene description associated with the scene model of the scene;
    determine that the scene description is not associated with the current map;
    determine that the previous map of the scene is present on the artificial-reality system; and
    in response to determining that the scene description is not associated with the current map and that the previous map of the scene is present, initiate the scene alignment process to align the previous map of the scene with the current map of the scene.

18. The system of claim 16, wherein the one or more processors are further operable when executing the instructions to cause the system to:
    delete the scene model from the previous map in response to loading the scene model into the current map.

19. The system of claim 16, wherein the one or more processors are further operable when executing the instructions to cause the system to:
    determine a plurality of maps of the scene present on the artificial-reality system;
    instruct the user to select a particular map of the scene from the plurality of maps, wherein the particular map is the previous map; and
    in response to the user selecting the particular map, initiate the scene alignment process to align the previous map of the scene with the current map of the scene.

20. The system of claim 16, wherein the one or more processors are further operable when executing the instructions to cause the system to:
    determine that the previous map of the scene is not present; and
    in response to determining that the previous map of the scene is not present,
        initiate a scene capture process to generate a scene model of the scene,
        wherein generated scene model is loaded into the current map.

* * * * *